United States Patent
Doshi et al.

(10) Patent No.: US 12,405,843 B2
(45) Date of Patent: Sep. 2, 2025

(54) INFRASTRUCTURE PROCESSING UNIT

(71) Applicant: Intel Corporation, Santa Clara, CA (US)

(72) Inventors: Kshitij A. Doshi, Tempe, AZ (US); Johan Van De Groenendaal, Portland, OR (US); Edmund Chen, Sunnyvale, CA (US); Ravi Sahita, Portland, OR (US); Andrew J. Herdrich, Hillsboro, OR (US); Debra Bernstein, Sudbury, MA (US); Christine E. Severns-Williams, Deephaven, MN (US); Uri V. Cummings, Los Gatos, CA (US); Utkarsh Y. Kakaiya, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 17/134,324

(22) Filed: Dec. 26, 2020

(65) Prior Publication Data

US 2021/0117249 A1    Apr. 22, 2021

Related U.S. Application Data

(60) Provisional application No. 63/087,218, filed on Oct. 3, 2020.

(51) Int. Cl.
*G06F 9/52* (2006.01)
*G06F 9/50* (2006.01)
(Continued)

(52) U.S. Cl.
CPC ............ *G06F 9/522* (2013.01); *G06F 9/5072* (2013.01); *G06F 9/547* (2013.01); *H04L 43/08* (2013.01);
(Continued)

(58) Field of Classification Search
CPC ........ G06F 9/522; G06F 9/5072; G06F 9/547; G06F 9/5077; H04L 43/08;
(Continued)

(56) References Cited

U.S. PATENT DOCUMENTS 4,608,688 A * 8/1986 Hansen ................. G11C 29/74
                                                        714/10
6,181,677 B1 * 1/2001 Valli ........................ H04J 3/14
                                                       375/267
(Continued)

OTHER PUBLICATIONS

International Search Report and Written Opinion for PCT Patent Application No. PCT/US21/48092, Mailed Dec. 22, 2021, 12 pages.
(Continued)

*Primary Examiner* — Jorge A Chu Joy-Davila
(74) *Attorney, Agent, or Firm* — Compass IP Law PC

(57) ABSTRACT

Examples described herein relate to an Infrastructure Processing Unit (IPU) that comprises: interface circuitry to provide a communicative coupling with a platform; network interface circuitry to provide a communicative coupling with a network medium; and circuitry to expose infrastructure services to be accessed by microservices for function composition and to selectively provide a barrier to halt operation of at least one microservice based on event data from a composite node that performs the at least one microservice.

22 Claims, 54 Drawing Sheets

(51) Int. Cl.
   *G06F 9/54*     (2006.01)
   *H04L 43/08*    (2022.01)
   *H04L 67/1014*  (2022.01)
   *H04L 67/148*   (2022.01)

(52) U.S. Cl.
   CPC ........ *H04L 67/1014* (2013.01); *H04L 67/148* (2013.01)

(58) Field of Classification Search
   CPC . H04L 67/1014; H04L 67/148; H04L 67/133; H04L 67/1001; H04L 67/51; H04L 69/40; Y02D 10/00
   See application file for complete search history.

(56) References Cited

U.S. PATENT DOCUMENTS

| | | | |
|---|---|---|---|
| 10,754,666 | B1 | 8/2020 | Sorani et al. |
| 2016/0124742 | A1 | 5/2016 | Rangasamy et al. |
| 2018/0150343 | A1 | 5/2018 | Bernat et al. |
| 2018/0152392 | A1 | 5/2018 | Reed et al. |
| 2018/0234459 | A1 | 8/2018 | Kung et al. |
| 2018/0331905 | A1* | 11/2018 | Toledo ................ H04L 43/0882 |
| 2018/0343208 | A1 | 11/2018 | Narkier et al. |
| 2019/0004871 | A1* | 1/2019 | Sukhomlinov ......... G06F 9/541 |
| 2019/0220601 | A1 | 7/2019 | Sood et al. |
| 2019/0253518 | A1 | 8/2019 | Nachimuthu et al. |
| 2019/0297150 | A1 | 9/2019 | Takahashi et al. |
| 2019/0347125 | A1 | 11/2019 | Sankaran et al. |
| 2019/0370263 | A1* | 12/2019 | Nucci ................... G06F 16/254 |
| 2019/0394081 | A1 | 12/2019 | Tahhan et al. |
| 2020/0401457 | A1 | 12/2020 | Singhal et al. |
| 2021/0117242 | A1 | 4/2021 | Groenendaal et al. |
| 2021/0117249 | A1 | 4/2021 | Doshi et al. |
| 2021/0342188 | A1 | 11/2021 | Novakovic et al. |
| 2022/0050897 | A1* | 2/2022 | Gaddam ................ G06N 3/006 |

OTHER PUBLICATIONS

French and English Translation of First Office Action for Patent Application No. 2110069, Mailed May 20, 2022, 16 pages.
Netherlands Search Report for Patent Application No. 2029116, Mailed Apr. 4, 2022, 9 pages.
"NVIDIA® Mellanox@ BlueField® SmartNIC for Ethernet High Performance Ethernet Network Adapter Cards", Mellanox Technologies, May 17, 2020, 3 pages.
Kennedy, Patrick, "Mellanox Bluefield-2 IPU SmartNIC Bringing AWS-like Features to VMware", STH, https://www.servethehome.com/mellanox-bluefield-2-ipu-smartnic-bringing-aws-like-features-to-vmware/, Sep. 2, 2019, 3 pages.
Kit, Ariel, "Programming the Entire Data Center Infrastructure with the NVIDIA DOCA SDK", https://developer.nvidia.com/blog/programming-the-entire-data-center-infrastructure-with-the-nvidia-doca-sdk/, Oct. 5, 2020, 4 pages.
Yuan, Yifan, et al., "HALO: Accelerating Flow Classification for Scalable Packet Processing in NFV", 2019 Association for Computing Machinery, https://dl.acm.org/doi/10.1145/3307650.3322272, ISCA '19, Jun. 22-26, 2019, 14 pages.
First Office Action for U.S. Appl. No. 17/134,321, Mailed Dec. 5, 2023, 17 pages.
Final Office Action for U.S. Appl. No. 17/134,321, Mailed Jul. 30, 2024, 23 pages.

* cited by examiner

INFRASTRUCTURE PROCESSING UNIT

RELATED APPLICATION

This application claims the benefit of priority of U.S. Provisional application 63/087,218, filed Oct. 3, 2020. The contents of that application are incorporated in its entirety herein.

DESCRIPTION

Cloud-computing is at an inflection point with two mutually reinforcing trends. There is rapid emergence of at-scale Cloud Native services with large, loosely coupled, rapidly assembled and deployed microservices touching massively distributed data but doing so by keeping compute local to data. There are changes to the traditional software stack in which abstractions are through a progression of horizontal layers, now to a greater degree of modularity, heterogeneity, locality of tightly coupled actions, and data and service virtualization behind service oriented application program interfaces (APIs).

BRIEF DESCRIPTION OF THE DRAWINGS

FIGS. 32C-1 and 32C-2 depicts an example of control plane operation with use of various security features.

FIGS. 33C-1 to 33C-3 illustrate system views of security features of FIG. 33B.

DETAILED DESCRIPTION

Figure 1:
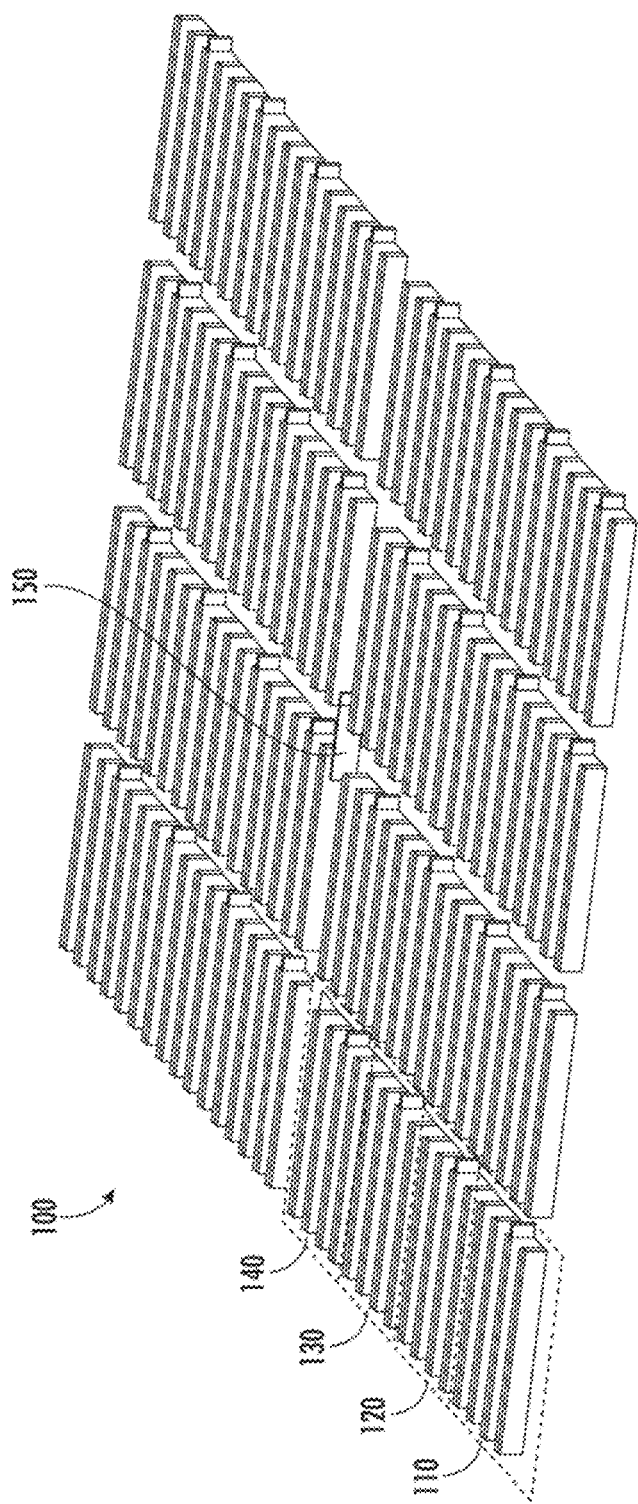
FIG. 1 is a simplified diagram of at least one embodiment of a data center for executing workloads with disaggregated resources.

Services abstraction such as microservices and Functions as a Service (FaaS) or Serviceless are driving loosely coupled, dynamically orchestrated services which require partitioning of compute or XPU and standardizing services allowing for Backend as a Service (BaaS). An XPU or xPU could refer to a graphics processing unit (GPU), general purpose GPU (GPGPU), field programmable gate array (FPGA), Accelerated Processing Unit (APU), accelerator or other processor. These can also include functions such as quality of service enforcement, tracing, performance and error monitoring, logging, authentication, service mesh, data transformation, etc. With massive levels of data processing, data may not be stored local to compute and processing requirements can exceed single XPU scale. These are driving a growth in the communication between services.

Pooled resources (e.g., locally attached or distributed across a fabric or network) can be aggregated for cost savings and dynamically partitioned to customers for efficiency. Pooled resources are driving the need for high bandwidth, low latency connectivity, virtualization and composability of resources, zero trust security, fine grain telemetry and quality of service and optimized movement and processing of data.

An important trend is the adoption of microservices across cloud, enterprise, IOT, and telecommunications providers (telcos). Microservices and services may be implemented with the data center architectures or edge computing architectures. Microservices can include a decomposition of a monolithic application into small manageable defined services. A microservice can be characterized by one or more of: use of fine-grained interfaces (to independently deployable services), polyglot programming (e.g., code written in multiple languages to capture additional functionality and efficiency not available in a single language), or lightweight container or virtual machine deployment, and decentralized continuous microservice delivery. Microservices have many benefits that is driving rapid adoption. The benefits of microservices also drive new complexity and processing overhead that needs to be managed. Overall the benefits from an application developer's perspective outweigh the associated complexity.

In some examples, an application can be composed of microservices, where each microservice runs in its own process and communicates using protocols (e.g., an HTTP resource API, message service, remote procedure calls (RPC), JavaScript Object Notation (JSON), Thrift, or gRPC). Microservices can be independently deployed using centralized management of these services. The management system may be written in different programming languages and use different data storage technologies.

Microservices bring costs and benefits. Benefits can include easier to build and maintain application, organization around business capabilities, improved productivity and speed, flexibility in using technologies and scalability, and autonomous, cross-functional teams.

Cloud service providers (CSPs) are evolving their hardware platforms by offering central processing units (CPUs), general purpose graphics processing units (GPGPUs), custom XPUs, and pooled storage and memory (e.g., DDR, persistent memory, 3D XPoint, Optane, or memory devices that use chalcogenide glass). CSPs are vertically integrating these with custom orchestration control planes to expose these as services to customers. In some examples, cloud could include datacenter cloud at different locations, which can vary from on-premise enterprise, telecom cloud datacenters, or alternatively refer to edge cloud. In some examples, cloud service providers could include service providers more generally. Any of the services and microservices may be executed in edge computing settings.

Various embodiments of Infrastructure Processing Units (IPUs) described herein can be used by CSPs for performance, management, security and coordination functions in addition to infrastructure offload and communications. For example, IPUs can be integrated with smart NICs and storage or memory (e.g., on a same die, system on chip (SoC), or connected dies) that are located at on-premises systems, base stations, gateways, neighborhood central offices, and so forth.

Various examples of an IPU can perform an application composed of microservices, where each microservice runs in its own process and communicates using protocols (e.g., an HTTP resource API, message service or gRPC). Microservices can be independently deployed using centralized management of these services. A management system may be written in different programming languages and use different data storage technologies.

Example Environments for Use of Infrastructure Processing Units

FIG. 1 depicts a data center in which disaggregated resources may cooperatively execute one or more workloads (e.g., applications on behalf of customers) includes multiple pods 110, 70, 130, 80, a pod being or including one or more rows of racks. Of course, although data center 100 is shown with multiple pods, in some embodiments, the data center 100 may be embodied as a single pod. As described in more detail herein, each rack houses multiple nodes, some of which may be equipped with one or more type of resources (e.g., memory devices, data storage devices, accelerator devices, general purpose processors). Resources can be logically coupled to form a composed node or composite node, which can act as, for example, a server to perform a job, workload or microservices. In the illustrative embodiment, the nodes in each pod 110, 70, 130, 80 are connected to multiple pod switches (e.g., switches that route data communications to and from nodes within the pod). The pod switches, in turn, connect with spine switches 90 that switch communications among pods (e.g., the pods 110, 70, 130, 80) in the data center 100. In some embodiments, the nodes may be connected with a fabric using Intel® OmniPath technology. In other embodiments, the nodes may be connected with other fabrics, such as InfiniBand or Ethernet. As described in more detail herein, resources within nodes in the data center 100 may be allocated to a group (referred to herein as a "managed node") containing resources from one or more nodes to be collectively utilized in the execution of a workload. The workload can execute as if the resources belonging to the managed node were located on the same node. The resources in a managed node may belong to nodes belonging to different racks, and even to different pods 110, 70, 130, 80. As such, some resources of a single node may be allocated to one managed node while other resources of the same node are allocated to a different managed node (e.g., one processor assigned to one managed node and another processor of the same node assigned to a different managed node).

A data center comprising disaggregated resources, such as data center 100, can be used in a wide variety of contexts, such as enterprise, government, cloud service provider, and communications service provider (e.g., Telcos), as well in a wide variety of sizes, from cloud service provider mega-data centers that consume over 60,000 sq. ft. to single- or multi-rack installations for use in base stations.

The disaggregation of resources to nodes comprised predominantly of a single type of resource (e.g., compute nodes comprising primarily compute resources, memory nodes containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because nodes predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute nodes. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
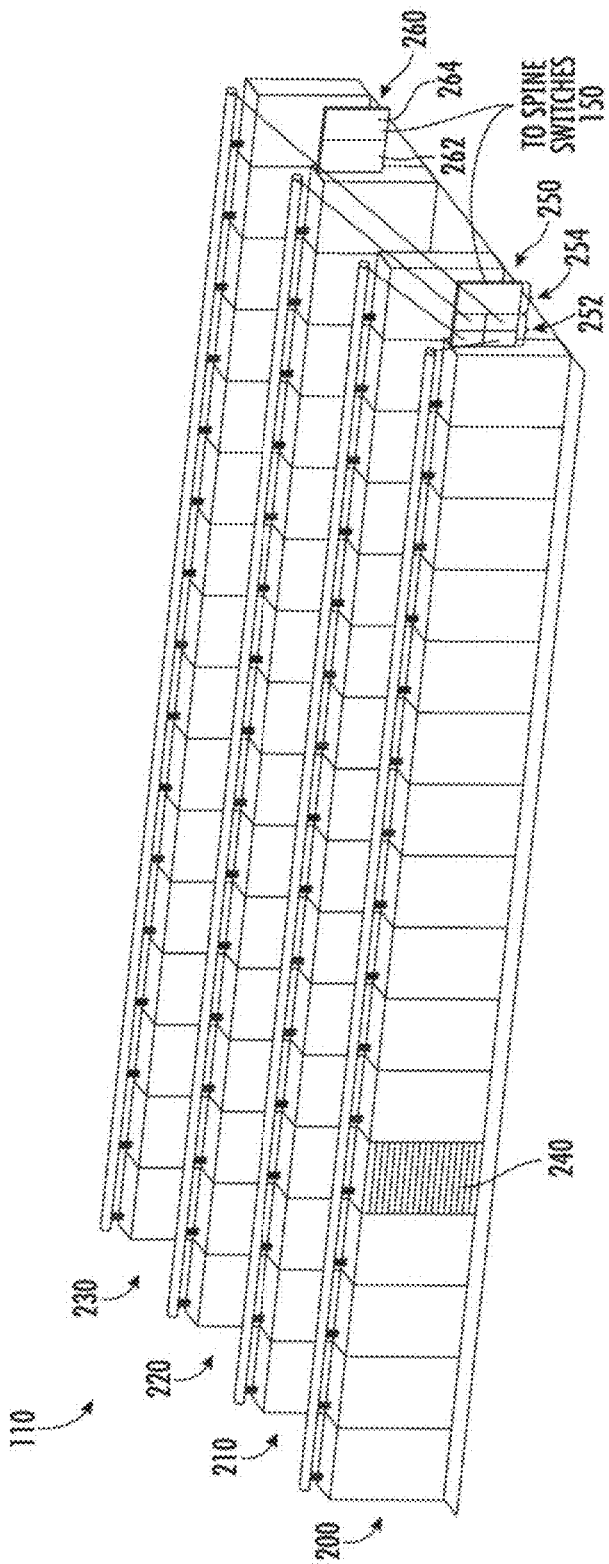
FIG. 2 is a simplified diagram of at least one embodiment of a pod that may be included in a data center.

FIG. 2 depicts a pod. A pod can include a set of rows 200, 210, 220, 230 of racks 240. Each rack 240 may house multiple nodes (e.g., sixteen nodes) and provide power and data connections to the housed nodes, as described in more detail herein. In the illustrative embodiment, the racks in each row 200, 210, 220, 230 are connected to multiple pod switches 250, 260. The pod switch 250 includes a set of ports 252 to which the nodes of the racks of the pod 110 are connected and another set of ports 254 that connect the pod 110 to the spine switches 90 to provide connectivity to other pods in the data center 100. Similarly, the pod switch 260 includes a set of ports 262 to which the nodes of the racks of the pod 110 are connected and a set of ports 264 that connect the pod 110 to the spine switches 90. As such, the use of the pair of switches 250, 260 provides an amount of redundancy to the pod 110. For example, if either of the switches 250, 260 fails, the nodes in the pod 110 may still maintain data communication with the remainder of the data center 100 (e.g., nodes of other pods) through the other switch 250, 260. Furthermore, in the illustrative embodiment, the switches 90, 250, 260 may be embodied as dual-mode optical switches, capable of routing both Ethernet protocol communications carrying Internet Protocol (IP) packets and communications according to a second, high-performance link-layer protocol (e.g., PCI Express or Compute Express Link) via optical signaling media of an optical fabric.

It should be appreciated that each of the other pods 70, 130, 80 (as well as any additional pods of the data center 100) may be similarly structured as, and have components similar to, the pod 110 shown in and described in regard to FIG. 2 (e.g., each pod may have rows of racks housing multiple nodes as described above). Additionally, while two pod switches 250, 260 are shown, it should be understood that in other embodiments, each pod 110, 70, 130, 80 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, e.g., the racks are equidistant from a center switch.

Figure 3:
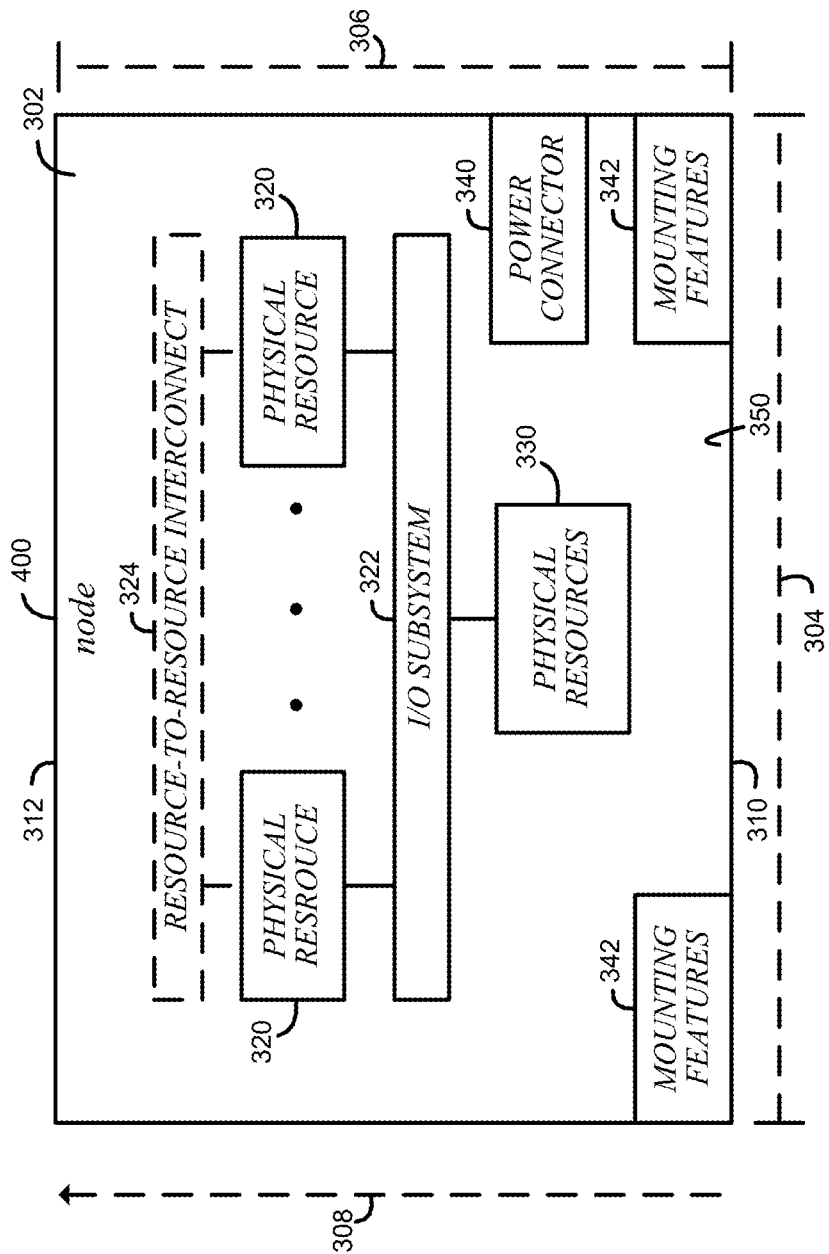
FIG. 3 is a simplified block diagram of at least one embodiment of a top side of a node.

Referring now to FIG. 3, node 400, in the illustrative embodiment, is configured to be mounted in a corresponding rack 240 of the data center 100 as discussed above. In some embodiments, each node 400 may be optimized or otherwise configured for performing particular tasks, such as compute tasks, acceleration tasks, data storage tasks, etc. For example, the node 400 may be embodied as a compute node 500 as discussed below in regard to FIG. 5, an accelerator node 600 as discussed below in regard to FIG. 6, a storage node 700 as discussed below in regard to FIG. 7, or as a node optimized or otherwise configured to perform other specialized tasks, such as a memory node 800, discussed below in regard to FIG. 8.

As discussed above, the illustrative node 400 includes a circuit board substrate 302, which supports various physical resources (e.g., electrical components) mounted thereon.

As discussed above, the illustrative node 400 includes one or more physical resources 320 mounted to a top side 350 of the circuit board substrate 302. Although two physical resources 320 are shown in FIG. 3, it should be appreciated that the node 400 may include one, two, or more physical resources 320 in other embodiments. The physical resources 320 may be embodied as any type of processor, controller, or other compute circuit capable of performing various tasks such as compute functions and/or controlling the functions of the node 400 depending on, for example, the type or intended functionality of the node 400. For example, as discussed in more detail below, the physical resources 320 may be embodied as high-performance processors in embodiments in which the node 400 is embodied as a compute node, as accelerator co-processors or circuits in embodiments in which the node 400 is embodied as an accelerator node, storage controllers in embodiments in which the node 400 is embodied as a storage node, or a set of memory devices in embodiments in which the node 400 is embodied as a memory node.

The node 400 also includes one or more additional physical resources 330 mounted to the top side 350 of the circuit board substrate 302. In the illustrative embodiment, the additional physical resources include a network interface controller (NIC) as discussed in more detail below. Of course, depending on the type and functionality of the node 400, the physical resources 330 may include additional or other electrical components, circuits, and/or devices in other embodiments.

The physical resources 320 can be communicatively coupled to the physical resources 330 via an input/output (I/O) subsystem 322. The I/O subsystem 322 may be embodied as circuitry and/or components to facilitate input/output operations with the physical resources 320, the physical resources 330, and/or other components of the node 400. For example, the I/O subsystem 322 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 322 is embodied as, or otherwise includes, a double data rate 4 (DDR4) data bus or a DDR5 data bus.

In some embodiments, the node 400 may also include a resource-to-resource interconnect 324. The resource-to-resource interconnect 324 may be embodied as any type of communication interconnect capable of facilitating resource-to-resource communications. In the illustrative embodiment, the resource-to-resource interconnect 324 is embodied as a high-speed point-to-point interconnect (e.g., faster than the I/O subsystem 322). For example, the resource-to-resource interconnect 324 may be embodied as a QuickPath Interconnect (QPI), an UltraPath Interconnect (UPI), PCI express (PCIe), or other high-speed point-to-point interconnect dedicated to resource-to-resource communications.

The node 400 also includes a power connector 340 configured to mate with a corresponding power connector of the rack 240 when the node 400 is mounted in the corresponding rack 240. The node 400 receives power from a power supply of the rack 240 via the power connector 340 to supply power to the various electrical components of the node 400. That is, the node 400 does not include any local power supply (e.g., an on-board power supply) to provide power to the electrical components of the node 400. The exclusion of a local or on-board power supply facilitates the reduction in the overall footprint of the circuit board substrate 302, which may increase the thermal cooling characteristics of the various electrical components mounted on the circuit board substrate 302 as discussed above. In some embodiments, voltage regulators are placed on a bottom side 450 (see FIG. 4) of the circuit board substrate 302 directly opposite of the processors 520 (see FIG. 5), and power is routed from the voltage regulators to the processors 520 by vias extending through the circuit board substrate 302. Such a configuration provides an increased thermal budget, additional current and/or voltage, and better voltage control relative to typical printed circuit boards in which processor power is delivered from a voltage regulator, in part, by printed circuit traces.

In some embodiments, the node 400 may also include mounting features 342 configured to mate with a mounting arm, or other structure, of a robot to facilitate the placement of the node 300 in a rack 240 by the robot. The mounting features 342 may be embodied as any type of physical structures that allow the robot to grasp the node 400 without damaging the circuit board substrate 302 or the electrical components mounted thereto. For example, in some embodiments, the mounting features 342 may be embodied as non-conductive pads attached to the circuit board substrate 302. In other embodiments, the mounting features may be embodied as brackets, braces, or other similar structures attached to the circuit board substrate 302. The particular number, shape, size, and/or make-up of the mounting feature 342 may depend on the design of the robot configured to manage the node 400.

Figure 4:
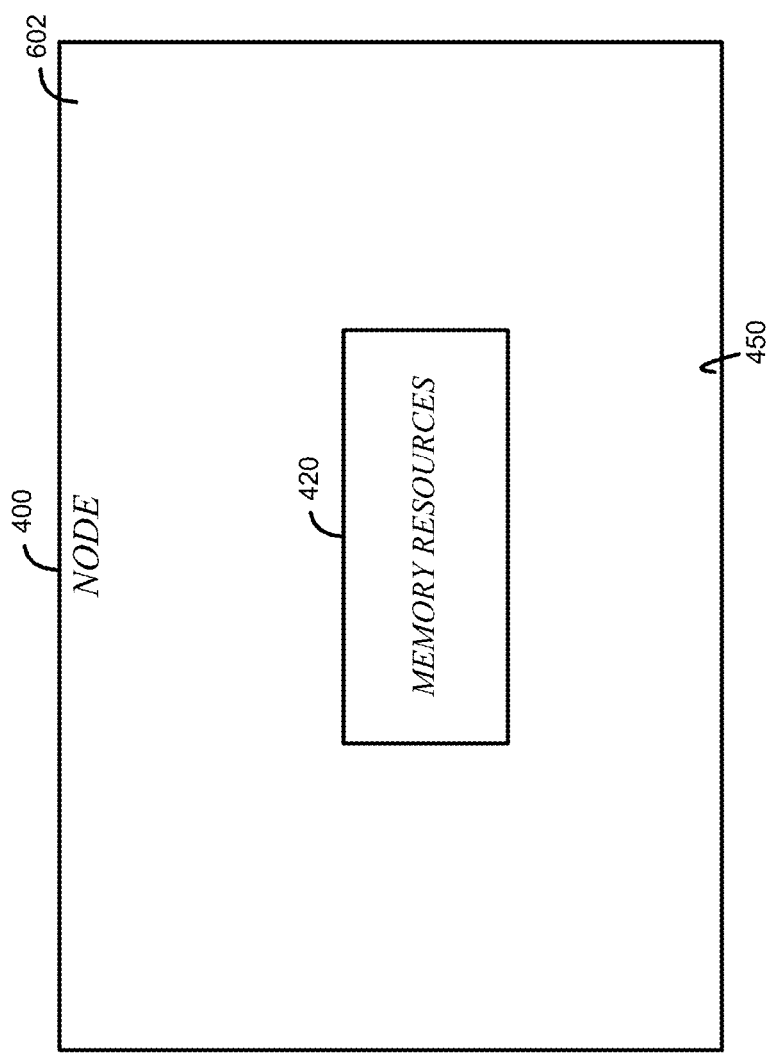
FIG. 4 is a simplified block diagram of at least one embodiment of a bottom side of a node.

Referring now to FIG. 4, in addition to the physical resources 330 mounted on the top side 350 of the circuit board substrate 302, the node 400 also includes one or more memory devices 420 mounted to a bottom side 450 of the circuit board substrate 302. That is, the circuit board substrate 302 can be embodied as a double-sided circuit board. The physical resources 320 can be communicatively coupled to memory devices 420 via the I/O subsystem 322. For example, the physical resources 320 and the memory devices 420 may be communicatively coupled by one or more vias extending through the circuit board substrate 302. A physical resource 320 may be communicatively coupled to a different set of one or more memory devices 420 in some embodiments. Alternatively, in other embodiments, each physical resource 320 may be communicatively coupled to each memory device 420.

The memory devices 420 may be embodied as any type of memory device capable of storing data for the physical resources 320 during operation of the node 400, such as any type of volatile (e.g., dynamic random access memory (DRAM), etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A block can be any size such as but not limited to 2 KB, 4 KB, 5 KB, and so forth. A memory device may also include next-generation nonvolatile devices, such as Intel Optane® memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Figure 5:
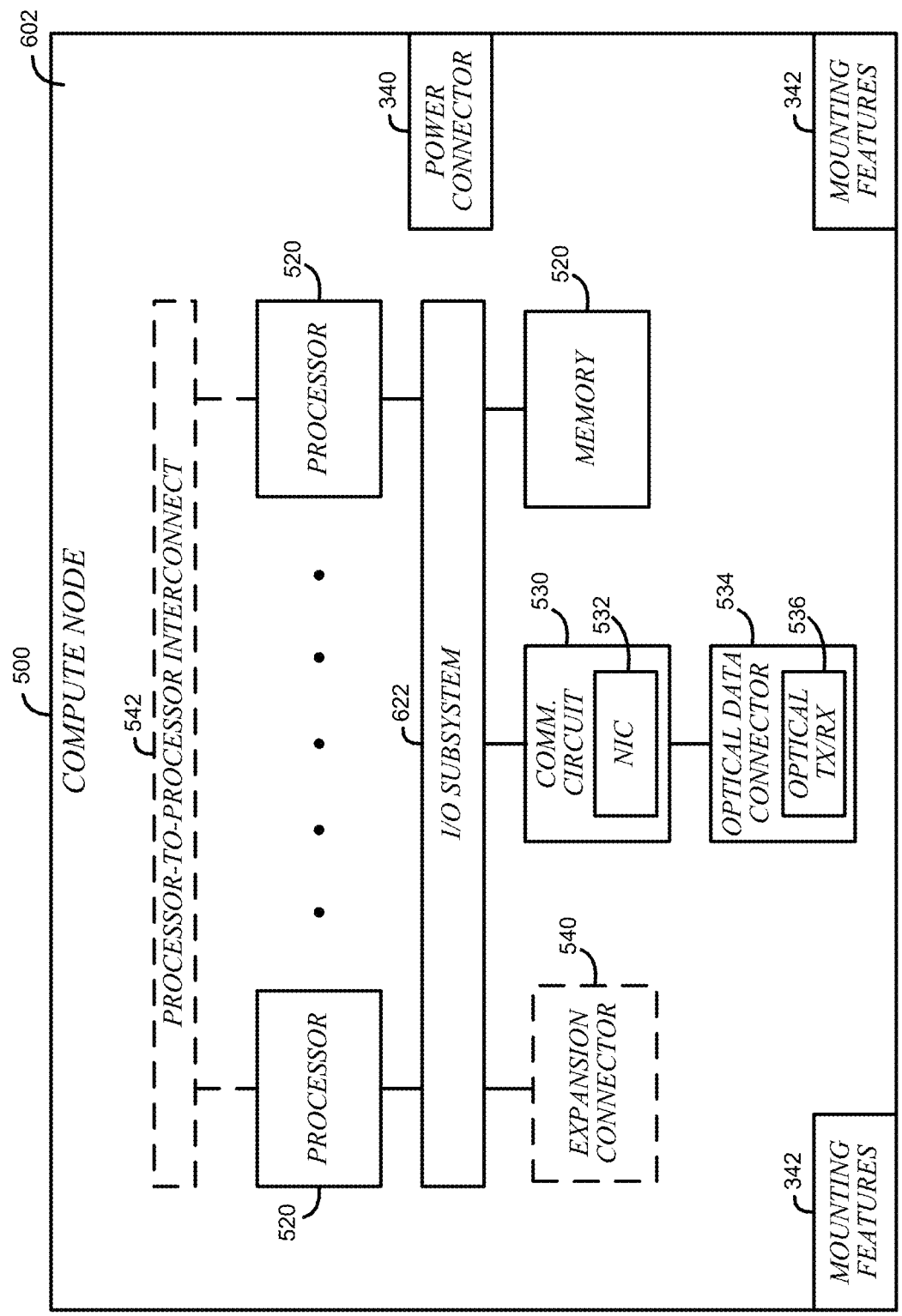
FIG. 5 is a simplified block diagram of at least one embodiment of a compute node.

Referring now to FIG. 5, in some embodiments, the node 400 may be embodied as a compute node 500. The compute node 500 can be configured to perform compute tasks. Of course, as discussed above, the compute node 500 may rely on other nodes, such as acceleration nodes and/or storage nodes, to perform compute tasks.

In the illustrative compute node 500, the physical resources 320 are embodied as processors 520. Although only two processors 520 are shown in FIG. 5, it should be appreciated that the compute node 500 may include additional processors 520 in other embodiments. Illustratively, the processors 520 are embodied as high-performance processors 520 and may be configured to operate at a relatively high power rating.

In some embodiments, the compute node 500 may also include a processor-to-processor interconnect 542. Processor-to-processor interconnect 542 may be embodied as any type of communication interconnect capable of facilitating processor-to-processor interconnect 542 communications. In the illustrative embodiment, the processor-to-processor interconnect 542 is embodied as a high-speed point-to-point interconnect (e.g., faster than the I/O subsystem 322). For example, the processor-to-processor interconnect 542 may be embodied as a QuickPath Interconnect (QPI), an UltraPath Interconnect (UPI), or other high-speed point-to-point interconnect dedicated to processor-to-processor communications (e.g., PCIe or CXL).

The compute node 500 also includes a communication circuit 530. The illustrative communication circuit 530 includes a network interface controller (NIC) 532, which may also be referred to as a host fabric interface (HFI). The NIC 532 may be embodied as, or otherwise include, any type of integrated circuit, discrete circuits, controller chips, chipsets, add-in-boards, daughtercards, network interface cards, or other devices that may be used by the compute node 500 to connect with another compute device (e.g., with other nodes 400). In some embodiments, the NIC 532 may be embodied as part of a system-on-a-chip (SoC) that includes one or more processors, or included on a multichip package that also contains one or more processors. In some embodiments, the NIC 532 may include a local processor (not shown) and/or a local memory (not shown) that are both local to the NIC 532. In such embodiments, the local processor of the NIC 532 may be capable of performing one or more of the functions of the processors 520. Additionally or alternatively, in such embodiments, the local memory of the NIC 532 may be integrated into one or more components of the compute node at the board level, socket level, chip level, and/or other levels. In some examples, a network interface includes a network interface controller or a network interface card. In some examples, a network interface can include one or more of a network interface controller (NIC) 532, a host fabric interface (HFI), a host bus adapter (HBA), network interface connected to a bus or connection (e.g., PCIe, CXL, DDR, and so forth). In some examples, a network interface can be part of a switch or a system-on-chip (SoC).

The communication circuit 530 is communicatively coupled to an optical data connector 534. The optical data connector 534 is configured to mate with a corresponding optical data connector of a rack when the compute node 500 is mounted in the rack. Illustratively, the optical data connector 534 includes a plurality of optical fibers which lead from a mating surface of the optical data connector 534 to an optical transceiver 536. The optical transceiver 536 is configured to convert incoming optical signals from the rack-side optical data connector to electrical signals and to convert electrical signals to outgoing optical signals to the rack-side optical data connector. Although shown as forming part of the optical data connector 534 in the illustrative embodiment, the optical transceiver 536 may form a portion of the communication circuit 530 in other embodiments.

In some embodiments, the compute node 500 may also include an expansion connector 540. In such embodiments, the expansion connector 540 is configured to mate with a corresponding connector of an expansion circuit board substrate to provide additional physical resources to the compute node 500. The additional physical resources may be used, for example, by the processors 520 during operation of the compute node 500. The expansion circuit board substrate may be substantially similar to the circuit board substrate 302 discussed above and may include various electrical components mounted thereto. The particular electrical components mounted to the expansion circuit board substrate may depend on the intended functionality of the expansion circuit board substrate. For example, the expansion circuit board substrate may provide additional compute resources, memory resources, and/or storage resources. As such, the additional physical resources of the expansion circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 6:
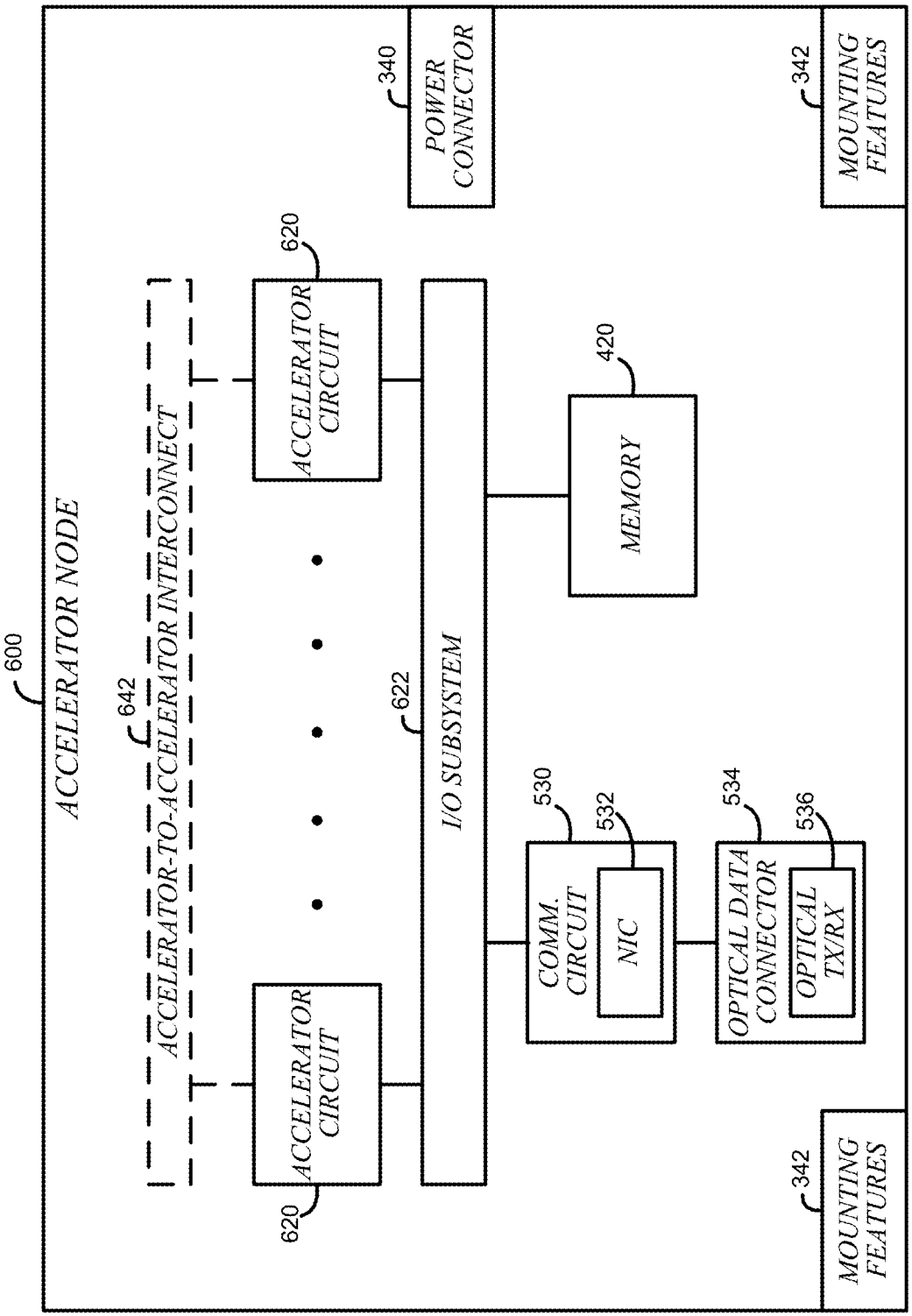
FIG. 6 is a simplified block diagram of at least one embodiment of an accelerator node usable in a data center.

Referring now to FIG. 6, in some embodiments, the node 400 may be embodied as an accelerator node 600. The accelerator node 600 is configured to perform specialized compute tasks, such as machine learning, encryption, hashing, or other computational-intensive task. In some embodiments, for example, a compute node 500 may offload tasks to the accelerator node 600 during operation. The accelerator node 600 includes various components similar to components of the node 400 and/or compute node 500, which have been identified in FIG. 6 using the same reference numbers.

In the illustrative accelerator node 600, the physical resources 320 are embodied as accelerator circuits 620. Although only two accelerator circuits 620 are shown in FIG. 6, it should be appreciated that the accelerator node 600 may include additional accelerator circuits 620 in other embodiments. The accelerator circuits 620 may be embodied as any type of processor, co-processor, compute circuit, or other device capable of performing compute or processing operations. For example, the accelerator circuits 620 may be embodied as, for example, central processing units, cores, field programmable gate arrays (FPGA), application-specific integrated circuits (ASICs), programmable control logic (PCL), security co-processors, graphics processing units (GPUs), neuromorphic processor units, quantum computers, machine learning circuits, or other specialized processors, controllers, devices, and/or circuits.

In some embodiments, the accelerator node 600 may also include an accelerator-to-accelerator interconnect 642. Similar to the resource-to-resource interconnect 324 of the node 300 discussed above, the accelerator-to-accelerator interconnect 642 may be embodied as any type of communication interconnect capable of facilitating accelerator-to-accelerator communications. In the illustrative embodiment, the accelerator-to-accelerator interconnect 642 is embodied as a high-speed point-to-point interconnect (e.g., faster than the I/O subsystem 322). For example, the accelerator-to-accelerator interconnect 642 may be embodied as a QuickPath Interconnect (QPI), an UltraPath Interconnect (UPI), or other high-speed point-to-point interconnect dedicated to processor-to-processor communications. In some embodiments, the accelerator circuits 620 may be daisy-chained with a primary accelerator circuit 620 connected to the NIC 532 and memory 420 through the I/O subsystem 322 and a secondary accelerator circuit 620 connected to the NIC 532 and memory 420 through a primary accelerator circuit 620.

Figure 7:
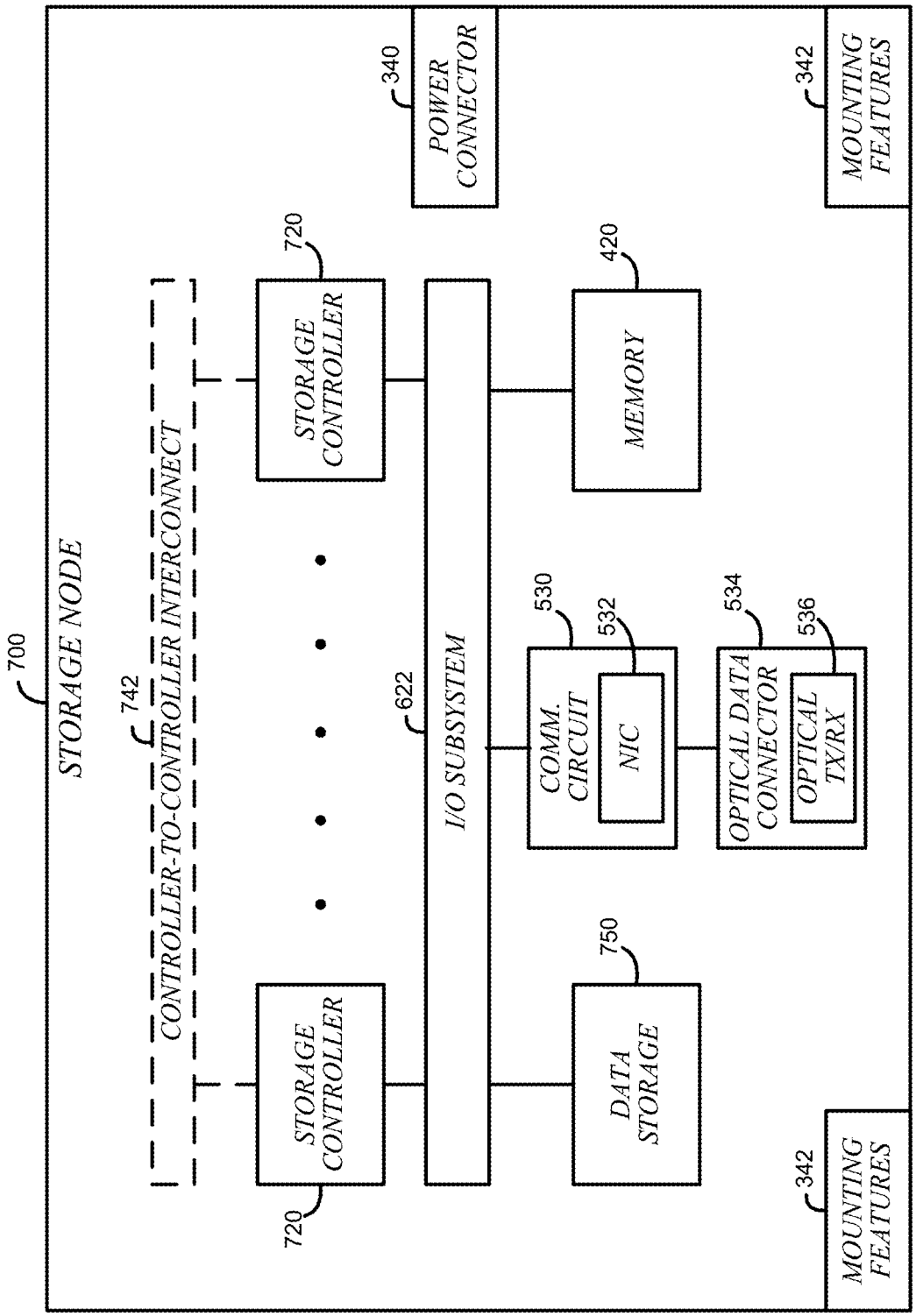
FIG. 7 is a simplified block diagram of at least one embodiment of a storage node usable in a data center.

Referring now to FIG. 7, in some embodiments, the node 400 may be embodied as a storage node 700. The storage node 700 is configured, to store data in a data storage 750 local to the storage node 700. For example, during operation, a compute node 500 or an accelerator node 600 may store and retrieve data from the data storage 750 of the storage node 700. The storage node 700 includes various components similar to components of the node 400 and/or the compute node 500, which have been identified in FIG. 7 using the same reference numbers.

In the illustrative storage node 700, the physical resources 320 are embodied as storage controllers 420. Although only two storage controllers 420 are shown in FIG. 7, it should be appreciated that the storage node 700 may include additional storage controllers 420 in other embodiments. The storage controllers 420 may be embodied as any type of processor, controller, or control circuit capable of controlling the storage and retrieval of data into the data storage 750 based on requests received via the communication circuit 530. In the illustrative embodiment, the storage controllers 420 are embodied as relatively low-power processors or controllers. For example, in some embodiments, the storage controllers 420 may be configured to operate at a power rating of about 75 watts.

In some embodiments, the storage node 700 may also include a controller-to-controller interconnect 742. Similar to the resource-to-resource interconnect 324 of the node 400 discussed above, the controller-to-controller interconnect 742 may be embodied as any type of communication interconnect capable of facilitating controller-to-controller communications. In the illustrative embodiment, the controller-to-controller interconnect 742 is embodied as a high-speed point-to-point interconnect (e.g., faster than the I/O subsystem 322). For example, the controller-to-controller interconnect 742 may be embodied as a QuickPath Interconnect (QPI), an UltraPath Interconnect (UPI), or other high-speed point-to-point interconnect dedicated to processor-to-processor communications.

Figure 8:
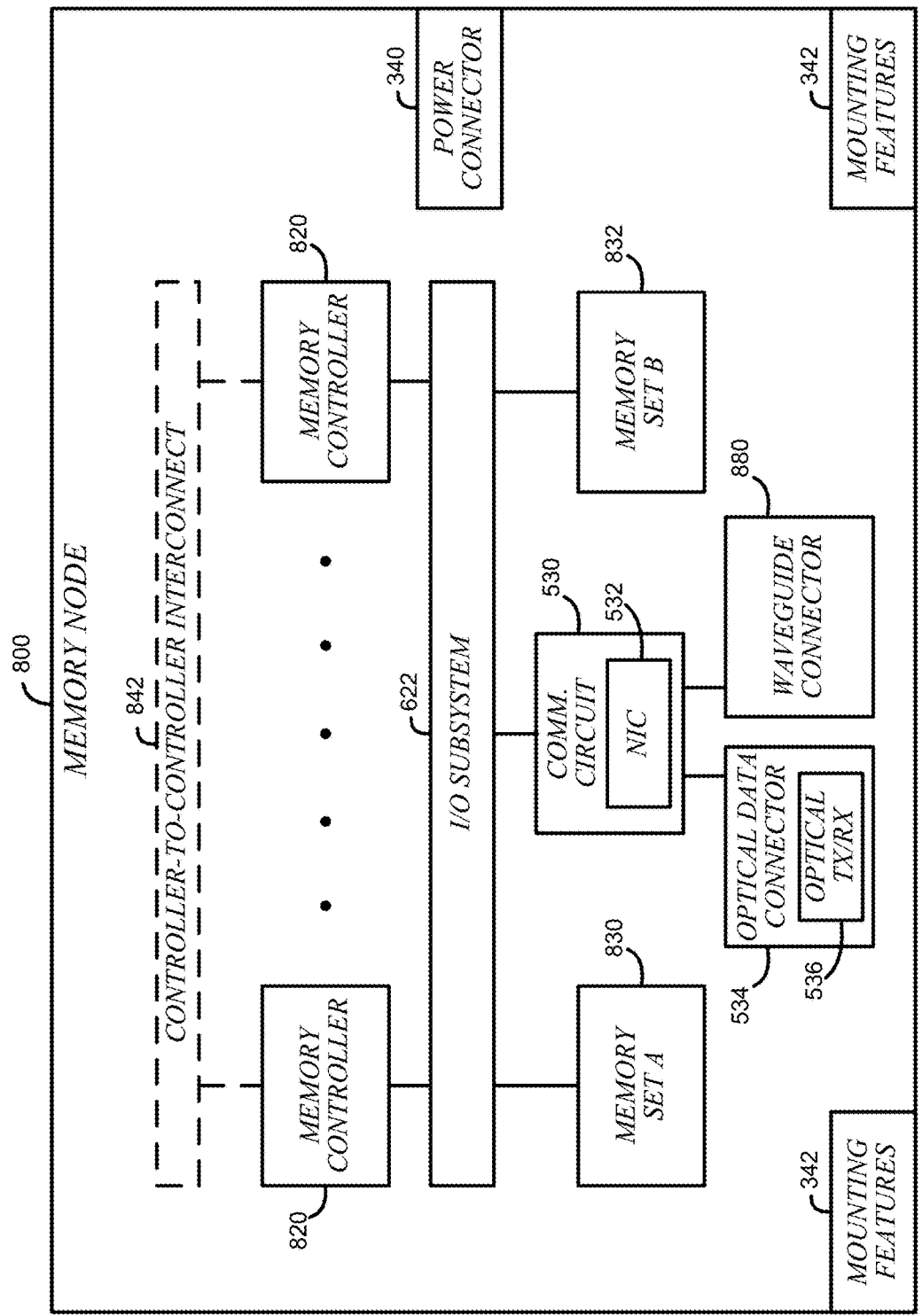
FIG. 8 is a simplified block diagram of at least one embodiment of a memory node usable in a data center.

Referring now to FIG. 8, in some embodiments, the node 400 may be embodied as a memory node 800. The memory node 800 is configured to provide other nodes 400 (e.g., compute nodes 500, accelerator nodes 600, etc.) with access to a pool of memory (e.g., in two or more sets 830, 832 of memory devices 420) local to the storage node 700. For example, during operation, a compute node 500 or an accelerator node 600 may remotely write to and/or read from one or more of the memory sets 830, 832 of the memory node 800 using a logical address space that maps to physical addresses in the memory sets 830, 832.

In the illustrative memory node 800, the physical resources 320 are embodied as memory controllers 820. Although only two memory controllers 820 are shown in FIG. 8, it should be appreciated that the memory node 800 may include additional memory controllers 820 in other embodiments. The memory controllers 820 may be embodied as any type of processor, controller, or control circuit capable of controlling the writing and reading of data into the memory sets 830, 832 based on requests received via the communication circuit 530. In the illustrative embodiment, each memory controller 820 is connected to a corresponding memory set 830, 832 to write to and read from memory devices 420 within the corresponding memory set 830, 832 and enforce any permissions (e.g., read, write, etc.) associated with node 400 that has sent a request to the memory node 800 to perform a memory access operation (e.g., read or write).

In some embodiments, the memory node 800 may also include a controller-to-controller interconnect 842. Similar to the resource-to-resource interconnect 324 of the node 400 discussed above, the controller-to-controller interconnect 842 may be embodied as any type of communication interconnect capable of facilitating controller-to-controller communications. In the illustrative embodiment, the controller-to-controller interconnect 842 is embodied as a high-speed point-to-point interconnect (e.g., faster than the I/O subsystem 322). For example, the controller-to-controller interconnect 842 may be embodied as a QuickPath Interconnect (QPI), an UltraPath Interconnect (UPI), or other high-speed point-to-point interconnect dedicated to processor-to-processor communications. As such, in some embodiments, a memory controller 820 may access, through the controller-to-controller interconnect 842, memory that is within the memory set 832 associated with another memory controller 820. In some embodiments, a scalable memory controller is made of multiple smaller memory controllers, referred to herein as "chiplets", on a memory node (e.g., the memory node 800). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 820 may implement a memory interleave (e.g., one memory address is mapped to the memory set 830, the next memory address is mapped to the memory set 832, and the third address is mapped to the memory set 830, etc.). The interleaving may be managed within the memory controllers 820, or from CPU sockets (e.g., of the compute node 500) across network links to the memory sets 830, 832, and may improve the latency associated with performing memory access operations as compared to accessing contiguous memory addresses from the same memory device.

Further, in some embodiments, the memory node 800 may be connected to one or more other nodes 400 (e.g., in the same rack 240 or an adjacent rack 240) through a waveguide, using the waveguide connector 880. In the illustrative embodiment, the waveguides are 64 millimeter waveguides that provide 16 Rx (e.g., receive) lanes and 16 Tx (e.g., transmit) lanes. Each lane, in the illustrative embodiment, is either 16 GHz or 32 GHz. In other embodiments, the frequencies may be different. Using a waveguide may provide high throughput access to the memory pool (e.g., the memory sets 830, 832) to another node (e.g., a node 400 in the same rack 240 or an adjacent rack 240 as the memory node 800) without adding to the load on the optical data connector 534.

Figure 9:
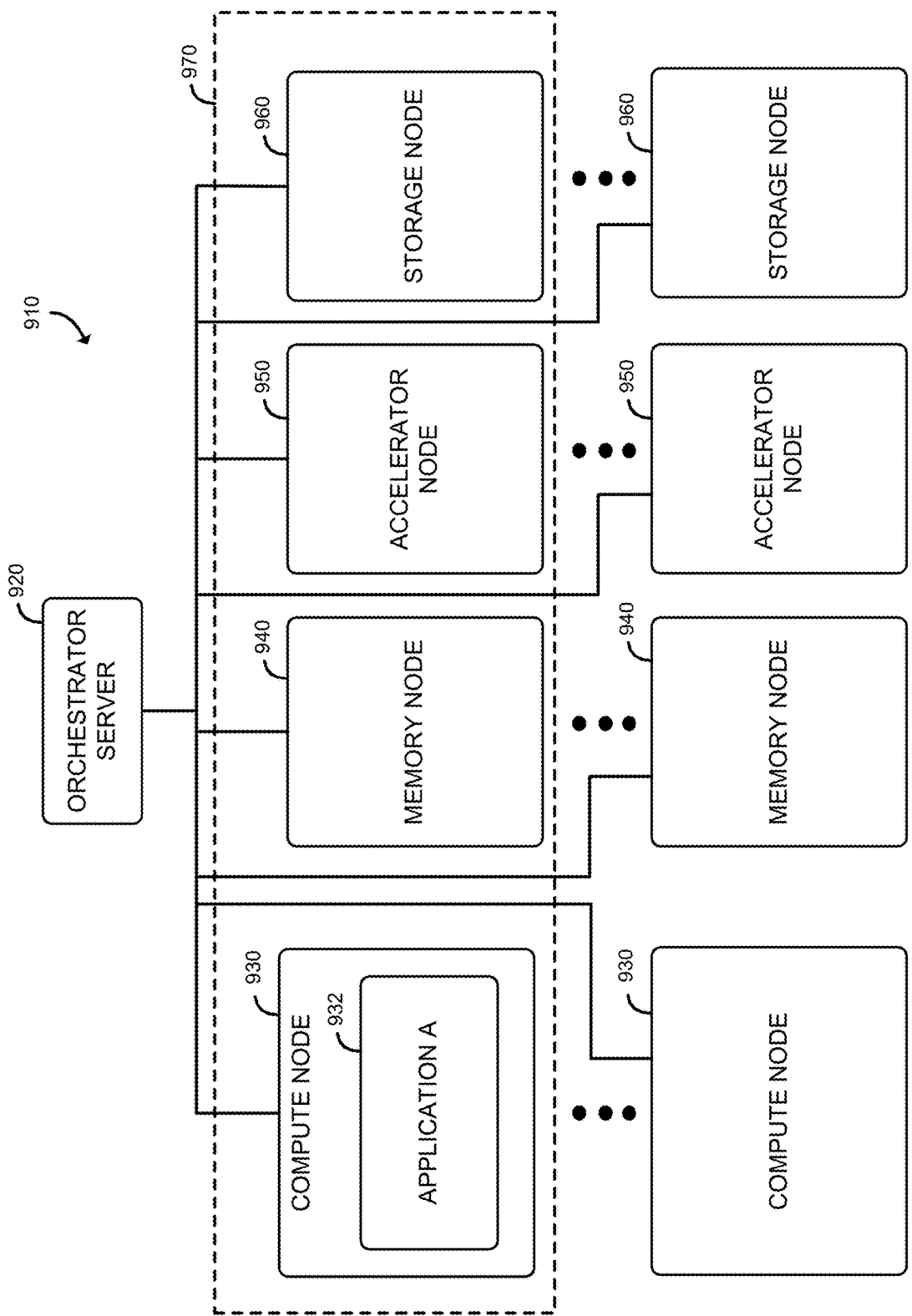
FIG. 9 depicts a system for executing one or more workloads.

Referring now to FIG. 9, a system for executing one or more workloads (e.g., applications) may be implemented. In the illustrative embodiment, the system 910 includes an orchestrator server 920, which may be embodied as a managed node comprising a compute device (e.g., a processor 520 on a compute node 500) executing management software (e.g., a cloud operating environment, such as OpenStack) that is communicatively coupled to multiple nodes 400 including a large number of compute nodes 930 (e.g., each similar to the compute node 500), memory nodes 940 (e.g., each similar to the memory node 800), accelerator nodes 950 (e.g., each similar to the memory node 600), and storage nodes 960 (e.g., each similar to the storage node 700). One or more of the nodes 930, 940, 950, 960 may be grouped into a managed node 970, such as by the orchestrator server 920, to collectively perform a workload (e.g., an application 932 executed in a virtual machine or in a container).

The managed node 970 may be embodied as an assembly of physical resources 320, such as processors 520, memory resources 420, accelerator circuits 620, or data storage 750, from the same or different nodes 400. Further, the managed node may be established, defined, or "spun up" by the orchestrator server 920 at the time a workload is to be assigned to the managed node or at any other time, and may exist regardless of whether any workloads are presently assigned to the managed node. In the illustrative embodiment, the orchestrator server 920 may selectively allocate and/or deallocate physical resources 320 from the nodes 400 and/or add or remove one or more nodes 400 from the managed node 970 as a function of quality of service (QoS) targets (e.g., a target throughput, a target latency, a target number instructions per second, etc.) associated with a service level agreement for the workload (e.g., the application 932). In doing so, the orchestrator server 920 may receive telemetry data indicative of performance conditions (e.g., throughput, latency, instructions per second, etc.) in each node 400 of the managed node 970 and compare the telemetry data to the quality of service targets to determine whether the quality of service targets are being satisfied. The orchestrator server 920 may additionally determine whether one or more physical resources may be deallocated from the managed node 970 while still satisfying the QoS targets, thereby freeing up those physical resources for use in another managed node (e.g., to execute a different workload). Alternatively, if the QoS targets are not presently satisfied, the orchestrator server 920 may determine to dynamically allocate additional physical resources to assist in the execution of the workload (e.g., the application 932) while the workload is executing. Similarly, the orchestrator server 920 may determine to dynamically deallocate physical resources from a managed node if the orchestrator server 920 determines that deallocating the physical resource would result in QoS targets still being met.

Additionally, in some embodiments, the orchestrator server 920 may identify trends in the resource utilization of the workload (e.g., the application 932), such as by identifying phases of execution (e.g., time periods in which different operations, each having different resource utilizations characteristics, are performed) of the workload (e.g., the application 932) and pre-emptively identifying available resources in the data center and allocating them to the managed node 970 (e.g., within a predefined time period of the associated phase beginning). In some embodiments, the orchestrator server 920 may model performance based on various latencies and a distribution scheme to place workloads among compute nodes and other resources (e.g., accelerator nodes, memory nodes, storage nodes) in the data center. For example, the orchestrator server 920 may utilize a model that accounts for the performance of resources on the nodes 400 (e.g., FPGA performance, memory access latency, etc.) and the performance (e.g., congestion, latency, bandwidth) of the path through the network to the resource (e.g., FPGA). As such, the orchestrator server 920 may determine which resource(s) should be used with which workloads based on the total latency associated with each potential resource available in the data center 100 (e.g., the latency associated with the performance of the resource itself in addition to the latency associated with the path through the network between the compute node executing the workload and the node 400 on which the resource is located).

In some embodiments, the orchestrator server 920 may generate a map of heat generation in the data center 100 using telemetry data (e.g., temperatures, fan speeds, etc.) reported from the nodes 400 and allocate resources to managed nodes as a function of the map of heat generation and predicted heat generation associated with different workloads, to maintain a target temperature and heat distribution in the data center 100. Additionally or alternatively, in some embodiments, the orchestrator server 920 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 920 may determine the differences based on the telemetry data stored in the hierarchical model and factor the differences into a prediction of future resource utilization of a workload if the workload is reassigned from one managed node to another managed node, to accurately balance resource utilization in the data center 100. In some embodiments, the orchestrator server 920 may identify patterns in resource utilization phases of the workloads and use the patterns to predict future resource utilization of the workloads.

To reduce the computational load on the orchestrator server 920 and the data transfer load on the network, in some embodiments, the orchestrator server 920 may send self-test information to the nodes 400 to enable each node 400 to locally (e.g., on the node 400) determine whether telemetry data generated by the node 400 satisfies one or more conditions (e.g., an available capacity that satisfies a predefined threshold, a temperature that satisfies a predefined threshold, etc.). Each node 400 may then report back a simplified result (e.g., yes or no) to the orchestrator server 920, which the orchestrator server 920 may utilize in determining the allocation of resources to managed nodes.

Edge Network Environments

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

In the following description, methods, configurations, and related apparatuses are disclosed for various improvements to the configuration and functional capabilities of an edge computing architecture and an implementing edge computing system. These improvements may benefit a variety of use cases, especially those involving multiple stakeholders of the edge computing system—whether in the form of multiple users of a system, multiple tenants on a system, multiple devices or user equipment interacting with a system, multiple services being offered from a system, multiple resources being available or managed within a system, multiple forms of network access being exposed for a system, multiple locations of operation for a system, and the like. Such multi-dimensional aspects and considerations are generally referred to herein as "multi-entity" constraints, with specific discussion of resources managed or orchestrated in multi-tenant and multi-service edge computing configurations.

With the illustrative edge networking systems described below, computing and storage resources are moved closer to the edge of the network (e.g., closer to the clients, endpoint devices, or "things"). By moving the computing and storage resources closer to the device producing or using the data, various latency, compliance, and/or monetary or resource cost constraints may be achievable relative to a standard networked (e.g., cloud computing) system. To do so, in some examples, pools of compute, memory, and/or storage resources may be located in, or otherwise equipped with, local servers, routers, and/or other network equipment. Such local resources facilitate the satisfying of constraints placed on the system. For example, the local compute and storage resources allow an edge system to perform computations in real-time or near real-time, which may be a consideration in low latency user-cases such as autonomous driving, video surveillance, and mobile media consumption. Additionally, these resources will benefit from service management in an edge system which provides the ability to scale and achieve local SLAs, manage tiered service requirements, and enable local features and functions on a temporary or permanent basis.

An illustrative edge computing system may support and/or provide various services to endpoint devices (e.g., client user equipment (UEs)), each of which may have different requirements or constraints. For example, some services may have priority or quality-of-service (QoS) constraints (e.g., traffic data for autonomous vehicles may have a higher priority than temperature sensor data), reliability and resiliency (e.g., traffic data may require mission-critical reliability, while temperature data may be allowed some error variance), as well as power, cooling, and form-factor constraints. These and other technical constraints may offer significant complexity and technical challenges when applied in the multi-stakeholder setting.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud in a multi-tenant, multi-owner, or multi-access setting, where services and applications are requested by many users, especially as network usage dynamically fluctuates and the composition of the multiple stakeholders, use cases, and services changes.

Figure 10:
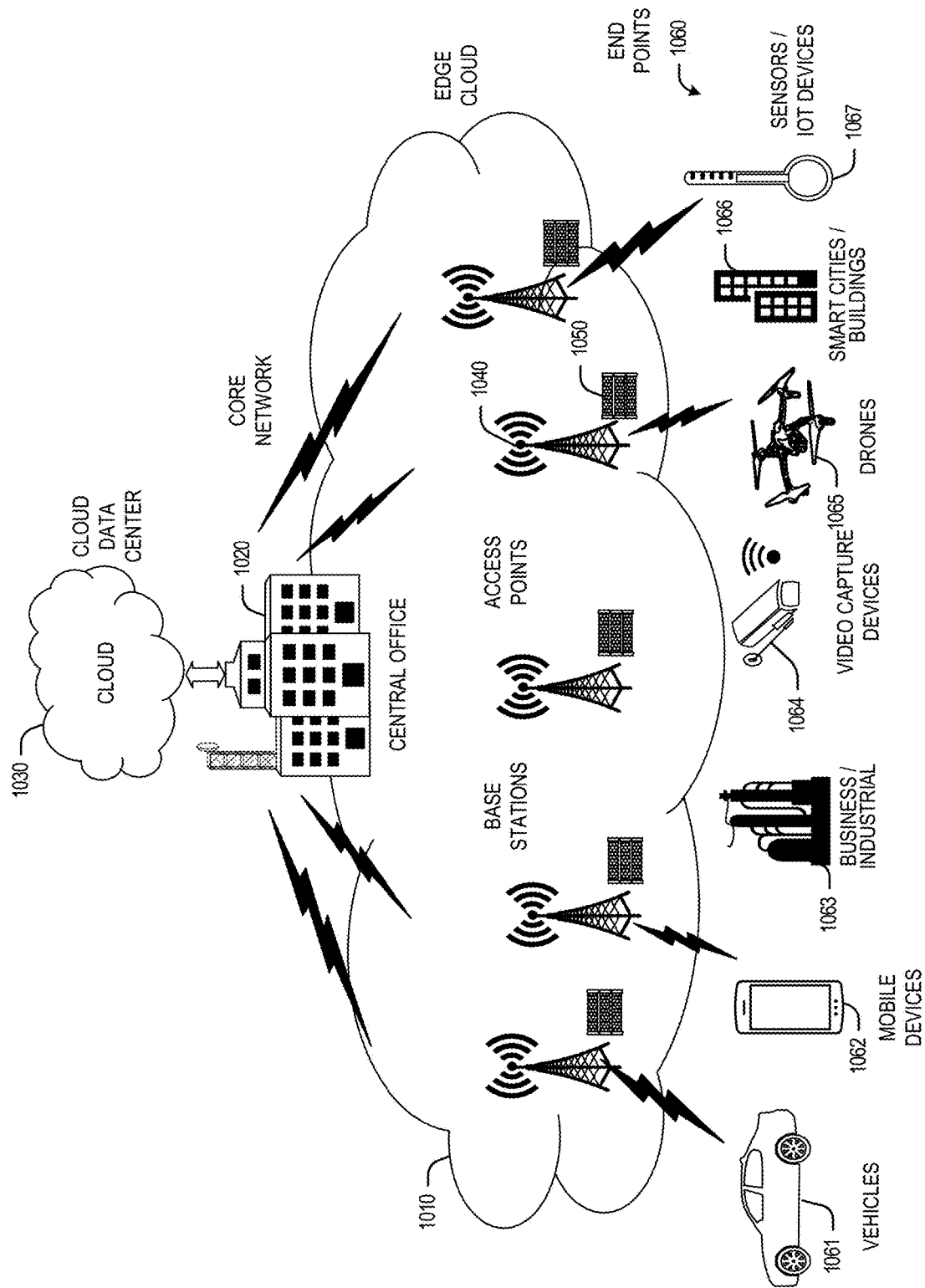
FIG. 10 depicts an example system.

FIG. 10 is a block diagram 1000 showing an overview of a configuration for edge computing, which includes a layer of processing referred to in many of the following examples as an "edge cloud". As shown, the edge cloud 1010 is co-located at an edge location, such as an access point or base station 1040, a local processing hub 1050, or a central office 1020, and thus may include multiple entities, devices, and equipment instances. The edge cloud 1010 is located much closer to the endpoint (consumer and producer) data sources 1060 (e.g., autonomous vehicles 1061, user equipment 1062, business and industrial equipment 1063, video capture devices 1064, drones 1065, smart cities and building devices 1066, sensors and IoT devices 1067, etc.) than the cloud data center 1030. Compute, memory, and storage resources which are offered at the edges in the edge cloud 1010 are critical to providing ultra-low latency response times for services and functions used by the endpoint data sources 1060 as well as reduce network backhaul traffic from the edge cloud 1010 toward cloud data center 1030 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform (e.g., x86, ARM, Nvidia or other CPU/GPU based compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Alternatively, an arrangement with hardware combined with virtualized functions, commonly referred to as a hybrid arrangement may also be successfully implemented. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 11:
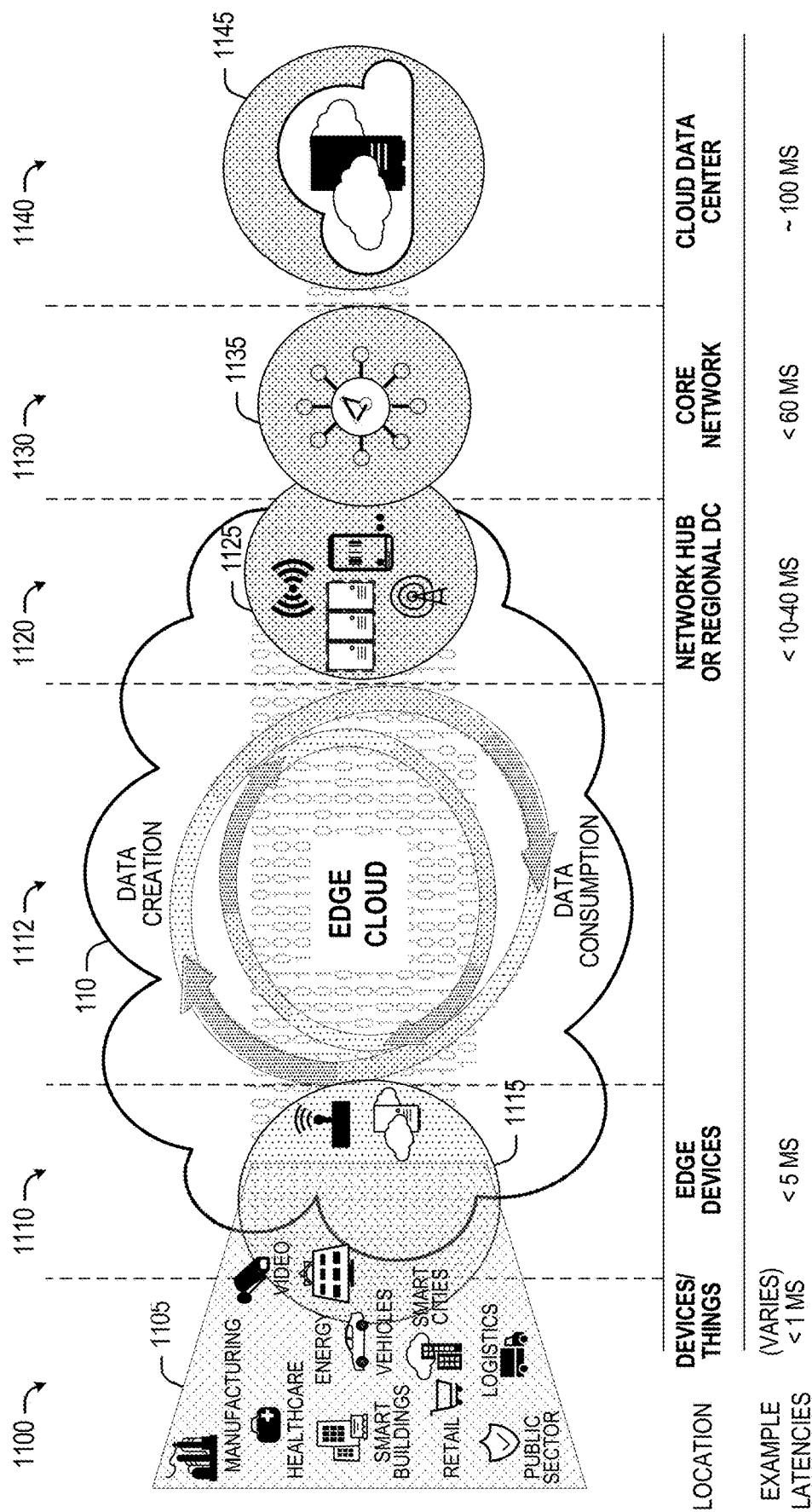
FIG. 11 shows an example system.

FIG. 11 illustrates operational layers among endpoints, an edge cloud, and cloud computing environments. Specifically, FIG. 11 depicts examples of computational use cases 1105, utilizing the edge cloud 1010 among multiple illustrative layers of network computing. The layers begin at an endpoint (devices and things) layer 1100, which accesses the edge cloud 1010 to conduct data creation, analysis, and data consumption activities. The edge cloud 1010 may span multiple network layers, such as an edge devices layer 1110 having gateways, on-premise servers, or network equipment (nodes 1115) located in physically proximate edge systems; a network access layer 1120, encompassing base stations, radio processing units, network hubs, regional data centers (DC), or local network equipment (equipment 1125); and any equipment, devices, or nodes located therebetween (in layer 1112, not illustrated in detail). The network communications within the edge cloud 1010 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1100, under 5 ms at the edge devices layer 1110, to even between 10 to 40 ms when communicating with nodes at the network access layer 1120. Beyond the edge cloud 1010 are core network 1130 and cloud data center 1140 layers, each with increasing latency (e.g., between 50-60 ms at the core network layer 1130, to 100 or more ms at the cloud data center layer). As a result, operations at a core network data center 1135 or a cloud data center 1145, with latencies of at least 50 to 100 ms or more, will not be able to accomplish many time-critical functions of the use cases 1105. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1135 or a cloud data center 1145, a central office or content data network may be considered as being located within a "near edge" layer ("near" to the cloud, having high latency values when communicating with the devices and endpoints of the use cases 1105), whereas an access point, base station, on-premise server, or network gateway may be considered as located within a "far edge" layer ("far" from the cloud, having low latency values when communicating with the devices and endpoints of the use cases 1105). It will be understood that other categorizations of a particular network layer as constituting a "close", "local", "near", "middle", or "far" edge may be based on latency, distance, number of network hops, or other measurable characteristics, as measured from a source in any of the network layers 1100-1140.

The various use cases 1105 may access resources under usage pressure from incoming streams, due to multiple services utilizing the edge cloud. To achieve results with low latency, the services executed within the edge cloud 1010 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1010 may provide the ability to serve and respond to multiple applications of the use cases 1105 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth.

Likewise, improved security of hardware and root of trust trusted functions are also required, because edge locations may be unmanned and may even need permissioned access (e.g., when housed in a third-party location). Such issues are magnified in the edge cloud 1010 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1010 (network layers 1100-1140), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1010.

As such, the edge cloud 1010 is formed from network components and functional features operated by and within edge gateway nodes, edge aggregation nodes, or other edge compute nodes among network layers 1110-1130. The edge cloud 1010 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1010 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1010 may be servers, multi-tenant servers, appliance computing devices, and/or any other type of computing devices. For example, the edge cloud 1010 may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular embodiments may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. The edge cloud 1010 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 12:
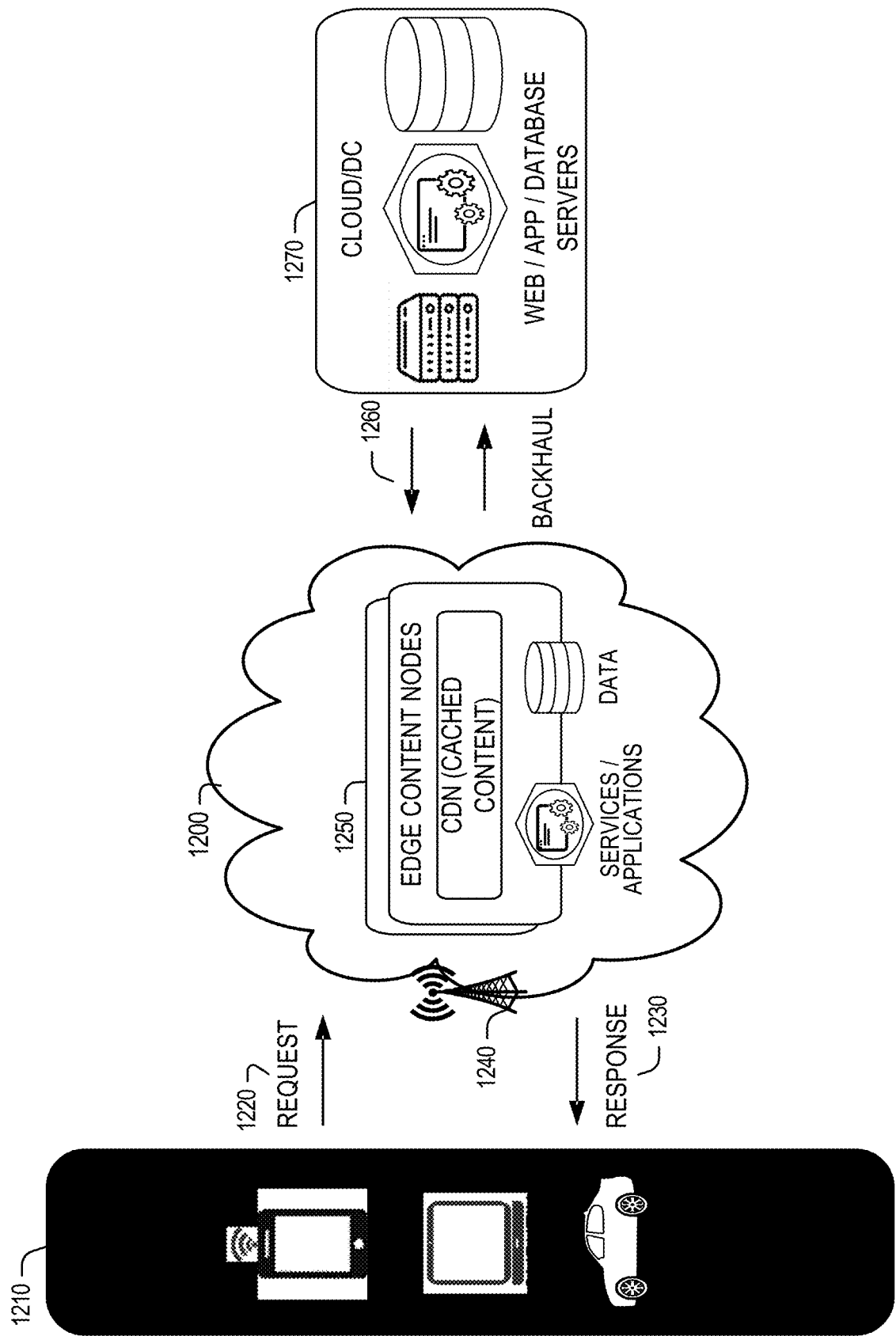
FIG. 12 depicts various client endpoints.

FIG. 12 depicts various client endpoints 1210 (in the form of mobile devices, computers, autonomous vehicles, business computing equipment, industrial processing equipment) exchange requests and responses that are specific to the type of endpoint network aggregation. For instance, client endpoints 1210 may obtain network access via a wired broadband network, by exchanging requests and responses 1222 through an on-premise network system 1232. Some client endpoints 1210, such as mobile computing devices, may obtain network access via a wireless broadband network, by exchanging requests and responses 1224 through an access point (e.g., cellular network tower) 1234. Some client endpoints 1210, such as autonomous vehicles may obtain network access for requests and responses 1226 via a wireless vehicular network through a street-located network system 1236. However, regardless of the type of network access, the TSP may deploy aggregation points 1242, 1244 within the edge cloud 1010 to aggregate traffic and requests. Thus, within the edge cloud 1010, the TSP may deploy various compute and storage resources, such as at edge aggregation nodes 1240, to provide requested content. The edge aggregation nodes 1240 and other systems of the edge cloud 1010 are connected to a cloud or data center 1260, which uses a backhaul network 1250 to fulfill higher-latency requests from a cloud/data center for websites, applications, database servers, etc. Additional or consolidated instances of the edge aggregation nodes 1240 and the aggregation points 1242, 1244, including those deployed on a single server framework, may also be present within the edge cloud 1010 or other areas of the TSP infrastructure.

Figure 13:
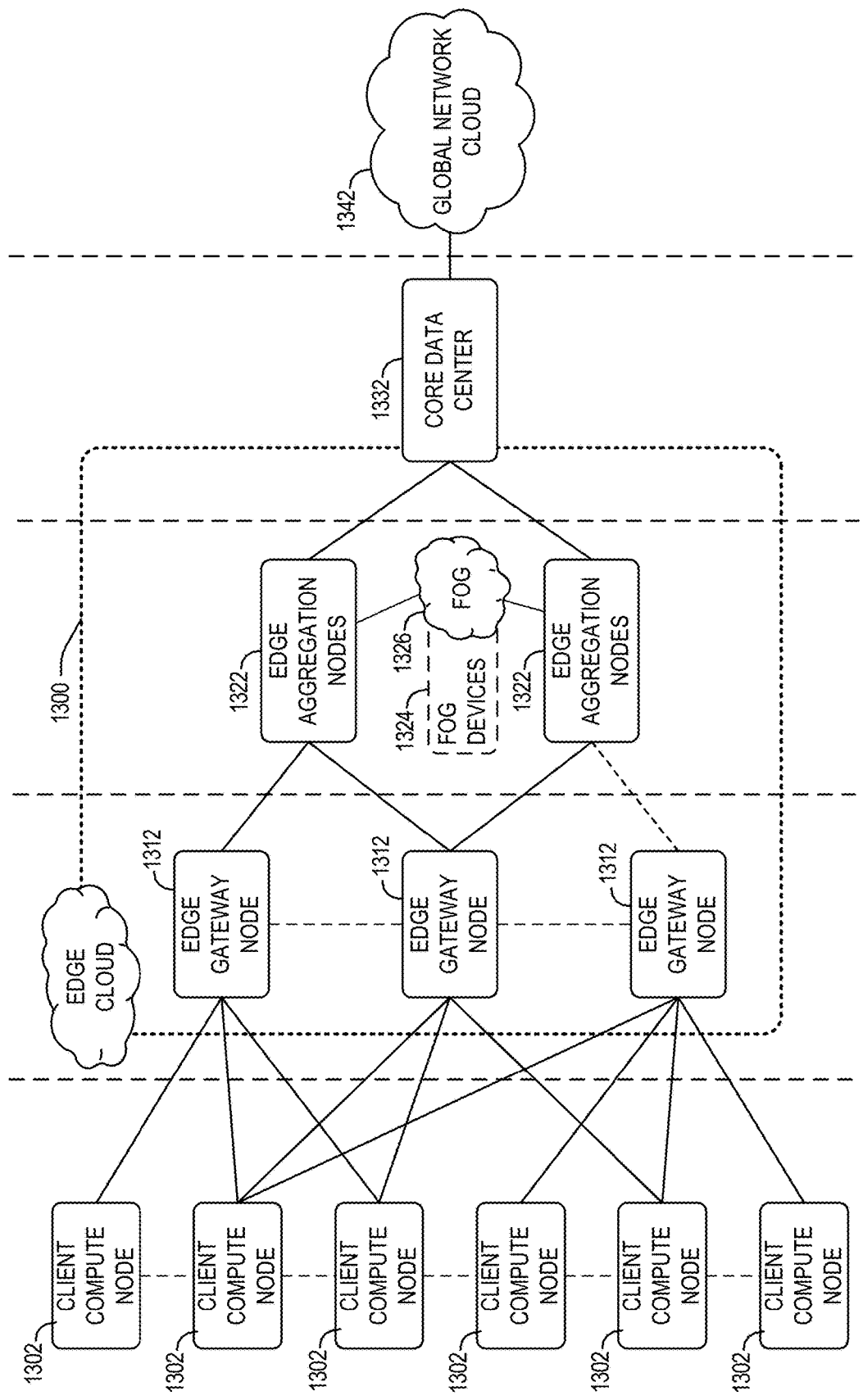
FIG. 13 depicts an example edge computing system.

FIG. 13 depicts an example edge computing system 1300 for providing edge services and applications to multi-stakeholder entities, as distributed among one or more client compute nodes 1302, one or more edge gateway nodes 1312, one or more edge aggregation nodes 1322, one or more core data centers 1332, and a global network cloud 1342, as distributed across layers of the network. The implementation of the edge computing system 1300 may be provided at or on behalf of a telecommunication service provider ("telco", or "TSP"), internet-of-things service provider, cloud service provider (CSP), enterprise entity, or any other number of entities. Various implementations and configurations of the system 1300 may be provided dynamically, such as when orchestrated to meet service objectives.

For example, the client compute nodes 1302 are located at an endpoint layer, while the edge gateway nodes 1312 are located at an edge devices layer (local level) of the edge computing system 1300. Additionally, the edge aggregation nodes 1322 (and/or fog devices 1324, if arranged or operated with or among a fog networking configuration 1326) are located at a network access layer (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provide a decentralized architecture and serves as an extension to cloud computing by collaborating with one or more edge node devices, providing the subsequent amount of localized control, configuration and management, and much more for end devices. Furthermore, Fog computing provides the ability for edge resources to identify similar resources and collaborate in order to create an edge-local cloud which can be used solely or in conjunction with cloud computing in order to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1332 is located at a core network layer (a regional or geographically-central level), while the global network cloud 1342 is located at a cloud data center layer 240 (a national or world-wide layer). The use of "core" is provided as a term for a centralized network location—deeper in the network—which is accessible by multiple edge nodes or components; however, a "core" does not necessarily designate the "center" or the deepest location of the network. Accordingly, the core data center 1332 may be located within, at, or near the edge cloud 1300. Although an illustrative number of client compute nodes 1302, edge gateway nodes 1312, edge aggregation nodes 1322, edge core data centers 1332, global network clouds 1342 are shown in FIG. 13, it should be appreciated that the edge computing system 1300 may include additional devices or systems at each layer. Devices at any layer can be configured as peer nodes to each other and, accordingly, act in a collaborative manner to meet service objectives.

Consistent with the examples provided herein, a client compute node 1302 may be embodied as any type of endpoint component, device, appliance, or other thing capable of communicating as a producer or consumer of data. Further, the label "node" or "device" as used in the edge computing system 1300 does not necessarily mean that such node or device operates in a client or agent/minion/follower role; rather, any of the nodes or devices in the edge computing system 1300 refer to individual entities, nodes, or subsystems which include discrete or connected hardware or software configurations to facilitate or use the edge cloud 1300.

As such, the edge cloud 1300 is formed from network components and functional features operated by and within the edge gateway nodes 1312 and the edge aggregation nodes 1322. The edge cloud 1300 may be embodied as any type of network that provides edge computing and/or storage resources which are proximately located to radio access network (RAN) capable endpoint devices (e.g., mobile computing devices, IoT devices, smart devices, etc.), which are shown in FIG. 13 as the client compute nodes 1302. In other words, the edge cloud 1300 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 1300 may form a portion of or otherwise provide an ingress point into or across a fog networking configuration 1326 (e.g., a network of fog devices 1324, not shown in detail), which may be embodied as a system-level horizontal and distributed architecture that distributes resources and services to perform a specific function. For instance, a coordinated and distributed network of fog devices 1324 may perform computing, storage, control, or networking aspects in the context of an IoT system arrangement. Other networked, aggregated, and distributed functions may exist in the edge cloud 1300 between the core data center 1332 and the client endpoints (e.g., client compute nodes 1302). Some of these are discussed in the following sections in the context of network functions or service virtualization, including the use of virtual edges and virtual services which are orchestrated for multiple stakeholders.

As discussed in more detail below, the edge gateway nodes 1312 and the edge aggregation nodes 1322 cooperate to provide various edge services and security to the client compute nodes 1302. Furthermore, because a client compute node 1302 may be stationary or mobile, a respective edge gateway node 1312 may cooperate with other edge gateway devices to propagate presently provided edge services, relevant service data, and security as the corresponding client compute node 1302 moves about a region. To do so, the edge gateway nodes 1312 and/or edge aggregation nodes 1322 may support multiple tenancy and multiple stakeholder configurations, in which services from (or hosted for) multiple service providers, owners, and multiple consumers may be supported and coordinated across a single or multiple compute devices.

A variety of security approaches may be utilized within the architecture of the edge cloud 1300. In a multi-stakeholder environment, there can be multiple loadable security modules (LSMs) used to provision policies that enforce the stakeholder's interests. Enforcement point environments could support multiple LSMs that apply the combination of loaded LSM policies (e.g., where the most constrained effective policy is applied, such as where if any of A, B or C stakeholders restricts access then access is restricted). Within the edge cloud 1300, each edge entity can provision LSMs that enforce the Edge entity interests. The Cloud entity can provision LSMs that enforce the cloud entity interests. Likewise, the various Fog and IoT network entities can provision LSMs that enforce the Fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (to identify what elements are required by the system to conduct a service, how the system responds to service conditions and changes, and the like).

A "service" is a broad term often applied to various contexts, but in general it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during and end of the service.

The deployment of a multi-stakeholder edge computing system may be arranged and orchestrated to enable the deployment of multiple services and virtual edge instances, among multiple edge nodes and subsystems, for use by multiple tenants and service providers. In a system example applicable to a cloud service provider (CSP), the deployment of an edge computing system may be provided via an "over-the-top" approach, to introduce edge computing nodes as a supplemental tool to cloud computing. In a contrasting system example applicable to a telecommunications service provider (TSP), the deployment of an edge computing system may be provided via a "network-aggregation" approach, to introduce edge computing nodes at locations in which network accesses (from different types of data access networks) are aggregated. FIGS. 5 and 6 contrast these over-the-top and network-aggregation approaches for networking and services in respective edge computing system. However, these over-the-top and network aggregation approaches may be implemented together in a hybrid or merged approach or configuration as suggested in later examples.

Figure 14:
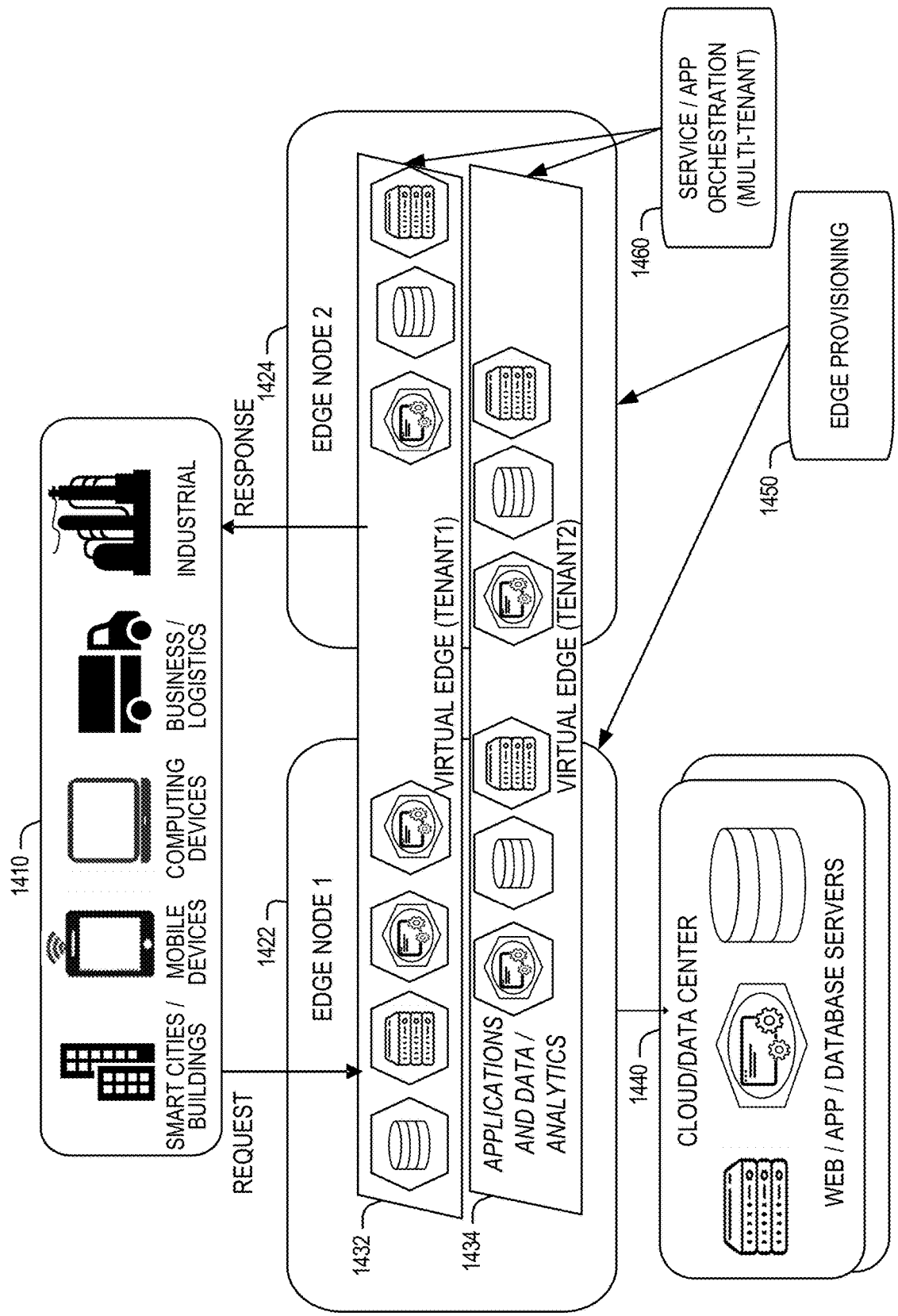
FIG. 14 illustrates deployment and orchestration for virtualized and container-based edge configurations.

FIG. 14 illustrates deployment and orchestration for virtualized and container-based edge configurations across an edge computing system operated among multiple edge nodes and multiple tenants (e.g., users, providers) which use such edge nodes. Specifically, FIG. 14 depicts coordination of a first edge node 1422 and a second edge node 1424 in an edge computing system 1400, to fulfill requests and responses for various client endpoints 1410 (e.g., smart cities/building systems, mobile devices, computing devices, business/logistics systems, industrial systems, etc.), which access various virtual edge instances. Here, the virtual edge instances 1432, 1434 provide edge compute capabilities and processing in an edge cloud, with access to a cloud/data center 1440 for higher-latency requests for websites, applications, database servers, etc. However, the edge cloud enables coordination of processing among multiple edge nodes for multiple tenants or entities.

In the example of FIG. 14, these virtual edge instances include: a first virtual edge 1432, offered to a first tenant (Tenant 1), which offers a first combination of edge storage, computing, and services; and a second virtual edge 1434, offering a second combination of edge storage, computing, and services. The virtual edge instances 1432, 1434 are distributed among the edge nodes 1422, 1424, and may include scenarios in which a request and response are fulfilled from the same or different edge nodes. The configuration of the edge nodes 1422, 1424 to operate in a distributed yet coordinated fashion occurs based on edge provisioning functions 1450. The functionality of the edge nodes 1422, 1424 to provide coordinated operation for applications and services, among multiple tenants, occurs based on orchestration functions 1460.

It should be understood that some of the devices in 1410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1422, 1424 may operate as security feature enforcement points for local resources allocated to multiple tenants per node. Additionally, tenant runtime and application execution (e.g., in instances 1432, 1434) may serve as an enforcement point for a security feature that creates a virtual edge abstraction of resources spanning potentially multiple physical hosting platforms. Finally, the orchestration functions 1460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1410, 1422, and 1440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 14. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 1422, 1424 may implement the use of containers, such as with the use of a container "pod" 1426, 1428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1432, 1434 are partitioned according to the needs of each container.

With the use of container pods, a pod controller oversees the partitioning and allocation of containers and resources. The pod controller receives instructions from an orchestrator (e.g., orchestrator 1460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 15:
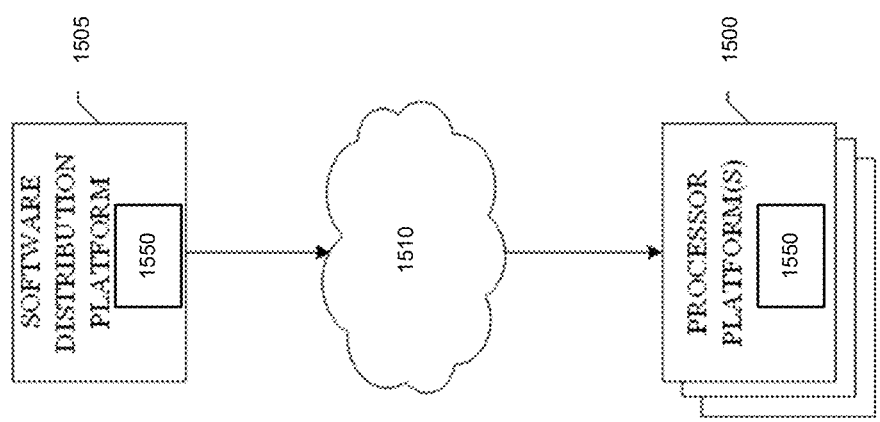
FIG. 15 illustrates an example software distribution platform.

FIG. 15 illustrates an example software distribution platform 1505 to distribute software, such as the example computer readable instructions 1550, to one or more devices, such as example processor platform(s) 1500 and/or example connected edge devices. The example software distribution platform 1505 may be implemented by any computer server, data facility, cloud service, etc., capable of storing and transmitting software to other computing devices (e.g., third parties, example connected edge devices). Example connected edge devices may be customers, clients, managing devices (e.g., servers), third parties (e.g., customers of an entity owning and/or operating the software distribution platform 1505). Example connected edge devices may operate in commercial and/or home automation environments. In some examples, a third party is a developer, a seller, and/or a licensor of software such as the example computer readable instructions 1550. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 15, the software distribution platform 1505 includes one or more servers and one or more storage devices. The storage devices store the computer readable instructions 1550, which may correspond to the example computer readable instructions as described above. The one or more servers of the example software distribution platform 1505 are in communication with a network 1510, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1550 from the software distribution platform 1505. For example, the software, which may correspond to the example computer readable instructions, may be downloaded to the example processor platform(s) 1500 (e.g., example connected edge devices), which is/are to execute the computer readable instructions 1550 to implement any embodiments described herein. In some examples, one or more servers of the software distribution platform 1505 are communicatively connected to one or more security domains and/or security devices through which requests and transmissions of the example computer readable instructions 1550 must pass. In some examples, one or more servers of the software distribution platform 1505 periodically offer, transmit, and/or force updates to the software (e.g., the example computer readable instructions 1550) to ensure improvements, patches, updates, etc. are distributed and applied to the software at the end user devices.

In the illustrated example of FIG. 15, the computer readable instructions 1550 are stored on storage devices of the software distribution platform 1505 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 1550 stored in the software distribution platform 1505 are in a first format when transmitted to the example processor platform(s) 1500. In some examples, the first format is an executable binary in which particular types of the processor platform(s) 1500 can execute. However, in some examples, the first format is uncompiled code that requires one or more preparation tasks to transform the first format to a second format to enable execution on the example processor platform(s) 1500. For instance, the receiving processor platform(s) 1500 may need to compile the computer readable instructions 1550 in the first format to generate executable code in a second format that is capable of being executed on the processor platform(s) 1500. In still other examples, the first format is interpreted code that, upon reaching the processor platform(s) 1500, is interpreted by an interpreter to facilitate execution of instructions.

Infrastructure Processing Units

Figure 16:
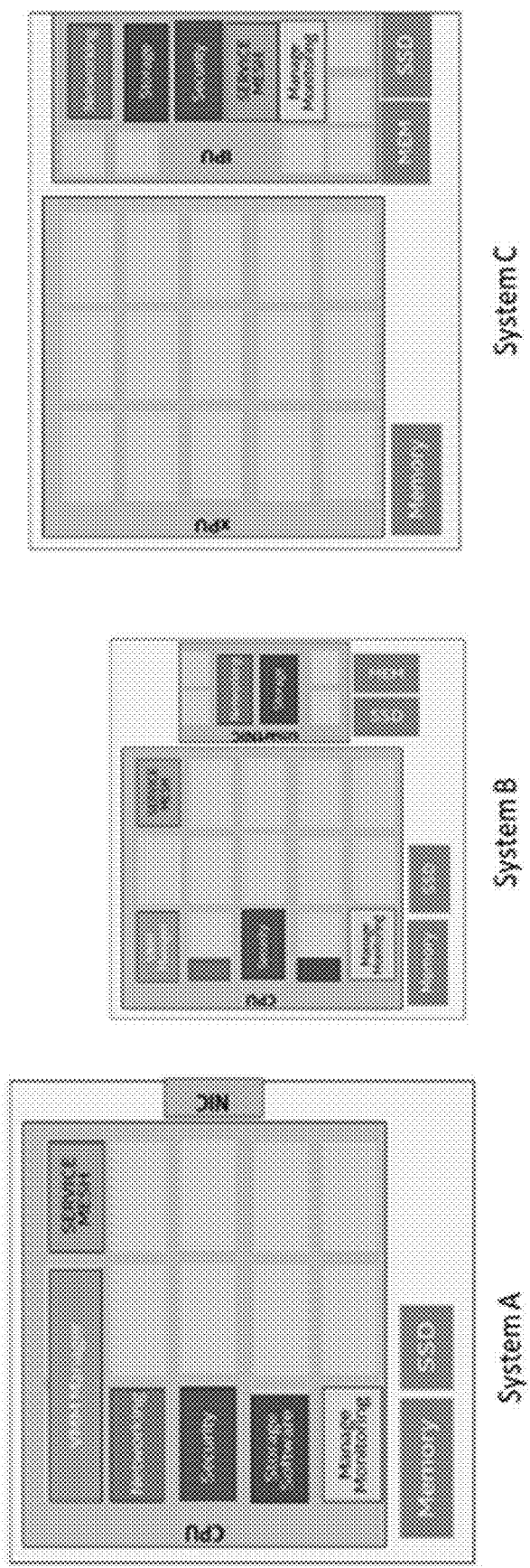
FIG. 16 shows various embodiments of a CPU and network interface card (NIC) systems with access to memory.

FIG. 16 shows various embodiments of a CPU and network interface card (NIC) systems with access to memory. Systems can be composed differently based at least on how functions are mapped and offloaded. For example, system A can include a system where a CPU provides services in software such as, executing a Virtual Machine Manager (VMM) (e.g., hypervisor), performing networking stack processing operations, performing security (cryptographic) operations, executing storage access software, and managing monitoring and service mesh (e.g., control how different parts of an application share data with one another).

For example, System B can include a system where a CPU can execute a VMM, perform security (cryptographic) operations, manage monitoring and service mesh (e.g., control how different parts of an application share data with one another). System B can use a SmartNIC with processors to execute networking stack processing operations (e.g., virtual switch or vSwitch) and storage software (e.g., block storage access operations).

For example, System C can include a system where an IPU can execute platform management, networking stack processing operations, security (crypto) operations, storage software, identity and key management, telemetry, logging, monitoring and service mesh (e.g., control how different microservices communicate with one another). The IPU can access an xPU to offload performance of various tasks.

Figure 17:
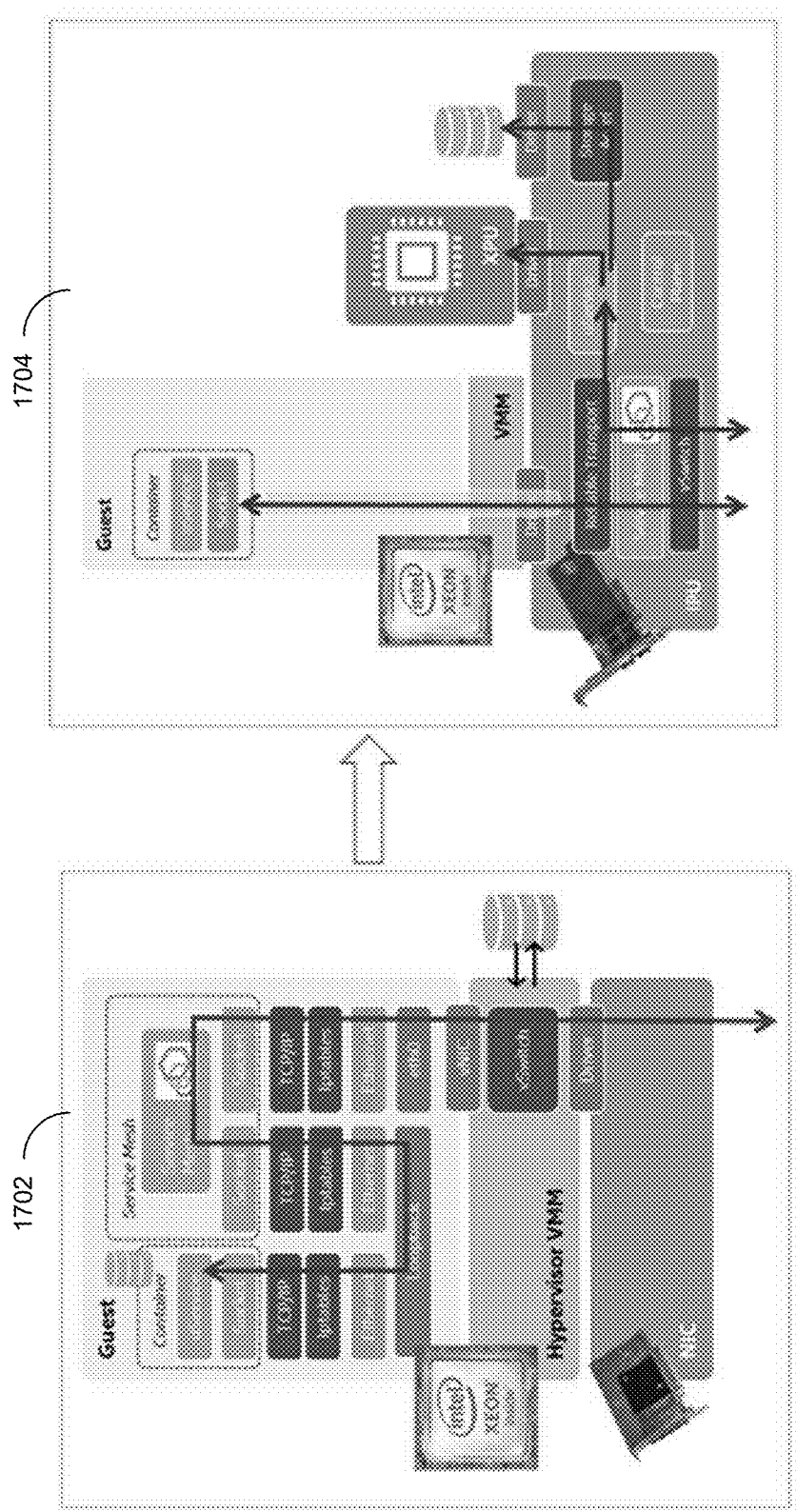
FIG. 17 shows various embodiments of a system.

FIG. 17 shows various embodiments of a system. Configuration 1702 shows an example of use of a server executing packet processing, a container, service mesh, and a hypervisor. In example configuration 1704, an IPU can perform tasks that could otherwise be performed by a guest operating system (OS) (e.g., software installed on either a virtual machine (VM) that is different than the host operating system) in addition to services from the host hypervisor. For example, the guest application services such as service mesh (routing, Network Address Translation (NAT), load balancing, and so forth), encryption and reliable transport services can be offloaded to the IPU. From the host hypervisor, services such as resource management, device virtualization, event and usage logging, connection management and virtual switch (vSwitch) can be offloaded to the IPU. The IPU can execute drivers to interface with a guest OS on a host system as well as an XPU, or storage devices.

Figure 18:
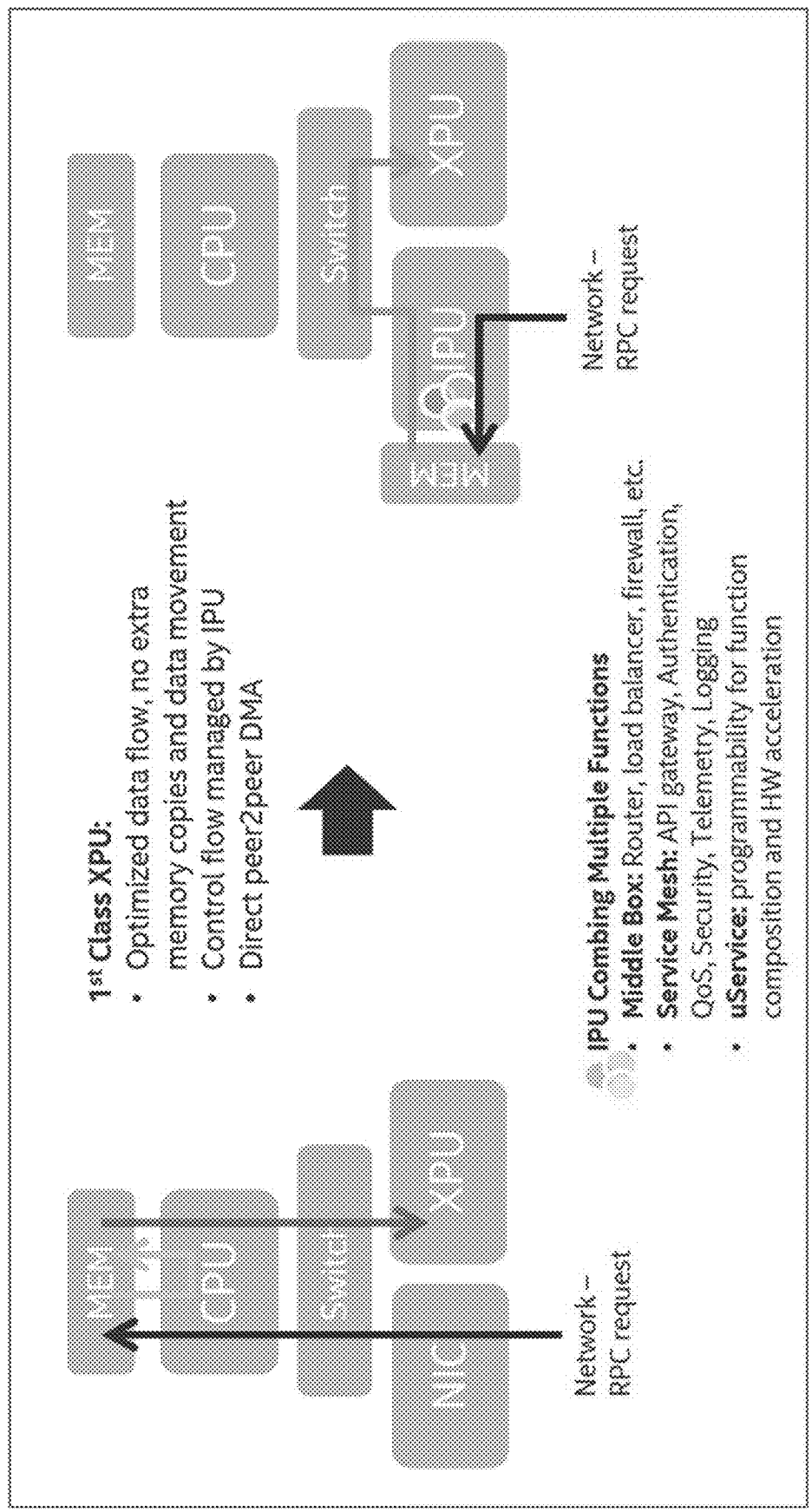
FIG. 18 depicts an example of use of an IPU.

FIG. 18 depicts an example of use of an IPU. In this example, an IPU exposes XPU, storage, memory, and CPU resources and capabilities as a services that can be accessed by other microservices for function composition. This can improve performance and reduce data movement and latency. An IPU can perform capabilities such as those of a router, load balancer, firewall, TCP/reliable transport, a service mesh (e.g., proxy or API gateway), security, data-transformation, authentication, quality of service (QoS), security, telemetry measurement, event logging, initiating and managing data flows, data placement, or job scheduling of resources on an XPU, storage, memory, or CPU.

According to various embodiments, an IPU can include one or more of the following: Network Interface Controller ("SmartNIC") with one or more programmable or fixed function processors to perform offload of operations that could have been performed by a CPU such as: Virtual Switch Offload, storage offload (e.g., compression, crypto, virtualization); offload of operations from an application; virtualization services whereby instead of CPU being the hub of virtualizing every device, IPU becomes a "bump in the wire" from the standpoint of virtualizing all capabilities, including CPUs. Various embodiments of an IPU are integrated with or physically separate from the CPU and xPU components. Various embodiments of an IPU provide a bridge between local memory addressing to remote memory across the data center fabric.

According to various embodiments, an IPU can provide security features including: (1) Root of Trust (RoT), attestation services, secure enclaves; storing encryption keys and complete key management duties; protocol encryption endpoints for link interfaces and network interfaces that connect the IPU to other nodes in the distributed system; separate control plane interface that can be measured (via certificate mechanisms); state machine on device interfaces that can be individually configured and isolated from other device interfaces on the device; attestation, authorization, access control, logging, log-filtering, immutable logging (e.g. block chain); security-hub functions for inter-XPU confidentiality and identity and information isolation, brokering data visibility between multiple clients for cooperative processing; secure and encrypted interfaces for external interfaces from the IPU SoC including memory (e.g., volatile and persistent), network and IO fabrics (PCIe, CXL); passive or active enforcement of security policies and services such as access control lists, rate limiting, intrusion detection, distributed denial of service attacks, etc.

Various embodiments of an IPU can also provide CPU capabilities and performance so that tasks (e.g., data-parallelized tasks) can be offloaded to the IPU as well as: platform and device management; distributed (inter-node and intra-node) telemetry, tracing, logging and monitoring; Quality of Service enforcement; Service Mesh; data processing including serialization, deserialization, transformation such as size and format conversion, range validation, access policy enforcement; distributed (inter-node and intra-node) security; and/or integrated acceleration engines that provide flexible and programmable acceleration engines that offload and improve performance for floating point operations per second (FLOPS)/Tensor operations per second (TOPS) intensive AI and Machine Learning.

For example, as compared to a SmartNIC or data processing unit (DPU), various embodiments provide an IPU that in response to a service call, the IPU can schedule function execution at local and/or remote resources using one or more service interfaces. Various embodiments provide services at a higher abstraction (APIs, RPCs, services) that enable the IPU to provide a finer granularity of offloads and services (as compared to only packets and 5-tuples). Various embodiments can enable enhanced telemetry/logging/monitoring, QoS and egress and ingress scheduling, workload placement/acceleration, security/authentication, and so forth.

Various embodiments of an IPU can reduce XPU cache and bandwidth contamination besides freeing up use of general purpose computing cores, and can cross integrate use of acceleration devices. For example, an IPU can perform in-stream data filtering at the network and storage edge; direct-to-disk encryption/decryption/transcription and compression or decompression, to/from GPU or to/from network.

Various embodiments of an IPU can provide for data placement and management so that data is staged and stored in a memory or storage device physically proximate or close to where it will be processed to reduce latency of data access. An IPU can include a stream-based interface so there is no need for the host to packetize data and perform packet-granular flow control and thread scheduling. Data can be consolidated into bulk regions of memory that CPU may access, and where metadata (e.g., information extracted from network packet headers) and disk-based data structures can be directly placed in caches close to CPU for nanosecond granular load/store access. Coordination overhead between devices can be reduced with little or no I/O event synchronization (polling, sleeping, interrupting, etc.).

In some examples, telemetry is provided for resource tracing of resources and latency in an execution path which can be used for monitoring, resource provisioning, and QoS. In some examples, QOS is provided for resource tracing of resources in an execution path. An IPU can use telemetry to perform resource tracking of resources in the path which influence the performance of a microservice deployment, enabling both end-to-end service and component-level traceability and corresponding targeted controls. Various embodiments provide an IPU that manages flow of connectivity, such as security, routing, acceleration, and bridging memory accesses (local or remote) and exposes these as a microservice (e.g., system API). Various embodiments provide an IPU that is an end point for services or a proxy for accessing services.

Various embodiments provide a system API for an application to cause execution of one or more microservices on local or remote devices. This enables an abstraction layer that separates the service function capabilities from the execution complexity, changes in implementation, scale of deployment, and location of deployment. In some examples, an IPU can perform software composition to accelerate connectivity between multiple services.

Various embodiments perform offload I/O data path operations to an IPU such as encryption, authentication, compression, routing, policy enforcement, Deep Packet/Message Inspection, remote direct memory access (RDMA) acceleration (e.g., RoCE or iWarp, virtualized or not), network protocol (e.g. TCP, UDP, etc.) offload, reliable transport, congestion control, quality of service, sampling, replication/multicast, multi-path, NAT, firewall, etc.

Various embodiments perform offload of I/O data path operations to an IPU for unifying memory accesses to local or remote shared memory such as, encryption, access control, address remapping, cache management, reliable access, atomic commands, and persistent memory management.

Various embodiments perform offload of I/O control path operations to an IPU such as connection establishment, identity management, key management, authentication, tunneling setups, intelligent networking (e.g., offloading flow control, reliable transport, congestion control), dynamic resource allocation, or fast failover.

Various embodiments perform offloading of Global Hierarchical Software-defined Control Plane management to an IPU, such as an IPU hosted local hierarchical control plane for one or more nodes, such as multi-host and multi-homing, thereby enabling faster response time and better scalability based on localized node requirements, live migration, resource allocation.

Various embodiments provide an IPU that performs agentless micro-segmentation (e.g., placing traffic inspection and chokepoints around each workload without having to modify and deploy agents in each workload, for example, to monitor, analyze, and remediate malicious or nefarious traffic).

Various embodiments provide an IPU that is to attempt to unify local and remote storage, and accelerate (local/remote storage) I/Os, by emulating Non-Volatile Memory Express (NVMe) and offloading NVMe over fabrics (NVMe-oF) storage command generation (or Internet Small Computer Systems Interface (iSCSI) storage command generation) for hyperscale high performance storage (e.g., NVMe or iSCSI emulation in the storage path). For example, NVMe-oF is described at least in NVM Express, Inc., "NVM Express Over Fabrics," Revision 1.0, Jun. 5, 2016, and specifications referenced therein and variations and revisions thereof. iSCSI is described at least in RFC 3720 (2004) and variations and revisions thereof.

Various embodiments provide an IPU to manage a high performance virtual storage area network (SAN) for virtualized and bare-metal operation. Various embodiments provide an IPU that provides storage traffic termination. Various embodiments provide an IPU to manage a composable storage from local or remote storage devices including compression and encryption. Various embodiments provide an IPU that performs protection of data-in-use, data-in-flight and data-at-rest (encryption, private/public key acceleration). Various embodiments provide an IPU that performs key management and identity management.

Various embodiments provide an IPU to perform regular expression (reg-ex) processing (e.g., acceleration) such as high speed deep packet inspection at line rate, structured data object search and metadata processing. For example, an IPU can perform processing of metadata associated with storage such as search of record time stamps and enforcing record access controls.

Various embodiments provide an IPU to perform remote atomic operations, over connectivity using remote direct memory access (RDMA), but can be user programmable at a high level. Examples include linked list search, searching remote memory/objects for data specific pattern, and searching or modifying sparse memory.

Various embodiments provide an IPU that implements a hardware root of trust as an intelligent storage controller and trusted control point for attestation of platform devices or deployed software applications (e.g. containers, functions as a service, enclaves, etc.).

Various embodiments provide an IPU that acts as a secure, headless (e.g., not requiring instructions or operational control from additional separate CPU) for managing CPU/XPU/storage/memory endpoints.

Various embodiments provide an IPU that provides logically centralized datacenter-wide policies for endpoint security and isolation.

Various embodiments provide an IPU that performs in-network accelerated supercomputing (e.g., OpenSNAPI from UCF Consortium). For example, an IPU can apply Artificial intelligence (AI) powered cyber intelligence and analytics to secure data centers, and enable predictive maintenance for operating expense (OPEX) optimizations (telemetry, monitoring, management, orchestration, cyber-security and anomaly detection, predictive and preventative maintenance).

Various embodiments provide an IPU that provides isolated dual control plane interfaces that can be measured and attested to then enforce further isolation across multi-tenant workloads on the IPU, e.g., via virtual functions; such that the untrusted control plane interface cannot maliciously (without event/error) change the mode of operation of the IPU services.

The following provides an example operation and use of an IPU. (1) an application issues a function call (e.g., API) to a peer to perform a function, service, or microservice (e.g., processor-executed software, hardware, and so forth). (2) IPU can intercept the function call. In some examples, an IPU could discover one or more services (local or remote) to perform the function call. In some examples, a service can include software and/or hardware. In some examples, an IPU can be communicatively coupled to one or more nodes (e.g., on a same die, via one or more device interfaces or via a network or fabric) and be accessible to receive a function call from any software or device on the one or more nodes. IPU can perform load balancing of function calls. The IPU can perform attestation and/or creation of trusted resources. In some examples, the xPU is a trusted resource. (3) IPU function call to target xPU to perform the service. (4) xPU can perform the service and return a response to the application that issued the function call and the xPU can update its global state. (5) IPU can intercept the response from the xPU and provide a response to the application of completion of the function.

Potential benefits of use of an IPU can include any of the following: (a) reduced attack surface through physical isolation from untrusted tenant applications; (b) per server scaling for simpler dimensioning and reduced blast radius; (c) clear connectivity abstraction point and use of xPUs and CPUs with vendor independence; (d) multi-tenant and bare metal support; (e) associativity of state for better table scaling and caching; (f) accelerator toolbox for xPU offload of connectivity related services; (g) programmable acceleration (seamless to higher level applications and frameworks, libraries, etc.); (h) large scale heterogeneous intra-node and inter-node distributed computing, directed through secure and scalable policy and resource management templates (declarative management of scale and security); (i) meta-computing that can be used for organizing computing in service of computing; self-observation from a trusted near-party, etc.; (j) new software design patterns that are built upon self-aware computing; (k) removal of unnecessary code paths, e.g., direct virtualization of a device without OS, hypervisor, etc.; (l) in-flow associative blending and splitting, redirection, filtering which further reduce overhead by performing an operation when needed, and doing it quickly and in place, obviating the need to store and then re-extract salient bits; or (m) managed data flows.

Figure 19:
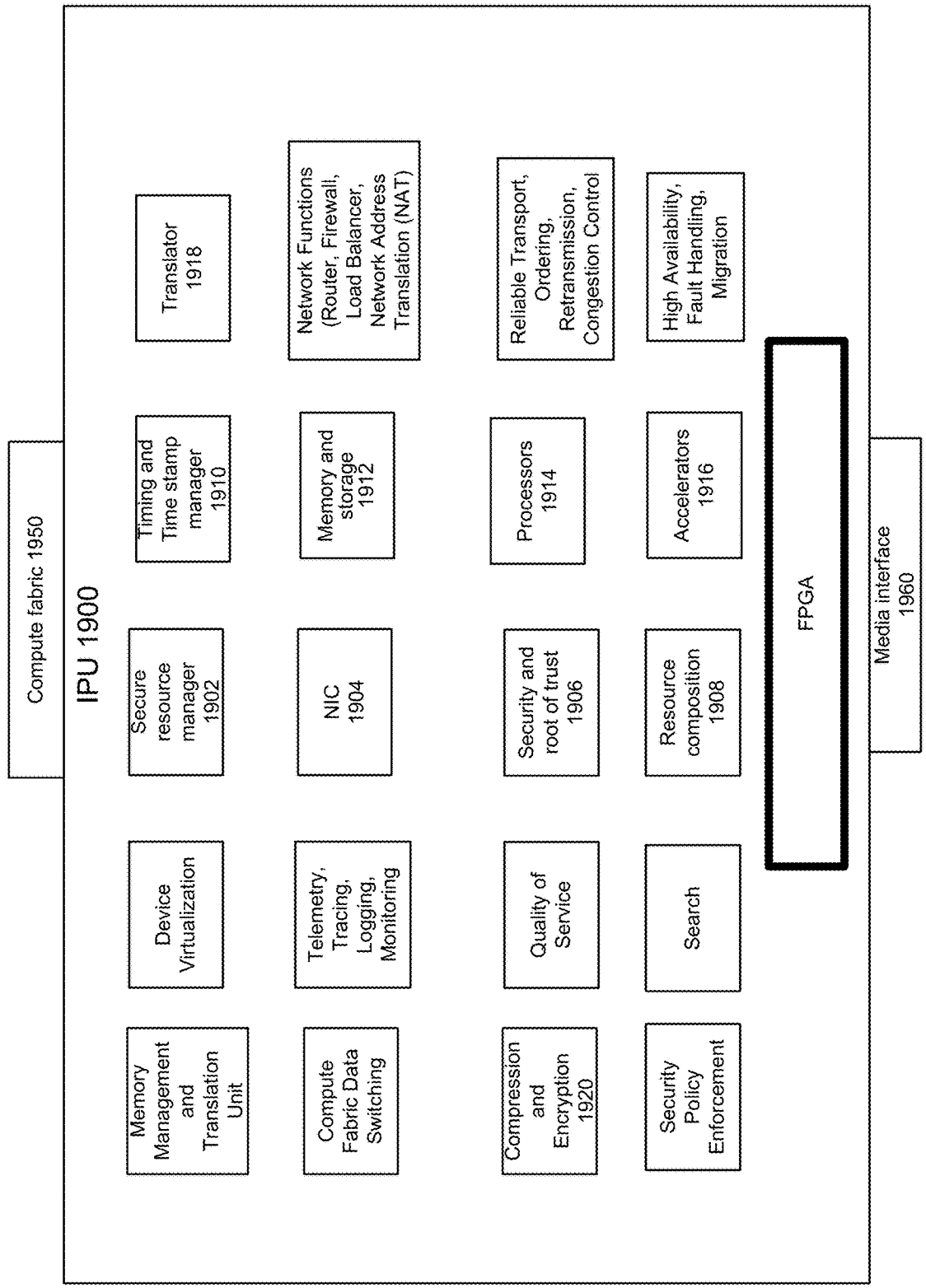
FIG. 19 depicts an example of an IPU.

FIG. 19 depicts an example of an IPU. For example, IPU 1900 can include or access at least secure resource manager 1902, network interface controller (NIC) 1904, security and root of trust 1906, resource composition 1908, time stamp manager 1910, memory and storage 1912, processors 1914, accelerators 1916, or translator 1918. Other components can be used such as but not limited to other components shown in FIG. 19. Various embodiments can use one or more components of IPU 1900 together or separately. For example, compression and encryption 1920 can be used as a separate service or chained as part of a data flow with vSwitch and packet encryption.

In some examples, IPU 1900 can include a field programmable gate array (FPGA) configured to receive commands from an CPU, XPU, or application via an API and perform commands on behalf of the CPU, including workload management and offload or accelerator operations. The FPGA can be configured to perform any operations of any IPU described herein.

Compute fabric can 1950 can provide connectivity to a local host or device (e.g., server or device (e.g., xPU, memory, or storage device)). Connectivity with a local host or device or smartNIC or another IPU can be provided using one or more of peripheral component interconnect express (PCIe), ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), HyperTransport, NVLink, Advanced Microcontroller Bus Architecture (AMBA) interconnect, OpenCAPI, Gen-Z, CCIX, Infinity Fabric (IF), and so forth. Various embodiments of the host connectivity provide symmetric memory and caching to enable equal peering between CPU, XPU, and IPU (e.g., via CXL.cache and CXL.mem).

Media interface 1960 can provide connectivity to a remote smartNIC or another IPU or service via a network medium or fabric. This can be provided over any type of network media (e.g., wired or wireless) and using any protocol (e.g., Ethernet, InfiniBand, Fiber channel, ATM, to name a few).

In some examples, instead of the server/CPU being the primary component managing IPU 1900, IPU 1900 can be a root of a system (e.g., rack of servers or data center) and can manage compute resources (e.g., CPU, xPU, storage, memory, other IPUs, and so forth) in IPU 1900 and outside of IPU 1900. Various operations of an IPU are described below.

IPU 1900 can perform orchestration to decide which hardware or software is to execute a workload based on available resources (e.g., services and devices) and by considering service level agreements and latencies, to determine whether resources (e.g., CPU, xPU, storage, memory) are to be allocated from the local host or from a remote host or pooled resource. When IPU 1900 is selected to perform a workload, secure resource manager 1902 can offload work to a CPU, xPU, or other device and IPU 1900 can accelerate connectivity of distributed runtimes, reduce latency, CPU and increase reliability.

For example, secure resource manager 1902 can run a service mesh to decide what resource is to execute workload, and provide for L7 (application layer) and remote procedure call (RPC) traffic to bypass kernel altogether so that a user space application can communicate directly with IPU 1900 (e.g., IPU 1900 and application can share a memory space). A service mesh can be a configurable, low-latency infrastructure layer designed to handle communication among application microservices using application programming interfaces (APIs) (e.g., over remote procedure calls (RPCs)). A service mesh can provide fast, reliable, and secure communication among containerized or virtualized application infrastructure services. The service mesh can provide critical capabilities including service discovery, load balancing, encryption, observability, traceability, authentication and authorization, and support for the circuit breaker pattern.

In some examples, infrastructure services can include a composite node created by an IPU at or after a workload from an application is received. In some cases, the composite node includes access to hardware devices, software using APIs, RPCs, gRPCs, or communications protocols with instructions such as, but not limited, to iSCSI, NVMe-oF, or CXL.

In some cases, IPU 1900 can dynamically select itself to run a given workload (e.g., microservice) within a composable infrastructure including an IPU, xPU, CPU, storage, memory and other devices in a node.

Communications can transit through media interface 1960 of IPU 1900 through a media to a NIC/smartNIC (for cross node communications) or loopback back to a local service on the same host. Communications through media interface 1960 of IPU 1900 to another IPU can then use shared memory support transport between xPUs switched through the local IPUs. Use of IPU-to-IPU communication can reduce latency and jitter through ingress scheduling of messages and work processing based on service level objective (SLO).

For example, for a request to a database application that requires a response, IPU 1900 can prioritize its processing to minimize the stalling of the requesting application. IPU 1900 can schedule the prioritized message request issuing the event to execute a SQL query database and the IPU can construct microservices that issue SQL queries and the queries are sent to the appropriate devices or services.

Figure 20:
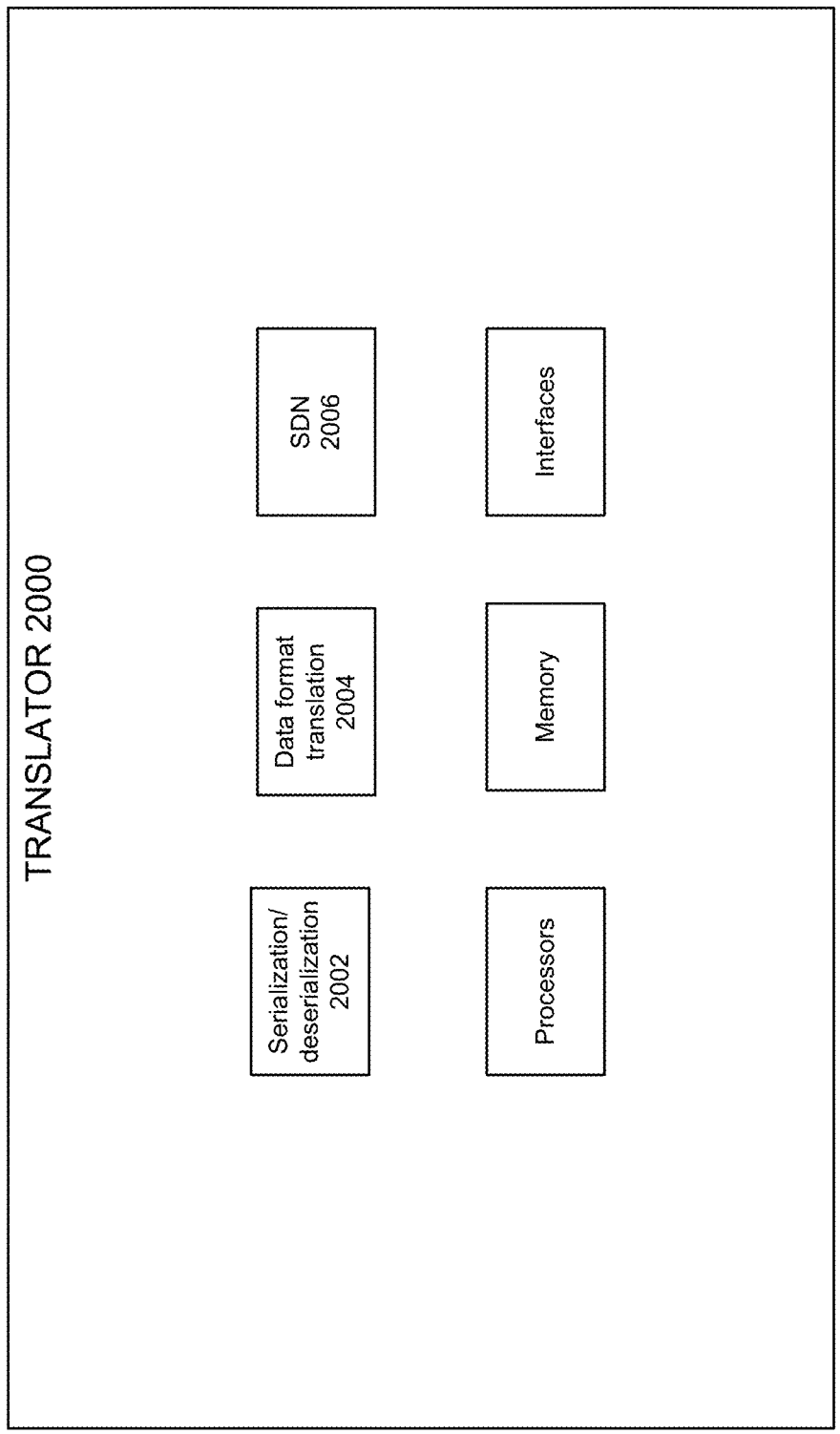
FIG. 20 depicts an example of a translator.

FIG. 20 depicts an example of a translator. For example, an IPU can mediate traffic from storage media to IPU and perform transformations, such as compression and encryption. The IPU can initiate data transfer and packet formation exposing remotely or virtualized storage devices as local services used by applications. The IPU can transform content of data to a format that is accepted for processing by a device without further translation. For example, for generation of packets, offload performed by IPU can include serialization (e.g., de-referencing pointers and or offsets) converting a data structure from memory format into IO ready format with payload/buffer and headers, validation of data such as ensuring values are within supported ranges, or filling in data structures and placing data into memory locations.

Various embodiments of translator 2000 provide at least serialization/deserialization 2002 for network, storage (remote-storage), and machine learning models and data sets. Serializing can include translating a data structure into a format that can be stored (for example, in a file or memory data buffer) or transmitted (for example, across a computer network) and reconstructed later (possibly in a different computer environment). Deserialization can involve extracting a data structure from a series of bytes. Transformations or translations can be performed using hardware state machines, processor-executed software, hardware, regex engines using schema templates.

Various embodiments of data format translation 2004 can perform translation among scalar format (e.g., quantity), vector format (e.g., direction and magnitude) and Tensor format (e.g., scalars, vectors, dual vectors, multilinear maps between vector spaces, and so forth). Various embodiments of data format translation 2004 provide translation from Row to Column formats and vice versa. For example, a GPU can accept vector or tensor format or column/row format but scalar format data is available and data format translation 2004 can perform such translation.

A format of data can be floating point (FP) 8 bits, FP16, FP32, FP64, or any floating point with number of bits that are multiple of 2, or integer (int) 8 bit, integer 16, integer 32, or any integer with number of bits that are multiple of 2. In some examples, data format translation 2004 can perform translation that transforms data from FP32 to FP16 format or more generally, FPX to FPY, where X and Y are different integers. In some examples, data format translation 2004 can perform translation can perform translation that transforms data from intX to intY, where X and Y are different integers. Other numerical formats can be transformed such as bfloatZ (Brain Floating Point) which can include a floating-point format occupying Z bits in computer memory that represents a wide dynamic range of numeric values by using a floating radix point. Any numerical format can be converted into any other numerical format.

Various embodiments of data format translation 2004 can perform Split, Blend, create and apply bitmasks for data streaming at least between IPU and xPU, xPU and CPU, CPU and GPU, CPU and a storage controller, NIC and Memory or Storage, etc. A split can include generating a multiple stream output from a stream. Blend can include sending data to a target and letting the target blend data into a single block of data. For example, a target IPU can perform a blend. A bitmask can be used to represent a dense format in a sparse format using a zero test or threshold comparison to use a bit to identify values as non-zero. A receiver IPU can generate dense format using the data and bitmask. If a receiver is not an IPU, data can be stored in a sparse format.

Moving unprocessed data into a CPU can result in inefficiency and reduce overall throughput, increase jitter, and result in CPU cycles being used for infrastructure activities rather than revenue generating work. Terminating data services at an IPU (e.g., data format translation 2004) can provide efficient capabilities to parse, transform, filter, and otherwise process the data being pushed to the CPU rather than pushing data to the CPU for format modification. Data format translation 2004 can format data that is appropriate for the processing element that is the destination of the data (e.g., a SQL query engine etcetera). For example, data format translation 2004 can perform schema parsing, data transformations, data validation, Match-and-Perform, Match-and-Route, Match-and-Extract, Compact, Expand, Template-fill, etc. IPU can set up data format translation 2004 to transform data to format utilized by a processor executed microservice.

Offloading network operations for Global Hierarchical Control Plane to IPU can occur to create configuration, new services, and management changes, (e.g. network) defined by software, on the fly. If there is or is not a smartNIC in a node or platform device attached to the IPU, the IPU can also run the network OS for SDN control. To save IPU cycles, if there are SmartNICs, then the IPU can offload to a SmartNIC some of the SDN low level data plane operations like encapsulation/decapsulation, encrypt/decrypt, etc., with IPU implementing control plane operations such SDN policies as route management, set-up and tear-down of channels, managing availability and scalability. Various embodiments of IPU's SDN 2006 can implement service management such as Service Mesh load balancing policies, circuit breakers, and authentication. As described herein, IPU can implement security services such as authentication, key management, attestation, and other functions such as high availability and fault handling. The IPU can also manage local resource allocations, data placement such as locally caching or prefetching data or functions, fast response to failures, migration of applications. As a local control plane for one or more nodes, operating as part of the hierarchy of the global data center control planes, the IPU can provide faster response time and a more limited size of state to be processed.

Figure 21:
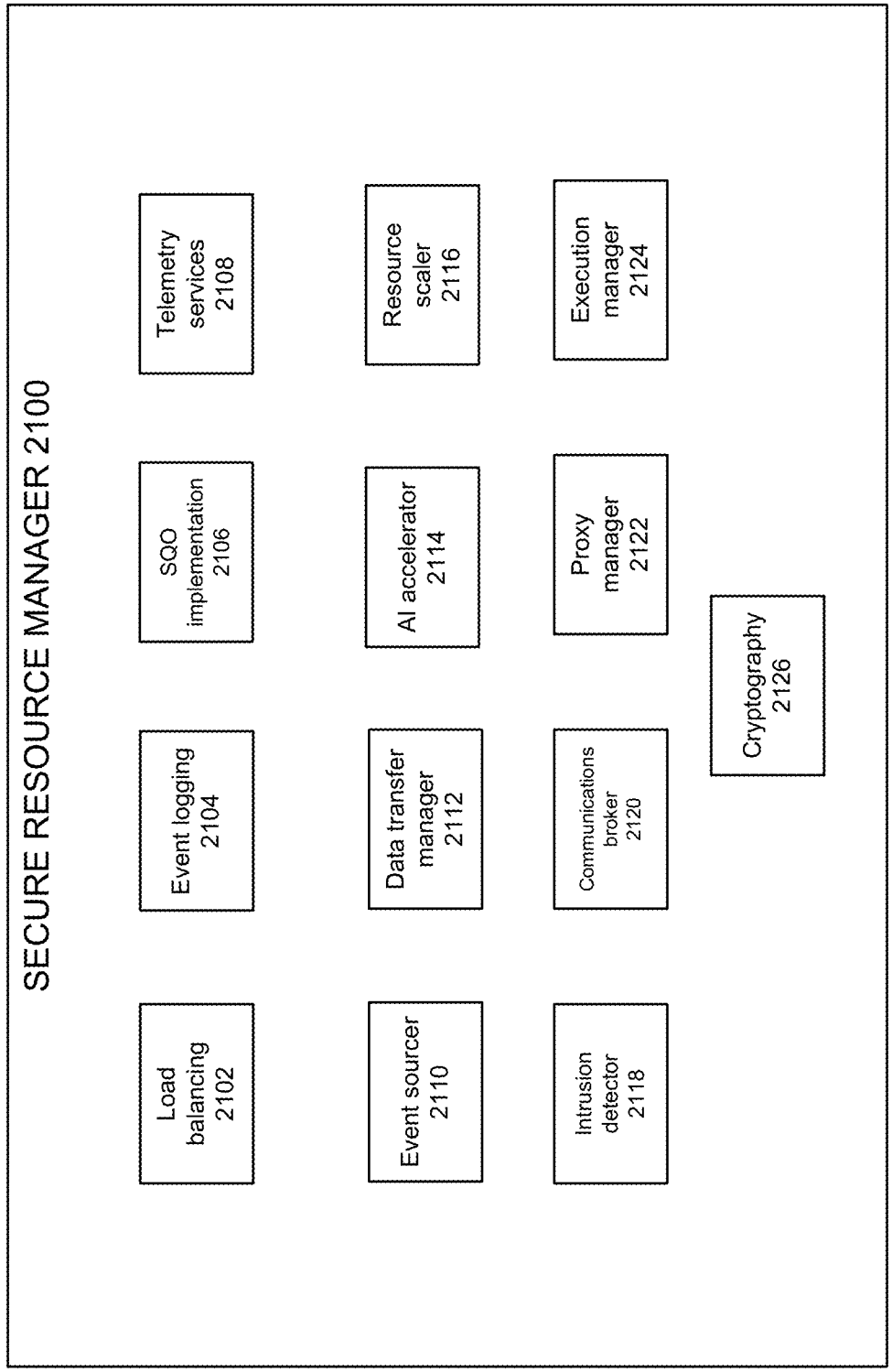
FIG. 21 depicts an example of components of a secure resource manager.

FIG. 21 depicts an example of components of a secure resource manager. A software service can be hosted in an IPU and the IPU can include a CPU or characteristics of a CPU to port applications for execution on the IPU. Microservices can be isolated from other microservices with isolation of memory, network, storage using VMs or container using a hypervisor, virtual machine manager (VMM), or container manager. IPU can perform microservice API authentication.

An IPU can represent a service endpoint and utilize secure resource manager 2100 as a service endpoint. Secure resource manager 2100 can provide a platform manager to control platform resource perform tuning (e.g., power, frequency, sleep, voltage). An IPU can operate as an xPU for running a variety of infrastructure services beyond Orchestration, Management, control-flow bridging, or Data-flow bridging. An IPU can include features of a service processor (e.g., BMC (baseboard management controller), innovation engine (IE), management entity (ME)) and provide services that are run to manage power, thermal, etc. An IPU can be linked to some or every xPU in a server, have full access to memory, and can call other xPUs on other servers via a fabric or network in addition to bridging between xPUs. The IPU can also provide platform multi-tenant virtualization services to provide at least some customers with individual control of services such as power tuning options, device management, and service offloads. The IPU can manage and maintain per-tenant service objectives including resource allocations, security policies, and resiliency or high availability.

Secure resource manager 2100 can act as a hub of security at least for microservices to be deployed by an IPU. An IPU can run a number of services for on-boarding or off-boarding devices and software (e.g., hardware at system on chip (SoC) level and software to be onboarded or safely decommissioned at off-boarding time) to control what resources (including custom devices or software) a service can access. Secure resource manager 2100 can perform:

1. Policy driven cross-component micro-segmentation, to overlay and manage software defined virtual networks over compositions of XPUs and memory-storage partitions,
2. Managing licenses, billing, charging and other security critical services,
3. Managing reboot-less upgrades for hardware, software, or firmware,
4. Hosting bitstream directories/catalogues for FPGA, container, or function images to be launched as soft hot plug capabilities, etc.
5. Managing quality of service or Service Level Objectives, this can be static or dynamically changing based on telemetry measurements (e.g., latency, jitter, throughput, power, cost), and/or
6. Managing and establishing security resources, such as keys, and usage policy for memory, storage and media.

Secure resource manager 2100 can include load balancing 2102 to perform load-balancing of services running on xPUs, CPUs, ASICs, FPGAs, embedded customer specific silicon logic or circuitry and act as a local orchestration plane ensuring Service Level Objectives, security isolation, telemetry/monitoring/logging.

Secure resource manager 2100 can include event logging 2104 to perform logging of low level events from platform hardware, system on a chip (SoC) components, VMMs, or higher system events such as, but not limited to RPC calls, QoS violations, user login, and policy changes.

Event logging 2104 can perform monitoring and logging changes to a number of network endpoints, remote procedure calls (RPC), gRPC, APIs, memory locations, storage locations, or several named machine states on devices, time of day, bandwidth, user access and authentication, resource requests, and access to other hosted or proxied services. Logging of security events into a secure, signatured database with hardware timestamps and auditable signatures.

Service quality objectives (SQO) implementation 2106 can perform implementation of SQOs as codified in infrastructure service software, configuration libraries, and secure key value stores. While codification (declaration) of SQOs may be implemented in software, the implementation may be implemented in a combination of hardware and software, because some events require highly reactive hardware mechanisms, for example, routing to less loaded endpoints, scheduling priorities for latency, jitter, transaction rates, changing input output (TO) and memory bandwidths, caching priorities in CPUs and xPUs, while others may require slower but more history driven intelligent adaptation, process identifier (PID) control, deciding whether to activate turbo power states, whether or not to cache distributed storage objects locally in RW (read/write) or RO (read only) states, etc. Aggregate SQO is often composed of a chain of multiple individual services. Missing a single individual service SQO can be mitigated by providing better SQO at subsequent services. A parent aggregate status can be provided throughout the chain for dynamic adjustments.

Telemetry services 2108 can perform telemetry associated services related to one or more of: inter-component flow, message RPC or API telemetry, tagging, collection and parsing, intra-component telemetry extraction and parsing, end-to-end service across multiple components, functions, services or microservices, or telemetry and event ID and time correlation. Telemetry and event ID and time correlation can involve exact or statistical and isolation between different tenant domains and instances (e.g. virtual machine, container, functions, PODs), user access, and service (e.g. RPC, API, URL).

Telemetry services 2108 can perform detection of telemetry threshold crossing (e.g. latency, resource utilization) and initiation of scripted responses (e.g. resource allocation, load balancing). Telemetry services 2108 can perform telemetry registration and publish/subscribe APIs are additional capabilities.

Telemetry services 2108 can trace behavior of a service either at the network layer (e.g., using 5-tuple of ip_src, ip_dest, protocol, ip_src_port, ip_dest_port) or at the application layerTracing the behavior of a service is either at the network layer (using 5-tuple of ip_src, ip_dest, protocol, ip_src_port, ip_dest_port) or at the application layer (e.g., API/RPC) and can be performed by injecting an identifier that is carried with the payload. To achieve an end-to-end tracing architecture can involve an approach of being use of 1 or more identifiers that can be bound together at a point of time and then used collectively to monitor the service/code behavior. For example, the IPU could provide an agent running on the host a set of identifiers (e.g., UUID for application layer, a Resource Monitor ID (RMID) for the Processing UNIT and a Process Address Space ID (PASID) for the memory management unit (MMU), IOMMU and SR-IOV Device). These along with the platform id can then be used to create a UUID (e.g., hashed identifier) and embedded in the packet flow by the IPU using, e.g., P4-INT (in-band network telemetry), to monitor the end-to-end flow. At each stage of the architecture, one of more of the identifiers with the associated telemetry can be pushed to the telemetry service.

Note that QoS can be provided in a similar manner based on the SLO, SQO and telemetry measurements. If a SQO, such as latency, is not being achieved, then additional resources (e.g. cache allocation, memory bandwidth, media bandwidth, priority, replicating data structures, redirecting requests, replicating services to reduce loads, etc.) can be allocated by secure resource manager 2100. Adjustments can be based on historical behaviors, templates, or dynamic machine algorithms.

Event sourcer 2110 can process raw logs and telemetry information to create cross-component (heterogeneous) hardware and/or software event services such as sourcing, monitoring, handling, prioritizing, filtering, and delivering events. Event sourcer 2110 can split execution of services between software executed by one or more IPUs and hardware in IPUs, including event-driven activation of receiving components and/or software threads.

Data transfer manager 2112 can perform transparent support for synchronous and asynchronous invocations and synchronous reliable data transfers over low-level asynchronous and best-effort channels. Data transfer manager 2112 can attempt to provide consistent interfaces to applications while abstracting whether the service is local or remote across the network (e.g. heterogenous pooled accelerators).

Artificial intelligence (AI) accelerator 2114 can be used for distributed AI hardware and software to provides a bridge between local and remote shared memory domains (e.g., CXL) over the datacenter network (e.g., Ethernet or other protocols). For large scale distributed AI training, AI accelerator 2114 can combine gradients and distribute combined gradients across relevant xPUs (both intra and inter node) for each micro batch across nodes, and for each iteration in each micro batch intra-node.

Some examples of an IPU can manage or perform data parallel operation for AI inferencing and other data parallel functions, inference operations on data in local memory or in streaming data from network, decode and pre-processing of data for AI inferencing, provision and sharing of AI inferencing services for local compute/applications, media decode, 5G/parallel network traffic processing.

Some examples of an IPU can manage or perform Message Passing Interface (MPI) tag matching, offloads for AI messaging, or AI training summation layer offload.

As a high bandwidth distributed programmable entity accessible from and to each xPU and to the system memory and network, IPUs can readily perform gradient or weight updates using AI accelerator 2114, and let a cache-coherent interface (like CXL) automatically propagate the new gradients to each XPU which can apply its own weight updates. IPUs can let XPUs check into a turnstile, receive updated gradients or weights, and continue with versioned updates of the values. Similarly, at the start of each micro batch, a randomly chosen XPU can send all of its updated weights to achieve the desired synchronicity.

In some examples, this gradient computation (combining or reducing) may be performed in a CPU or in a parameter server (which can be inefficient and bottleneck-prone), or, it requires special network fabric capable of supporting various in-network ALU operations. Performing weight updates through a parameter server can be performed asynchronously (for performance and concurrency); but that can create stability problems, especially in probabilistic deep learning. An IPU can provide offload of this function by providing high bandwidth streaming and data transformations directly to a memory pool with AI accelerator 2114 managing the buffers and sharing with XPUs.

IPU-based gradient blending can be agnostic to XPUs in that an XPU can be a CPU, a GPU, an FPGA, a tensor processing unit (TPU), Habana processor, etc. In this way, a quasi-synchronous large scale deep training benefit can be achieved using IPUs. (See, e.g., Distributed TensorFlow Dev Summit 2018 (e.g., train models on one machine and multiple GPUs and introduces an API that is foundational for supporting other configurations in the future)).

Intrusion detector 2118 can manage intra server fault-isolation boundaries for cross-device RPC or gRPC calls, and hardened partitioning over shared memory so that memory accesses between partitions are transited through IPU with an IPU acting as a hardware proxy for reflecting memory hosted in one partition to accesses from another partition. In effect, pointer overruns or wild, flat accesses can be cut off through IPU based indirection-reflection policies. These policies can also be used for enforcing security access policies and intrusion detection of accesses to restricted areas, excessive resource (bandwidth, storage) usage, access to un-authorized services/data, authentication failures, activity during unusual times, geographical location, access patters (e.g. probing, scanning).

Communications broker 2120 can implement capabilities for multiprotocol traffic and communication brokering, not just at the network boundary, but also within a system, at XPU boundaries. An example is as follows. IPU(s) host code/library can perform thunking between a previous version of some XPU and a new version of the XPU that has new capabilities, or vice versa. For example, it may do so because a deprecated instruction set architecture (ISA) from an XPU may be present in version A and not present in version B. A thunk can include instruction translation, protocol, or data translation to provide compatibility. A system may have an XPU at version A in node X, and an XPU at version B in node Y. Invocations of A or B versioned APIs may be thunked when possible. When not possible to thunk, the IPU may route calls to the right instances (e.g., on node X or node Y) of the same application according to the versions (A, or B) of XPUs on which the instances are running. A soft (e.g., emulated) version of the XPU may also support an end-of-life'd version Z; and invocations to version Z may be routed to the soft-XPU.

Proxy manager 2122 can implement proxy microservice containers (e.g., service mesh sidecars, API gateways, or message buses) for applets. The applets can provide remote proxying and caching of services so that fast-paths or common invocations can be handled in the applets on behalf of a target (callee) service. In some cases, instead of calls being microservice-to-microservice, some calls can be routed to the IPU-based service mesh sidecars themselves. This can apply to forward proxies and/or remote proxies. Such applets may be used to perform data reduction, filtering, caching, etc. on behalf of the callee microservices, so that (a) less than all calls actually have to be made end-to-end and (b) less than all data are moved or copied from caller to callee.

IPUs can be coupled tightly to XPUs, so the applets can execute efficiently and with better cached data sharing with the caller and in caller's context (but perhaps with higher privilege). On a service by service basis, the applets can perform attestation and validation since the IPU is not under neither the control of the caller nor that of callee, traffic batching and consolidation, executing administratively-stored procedures (and thus able to enforce smart contracts). In remote proxy operation, the applets can reduce the burden on the callee microservice, and can reduce latency by returning cached content when applicable.

Applets can also perform data expansion and transformation function such as a Pub Sub Message bus service offloaded in the IPU. The IPU can manage the storage, data transformation and reliable multicast transmission to subscribing endpoints. This can reduce host CPU, memory copies, and IO bus requirements. Offloaded container sidecar agents into IPU can, in some examples, perform health monitoring (e.g., provide faster local control of recovery) or etcd (e.g., using strongly consistent, distributed key-value store for stronger data security for shared secrets).

Execution manager 2124 can implement reliable execution of end-to-end streaming data applications with and without SmartNICs, between a microservice M1 on an XPU X1 in one node N1, and a microservice M2 on an XPU X2, in another node N2. A smartNIC providing storage controller operation can provide for protocol processing in the smartNIC and for acceleration of various storage networking protocols, cryptography, TCP offload engine, in the cores of the smartNIC, and the smartNIC can become a traffic termination point.

A smartNIC may have no ability to respond to software or XPU failures and therefore may redirect control to an entity that can perform failover from say M1 to M3 or from X1 to X3, or M2 to M4 or X2 to X4 to achieve higher level (end to end) service to service reliability. Instead of or in addition to responsibility for dealing with reliability for end-to-end streaming data applications at the peer to peer level, in an IPU based system, an IPU can act as a para-virtualization of an XPU and therefore can monitor the XPU and microservices on that XPU (e.g., monitor their heartbeats or other indications), and initiate remedial action such as spawning a new instance (e.g., for software faults) and routing to a registered failover XPU (for hardware faults) at the XPU.

As described herein, an IPU can run as a control plane and decide whether to run back up service or request additional resources. IPU can run a child SDN controller or hypervisor. IPU allocated resources or backup resources.

The IPU can utilize cryptography to provide for encryption and decryption of content transferred between devices in an IPU or from one IPU to another IPU or from an IPU to another device. An IPU can act as a trust agent and bridge between trusted communications and services. Total memory encryption (TME), multi-key total memory encryption (MKTME), Trusted Domain Extensions (TDX), DDR encryption, function as a service (FaaS) container encryption or an enclave/TD (trust domain) can be used. Meta-data can include one or more of: service level agreement (SLA) parameters to meet (e.g., TCO), expected memory bandwidth usage, expected packet receive rate, latency sensitivity level, or jitter sensitivity level.

Multiple manners of providing encryption can be used including virtualization, physical partitioning, trust domains, secure enclaves, Intel® SGX, Intel® TDX, AMD Memory Encryption Technology, AMD Secure Memory Encryption (SME) and Secure Encrypted Virtualization (SEV), ARM® TrustZone®, Apple Secure Enclave Processor, or Qualcomm® Trusted Execution Environment. A secure enclave/trust domain can be a region of memory or a processor or both that are not accessible by processes except for designated and limited processes, virtual machines, or containers.

Encryption or decryption can use, for example, total memory encryption (TME) and multi-key total memory encryption (MKTME) commercially available from Intel Corporation (as described in the Intel Architecture Memory Encryption Technologies Specification version 1.1 dated Dec. 17, 2017 and later revisions), components that make up TME and MKTME, the manner in which TME and MKTME operate, and so forth. These technologies can be used to provide a readily comprehensible perspective for understanding the various disclosed embodiments and are not intended to limit implementations to employing only TME and MKTME. TME provides a scheme to encrypt data by memory interfaces whereby a memory controller encrypts the data flowing to the memory or decrypts data flowing from memory and provides plain text for internal consumption by the processor.

In some examples, TME is a technology that encrypts a device's entire memory or portion of a memory with a key. When enabled via basic I/O system (BIOS) (or Universal Extensible Firmware Interface (UEFI), or a boot loader) configuration, TME can provide for memory accessed by a processor on an external memory bus to be encrypted, including customer credentials, encryption keys, and other intellectual property (IP) or personal information. TME supports a variety of encryption algorithms and in one embodiment may use a National Institute of Standards and Technology (NIST) encryption standard for storage such as the advanced encryption system (AES) XTS algorithm with 128-bit keys. The encryption key used for memory encryption is generated using a hardened random number generator in the processor and is never exposed to software. Data in memory and on the external memory buses can be encrypted and is in plain text while inside the processor circuitry. This allows existing software to run unmodified while protecting memory using TME. There may be scenarios where it would be advantageous to not encrypt a portion of memory, so TME allows the BIOS (or UEFI or bootloader) to specify a physical address range of memory to remain unencrypted. The software running on a TME-capable system has full visibility into all portions of memory that are configured to not be encrypted by TME. This can be accomplished by reading a configuration register in the processor.

In some embodiments, TME can support multiple encryption keys (Multi-Key TME (MKTME)) and provides the ability to specify the use of a specific key for a page of memory. This architecture allows either processor-generated keys or tenant-provided keys, giving full flexibility to customers. VMs and containers can be cryptographically isolated from each other in memory with separate encryption keys which can be used in multi-tenant cloud environments. VMs and containers can also be pooled to share an individual key, further extending scale and flexibility.

An example enclave/trust domain can be a Trusted Execution Environment (TEE) that is an isolated execution environment that provides security features such as isolated execution (confidentiality), integrity of applications (and guest operating systems) executing with the TEE, along with confidentiality of their assets. TEEs help defend against attacks targeting underlying layers of the stack, including the host operating system, host hypervisor, devices, drivers, and firmware, by providing specialized execution environments known as "enclaves/trust domains". TEE can be a control plane for an IPU but may include some hardware enforcement logic. Each trust domain may have their own ephemeral key allowing for additional cryptographic isolation. Hardware or software link encryption methods may be used to connect two trust domains, where each trust domain may be operating on separate XPUs via an IPU.

An example enclave can be a logical collection of entities which belong to the same "trusted" domain with secure communication between entities. There can be multiple enclaves within a pod. An enclave can span across multiple pods. An enclave may include one or more shared memory domains. Entities within an enclave may contain non-shared memory regions. There may be trust relationship between enclaves. An enclave may expose parts of memory to other enclaves.

Figure 22:
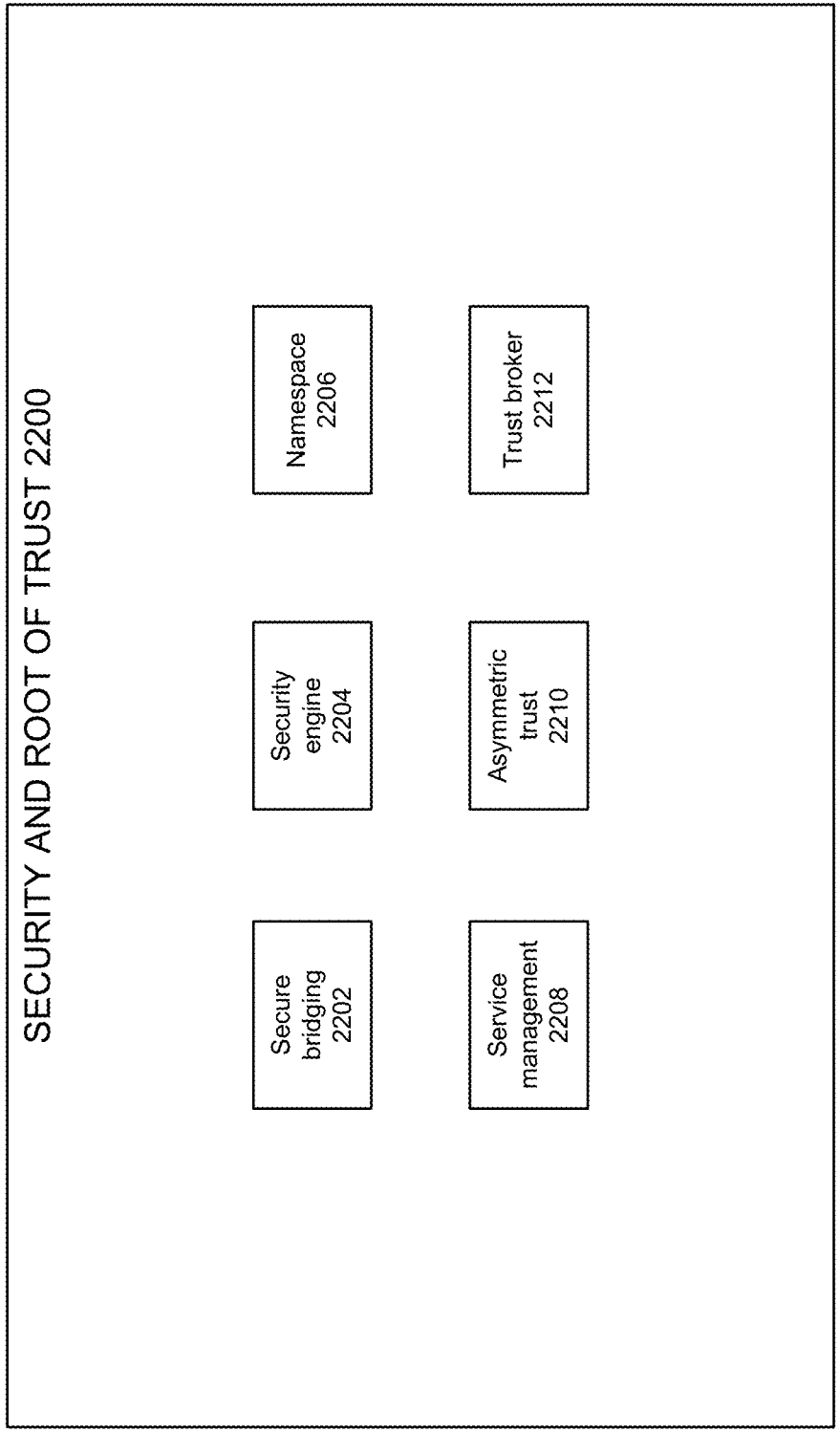
FIG. 22 depicts an example security and root of trust system.

FIG. 22 depicts an example security and root of trust system. With confidential compute, it is critical to be able to attest to a given service (if challenged) that all the elements in the distributed system meet the services security objectives. Technology such as block chain can be used to build the trust chain that can then be read securely by a service. To the build the train of trust, however, requires coordination across the distributed devices and ensure that trust context is communicated appropriately (see messaging above). The IPU can support this distributed trust model and provides a secure bridge between domains.

Secure bridging 2202 can provide secure bridging of security perimeters between multiple independent hardware roots of trust and attested firmware or software (to form Trusted Cliques) and to provide for secure policy guided propagation/delegation of trust within servers, and, between peer servers. Secure bridging 2202 can further provide kernel and user-space to user-space control and data transfers and migration without going through supervisory software layers.

For example, secure bridging and attestation can be applied in links in a chain of functions to provide secure transfer of data and secure computation. Renegotiation of trust for services, microservices, elements or devices in a data path with proper keys can be avoided, but can be utilized. An IPU can negotiate security with a device in a chain or path of devices. After security through a path of devices is accomplished, a data path to devices in the path can be trusted. Encryption and decryption can occur at each juncture between devices. Data can be passed from each secure element in chain. Data can include code or key that is verified to be permitted to be processed on a device, in addition to each device being verified as trusted.

If a device changes software or device properties (e.g., updates or changes to applications, services, or microservices, network routing changes (e.g., over unencrypted links), changes in service locations (e.g., deployment outside of regulatory region), firmware change, microcode change, changed amount of memory, changed amount of storage, hot added device, or hot removed device), then an IPU can halt active sessions and re-attest or re-authenticate device with changed properties before allowing use of device.

A device can indicate or publish to an IPU if the device is in debug mode, function reset, or firmware update, can send message to IPU to indicate change in properties. In some cases, an IPU can permit a firmware update and keep the device as trusted for particular firmware updates for particular devices. The IPU can revoke some device rights from trusted use if device property changes. IPU can periodically check devices for any changes and validate device. The device can be validated with a certificate for particular software or firmware or device properties.

As a local resource aware of tenant events, security engine 2204 of the IPU can also trigger security actions (e.g., re-attestation or re-authentication of devices or software) based on tenant actions/event types and the security policy or risk before allowing security related actions such as accessing keys, storage, RPCs, APIs, shared memory regions or changing user identity, resource utilization, etc.

A set of trust expressions can be applied such as a tenant X can be co-tenanted with a tenant Y under the condition that tenant Y has been attested to by Z, or that a measurement of Y matches one of three recent versions approved for Y, etc. These expressions can codify different paths with various combinations of security and trust and privacy guaranteeing attributes of different services and the infrastructure XPUs and platform on which they are dispatched. These declarative methods of expressing trust can lead to a run-time composition or compilation of the necessary ingredients for services.

In some examples, at the time that platform resources are assigned to a microservice, the trust that the microservice requires of the platform resources, and the trust that is required by the platform of that microservice, can be computed from expressions. Then the required trust can be achieved by performing different measurements, verifications, attestations and other operations. Trust may be further controlled through policies which dictate or enforce that various operations are performed in prescribed order. A potential benefit is that instead of orchestration and security being handled in a monolithic fashion, formal specifications of trust can be performed in a flexible way according to what options are available. This leads to a "software or policy defined security" approach in which the IPUs, which are independently trusted and verified as hardware roots of trust, become the anchor mechanism for composing trust according to formal specifications, while working closely with resource provisioning and assembling functions of orchestrators. It also allows for non-virtualized (e.g., bare-metal) partitioning of resources through IPUs acting as the factory for layering in the needed trust and isolation boundaries without forcing VEEs where there are performance, agility, or other reasons for bare-metal execution.

Orchestration of trust can also be associated with adjacent mechanisms like logging of the required operations and their outcomes so that establishment of trust is recorded alongside the reasons for permitting the establishment.

IPU can be a coordinator with other devices, with the trust and composition APIs, create, modify and bridge islands of trust which include hardware components, software components, and memory regions in each island. This can allow flexible agentless micro-segmentation in which as the computational relationships change or evolve, it is not necessary to change application software, library software, and so forth to redo the trust boundaries. IPU can act as an agentless micro-segmentation without software hurdles.

Secure bridging 2202 can provide a secure confidential-computing bridge between trusted execution environments (TEEs) at different XPUs. Also, an IPU can act as a secure bridge between the TEE at an XPU and a TEE at a smartNIC. This can permit dynamic reconstitution of a TEE spanning multiple XPUs, memory, storage and SmartNICs. This can also enable the IPU to coordinate and manage live migration (e.g., virtual machine, container, data or key migration) for deployments across virtualized, containerized and bare metal.

Code can be executed in trusted environments. Block chain can be queried to determine attestation profiles of resources available and if the resources are trusted. The IPU can establish trust before execution of service or while service is executing. The IPU can determine chain of trust before providing results. Local attestation and attestation can be recorded within a blockchain and after a result is returned, an IPU can check if an entire chain of trust is met. Attestation can include a virtual environment trusted, firmware versions trusted, network controller, firmware in IPU. Attestation can include verification of a hash of certificates in some examples.

Namespace 2206 can register each ingredient entity with an immutable UID, encoding its properties, storing into an IPU-private non-volatile memory range the various encoded properties and their human-readable symbolic names etc. Namespace 2206 can be implemented as hardware circuitry that can allow IPUs to be autonomous without the need for CPU-based software or firmware agents to perform a secure boot process, a secure onboarding process, etc. Instead, this responsibility can completed with a database created and maintained by namespace circuitry (e.g., IPU based software agents).

Namespace 2206 can be driven from cloud based services instead of host CPU-based initialization or shutdown mechanisms and can be used in bare metal deployments or multi-tenant environments. Security materials and crypto keys can all be onboarded through secure registration and key injection capabilities so that IPU units are the foundational mechanisms around which the remainder of security and management controls can be automated.

Service management 2208 can provide headless operation of XPUs, FPGAs or other devices including management of their bitstreams, FPGA slice allocations, etc., for use by different FPGA-accelerated services. The FPGAs (or other devices) can be part of an FPGA pool or FPGA compute partition that is front-ended by an IPU and connected by a legacy NIC.

While such operations can be implemented at an FPGA by having the FPGA implement a "soft-IPU" bitstream, that is potentially (a) a lot of overhead and gate count at the FPGA tax for a complex operation that is ideally and efficiently left to an IPU and (b) while in-theory a soft-IPU can evolve by updating the bitstream, it is not as flexible or efficient or simple as updating the software on an IPU. However such operations can be implemented at an FPGA in any embodiments. Service management 2208 can provide active management of bitstream imaging and scheduling of slices, security attestation, policy enforcement, etc.

Service management 2208 can launch objects on demand, generate data on pull by calling a generator, and so forth. An IPU can orchestrate and host wrapper microservices whose job it is to perform the actual spawning of the real microservices they are wrapping. Even though devices (e.g., XPUs, memory, storage, other platform components) are attested and measured and brought together into compositions of virtual machines, containers, etc., some devices are easier to attach than others into a given established level of trust and some software components are more trusted than others for various reasons.

Asymmetric trust circuitry 2210 may implement the ability to enforce asymmetric trust within a composition so that, for example, data flowing from source A to destination B is subject to one set of conditions but that data flowing from B to A is subject to another set of conditions that are a more stringent set of conditions. To implement such rules, IPUs could implement multiple groups of page tables through which accesses to physical pages are handled, and logically treat different modules as if they are different processes ("subprocesses") even though data is in the same set of physical pages and mapped to by same virtual addresses with different page tables providing an indirection point for checking whether at a current time a particular sub-process is permitted to translate a particular address space address. While enforcement may be done in XPUs themselves, IPUs can act as helper units for flexibly composing such multi-subprocess spaces in which the page table pages can be organized into a hierarchy of equivalence sets and subsets.

Different levels of privilege can be associated with a VMM, a host OS, a guest OS, host OS process, a guest OS process, a host/guest OS library, etc. Instead of strictly layered trust, though, the trust relationships may be modeled by a directed graph so that a vertex A in the graph can trust a vertex B if B is reachable from A (but for B to trust A, A has to be reachable from B).

Trust broker 2212 can also protect logical structures, such as ML models, data sets, and results, protecting these as different logical devices and access controlled independently. IPUs are integrated into the platform; third party IPUs may be designed-in, e.g., some of their foundational elements may be "burned in" or "on-boarded securely". Once this is done, the IPUs can be used to constrain visibility of operations and state of one SoC component made by vendor A and another SoC component made by vendor B, according to rules of engagement between the SoC components made by different vendors A and B. Thus, B is prevented from being able to "test" A and A is prevented from being able to "test" B other than by prior rules of engagement. Thus, during a silicon debugging flow, A and B may be able to share a set of memory locations, but once debugging is complete and the platform is productized, A and B may be partially occluded from each other by randomization introduced through IPUs. This is to prevent both information extraction by probing (sending inputs that can never arise in a particular combination) and by physical scraping or tracing of ICs.

However, recognizing that occasionally it may necessary to reopen or widen the visibility of A from B or B from A, IPUs may implement mechanisms to permit temporary changes in rules of engagement. Generally this may be the case when the party that has integrated the third party SoCs from A and B brings A and B together into a shepherded testing regime so that only the prescribed tests are performed, only the prescribed tracing is done, and once the data has been collected, the rules of engagement are reset to original.

Figure 23A:
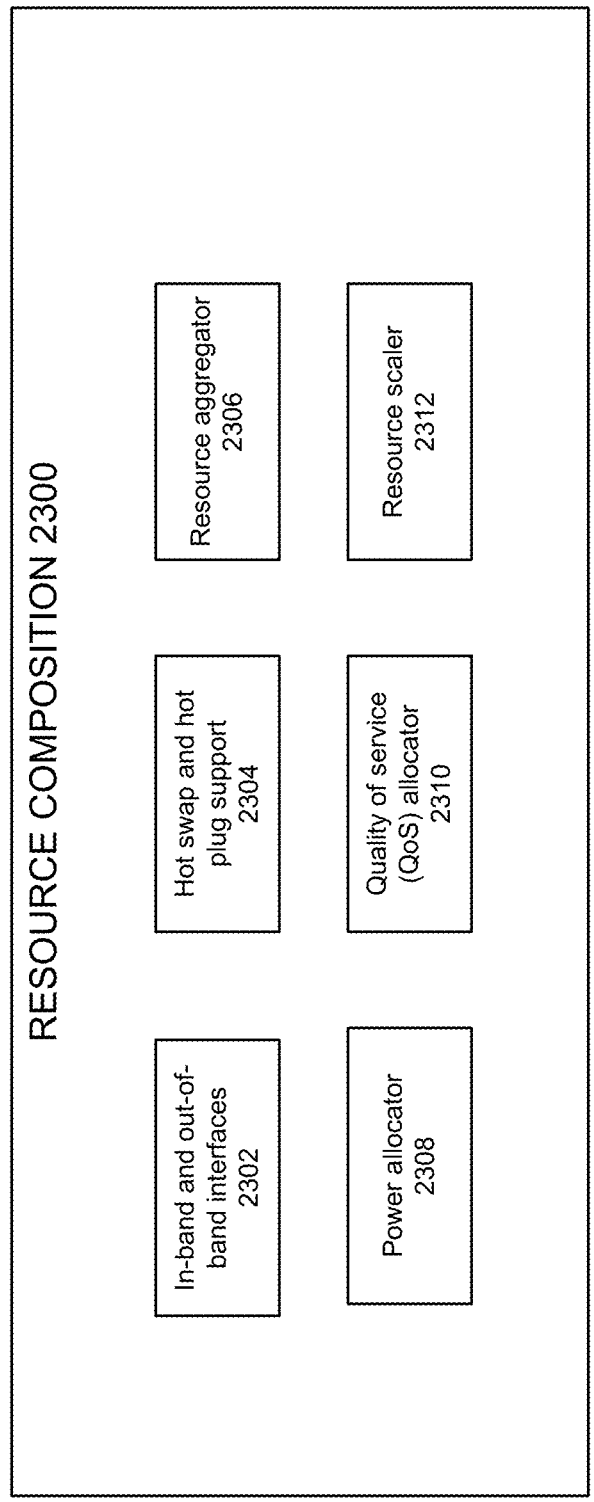
FIG. 23A depicts an example of a resource composition system.

FIG. 23A depicts an example of a resource composition system. For an IPU, resource composition system 2300 can provide headless operation through an IPU (e.g., not requiring a CPU) to initiate operations for storage, for accelerators (e.g., Intel® QuickAssist Technology (QAT) or equivalent), for GPUs, for XPUs, for memory pools (serving to datacenter peers over either a legacy NIC or a smart-NIC), or other devices. An IPU can issue commands to other devices on behalf of tenant or workload using local or remote devices. The IPU's functions such as acceleration, security, telemetry, etc. enable the dynamic composition of systems built from CPU, XPU, memory, storage resources that are either local or near to the node or remote or far located in distributed nodes.

A memory pool node can include one or more tiers of memory. For example, multiple tiers of memory or storage can include one or more of: a cache (e.g., L1, L2, L3, lower level cache (LLC)), memory (e.g., JEDEC DDR compatible memory or JEDEC HBM compatible memory), persistent memory (e.g., Intel® Optane® or Samsung Z-NAND), storage (e.g., NAND or 3D NAND), hard disk drives, or 2-level memory (2LM). Various embodiments can use at least two levels of memory (alternatively referred to herein as "2LM") that includes cached subsets of system disk level storage (in addition to, for example, run-time data). Host 1606 can include a main memory that includes a first level (alternatively referred to herein as "near memory") including smaller faster memory made of, for example, DRAM or other volatile memory; and a second level (alternatively referred to herein as "far memory") which includes larger and slower (with respect to the near memory) volatile memory (e.g., DRAM) or nonvolatile memory storage (e.g., flash memory or byte addressable non-volatile memory (e.g., Intel® Optane® or Samsung Z-NAND)). The far memory can be presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host central processing unit (CPU). Near memory may be coupled to the host system CPU via high bandwidth, low latency means for efficient processing. Far memory may be coupled to the CPU via low bandwidth, high latency means (as compared to that of the near memory).

Resource composition system 2300 can offload work from xPU, CPU or GPU to IPU. Specialized platforms (e.g., accelerators or storage) that do not have CPU or GPU or insufficient CPU or GPU resources to enhance capacity of data center can offload work to an IPU. A CPU-executed application can specify configurations and let the rest of system (e.g., IPU and its designees) handle tasks.

Resource composition system 2300 can provide headless operation. For example, an IPU can handle requests (e.g., based on dependency graph (A written before B, and B written before C so if receive A first, write A or apply atomic commit of A, B, and C (all or nothing)), ordering of execution of memory transactions (read, read, write)) and also storage of data. An IPU can manage operation order instead of initiator software issuing requests in order.

Resource composition system 2300 can communicate with an NVMe drive or persistent memory. For example, Resource composition system 2300 can treat block storage as overflow for persistent memory. Resource composition system 2300 can support NVMe-oF consistent communications. Resource composition system 2300 can store data in an NVM consistent device and return an ACK and then eventually write to persistent memory. Resource composition system 2300 can have an NVM consistent device act as a cache for read operations. NVM consistent device connected to an IPU can support read transactions. Persistent memory over fabric (e.g., Storage Networking Industry Association (SNIA) Persistent Memory over Fabrics (PMoF) or non-volatile memory over fabrics (NVMoF)) can connect with a remote memory via a network or fabric as if it is locally attached.

Resource composition system 2300 can create a composite storage node. For example, resource composition can furnish capacity to a requester but for ephemeral storage and resource composition can manage commitment of storage to a requester. Resource composition system 2300 can perform disaggregation and nano-composition, load balancing, scaling, activity migration, and power management. Resource composition system 2300 can perform orchestration and management plane operations intra-server. Resource composition system 2300 can perform composition of slices of XPUs and service chaining between XPUs.

Resource composition system 2300 can perform orchestration to take slices of resources available in machine (e.g., slices of cores, shader units, storage, and memory). Resource composition system 2300 can perform orchestration and management of resource compositions inter-server, e.g., across server boundaries (e.g., between devices A and B with at least one NIC in the path between A and B). An IPU can partition a machine for use by a particular microservice. An IPU can dismantle resources after a microservice is completed. Resource composition system 2300 can partition memory, storage, and network resources that are assembled (composed) into a workload container/instance, and securely and safely de-initialize slices or partitions reclaimed from one workload before they are provisioned for next composition such orchestration to be hierarchically layered below a higher level orchestrator for, e.g., Kubernetes (K8s), Docker Swarm, Openstack, etc., and supported by redirecting the provisioning flows through a resource management subsystem that dynamically allocates, initializes, connects, deinitializes, and deallocates.

For example, an IPU can run an orchestrator and another IPU can allocate resources. An IPU can run hypervisor and the hypervisor carves out passive parts of platform into resources. An IPU can be peers with other IPUs. Resource composition system 2300 can allow remote resources to appear local to a service initiator or IPU, and IPUs can connect remote resource by exposing remote resource as a service to bridge connection and support QoS and low latency operations.

In-band and out-of-band management interfaces 2302 can provide in-band and out-of-band management interfaces for XPUs and services running on those XPUs, through IPU-based translation. In-band and out-of-band management interfaces of an IPU can provide a shim for each XPU from an outside-in perspective, and it acts as a platform shim between the XPU and the actual platform in which the XPU sits from the inside out perspective of each XPU. Thus an IPU can perform out-of-band management of the platform or an XPU through standard management interfaces which are often out-of-band, but provide an in-band management interface to the invoker as if the management is occurring in-band.

Conversely, some operations can be implemented as in-band when triggered by something (e.g., restarting a virtual machine, trust domain or an enclave upon detection of a security violation), but now they can instead be specified as an out-of-band action, where the security violation freezes the virtual machine, trust domain or enclave, passes control to an IPU, with the IPU now acting as a virtual machine, trust domain or enclave isolator and examining it and simulating various actions on it for forensics and understanding extent of violation (and preventing any adverse side effects) before eventually restarting the virtual machine, trust domain or the enclave. In order for the IPU to provide these services to a TEE such as a trust domain or an enclave, the IPU measurements must be verified by the TEE to accept the IPU (and its selected services) into the TEE TCB. Once the IPU is accepted into the TCB, it can provide in-band services to the TEE.

When enabled by the customer, IPUs can provide telemetry for bare metal hosts by accessing state without interfering with running applications.

When a new device is on-boarded (hot-plugin), hot swapping and hot plugging support 2304 can complete the attestation and configuration steps for it, and integrate it into the platform by executing peer to peer protocols with other IPU agents and services, transparent to the remainder of the platform. The platform does not need to be restarted in general for online on-boarding to work. For off-boarding or off-lining an existing device, the resources of the device can be freed up by software and so long as this can be done, the remainder of the offboarding process, including safe and secure deinitialization of secrets, keys, sensitive data, can all be performed at an IPU. Hot swapping and hot plugging support 2304 can act as a device management entity for the platform to provide security isolation by moving the management software from the less secure multi-tenant host CPU. This architecture also works for headless platforms.

Resource aggregator 2306 can implement Simple Network Management Protocol (SNMP), Intelligent Platform Management Interface (IPMI), RedFish, SwordFish, and newer declarative RESTful mechanisms (from Distributed Management Task Force (DMTF), Open Compute Project (OCP), other communities) through the IPU fabric for agile nano-compositions of resources assembled from different XPUs, memory and storage partitions, and NICs with swift allocation and deallocation. Emulation of virtual bare metal platform management for multi-tenants can be performed. An IPU may compose slices of resources at each XPU, and do so at small units and over time at fine granularity. A federation of responsibilities among the IPU elements that bridge XPUs to other XPUs can be formed to allocate resources.

Power allocator 2308 can coordinate fine-grained platform power allocation tenants or services to allocate power based at least on priority of tenant or service. For example, a priority microservice running on XPU1 and XPU2 receives coordinated frequency increases at XPU1 and XPU2, while a best effort (lower priority) microservice running on XPU1 or XPU2 can be assigned less power. Such coordination can utilize simultaneous engagement of a policy at multiple XPUs and may not be performed just by coordinating among software runtimes on the different XPUs except at a very coarse time scale (and it requires group scheduling support in schedulers). Various embodiments of power allocator at an IPU provide fine time scale power allocation.

Quality of service (QoS) allocator 2310 can allocate close and open loop QoS/service level agreement (SLA) controls spanning multiple resources, through the use of a set of satisfaction functions provided (encoded) into IPUs. As a local control point, QoS allocator 2310 can provide faster response times for monitoring and adjusting QoS or SLA parameters that avoids oscillations which can result in an unstable system. Instead of a fixed way to achieve close-loop QoS control, the policies, iterations, trial-and-error mechanisms, can be codified into QoS allocator 2310, and thus IPUs can collaborate to reach stable equilibria in allocating different XPU resources among different microservices.

For example, satisfaction functions (equations) can define different possible allocations of resources by which each microservice can achieve a desired balance between a cost function and a reward function (e.g., service A can use 4 Xeon cores and 12 EUs on a GPU, or it can use 2 Xeon cores and 18 EUs, or it can use just 1 Xeon core and 28 EUs for a good tradeoff between cost (latency) and performance. Service B can be allocated 6 Xeon cores and 13 EUs, or 8 Xeon cores and 21 execution units (EUs), etc. QoS allocator 2310 can iterate a satisfiability function across different possible configurations to find the best match tradeoff for each service and across services by weighting their normalized figures of merit. Also feeding into all this is the utilization and performance statistics and latency samples from applications and XPUs.

Resource scaler 2312 can perform auto-scaling of hardware components and infrastructure capabilities such as bringing on-line reserved computation or storage capacity from local or remote partitions, or placing unused capability into reservation, and thus making it available for remote consumption. In some embodiments, one or more of these operations may be implemented based on AI models derived using machine learning. IPUs may implement and train AI models for such operations.

Resource scaler 2312 can enable the IPU to make fast local decisions on allocation and usage of predefined resources (e.g., CPU, storage, memory, XPU) to provide a faster response on handling failures or dynamic changes in resource requirements. Local decision making can also allow for higher survivability in an event of catastrophic failures to the main Control Plane such as the Control Plane going down or losing connectivity to the data-plane. In such cases, the local control plane on the IPU can manage and continue operation until the recovery of the fault.

As part of the composition of the system between different XPUs, CPUs, memory, storage, and services, the IPU can facilitate coordination between these resources. In some examples, an IPU (e.g., execution manager 2124) can manage tracing of a call flow, event correlation for detecting security events, and so forth. The IPU can also be used to as an active part of the data flow to manage data dependencies and debugging. Examples of IPU intervention can include fencing or barriers for debugging or dynamically modifying data for the sequence of processing, a centralized function such as leader election, replication of requests or data for debugging or compliance logging that can be inserted as part of the data flow without impacting end applications.

Figure 23B:
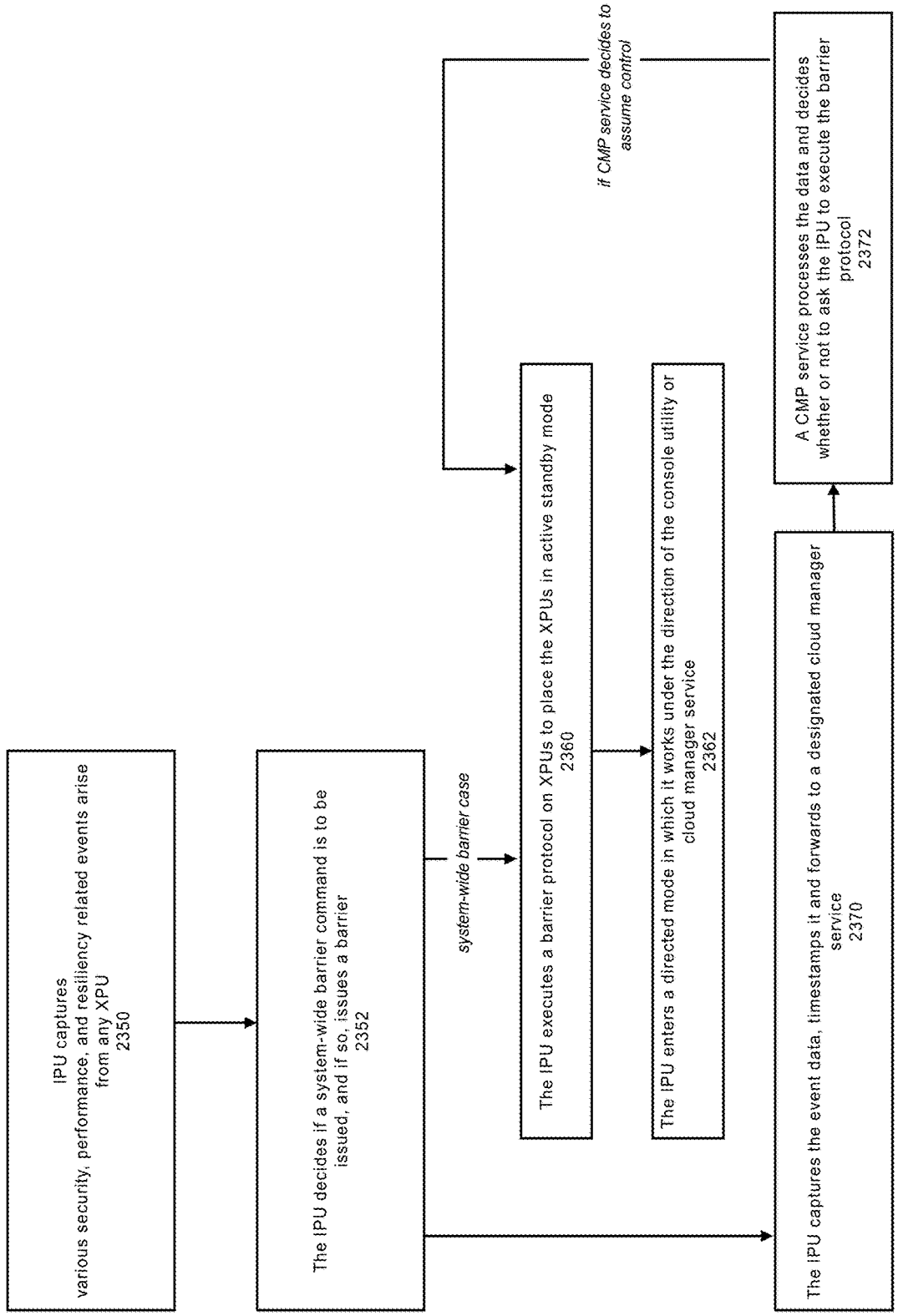
FIG. 23B depicts an example manner by which an IPI coordinates resources.

FIG. 23B depicts an example manner by which an IPU can coordinate use of various resources. At 2350, an IPU can capture various security and resiliency related events or performance extrema events from any XPU. For example, security and resiliency related events can include voltage droops, too high a memory error correction rate (e.g., rate above a threshold), thermal events (e.g., temperature of a device or component exceeding a threshold), detection of physical SoC intrusion (e.g., at a sensor), vibration sensing, etc. Performance extrema events can include loss of heartbeat signals from some XPUs, timeouts reported from hardware (e.g., due to congestion or loss of a wakeup event following a blocking I/O operation), etc. In some cases, performance management unit (PMU) telemetry may be collected by software such as perf, emon, vtune, etc., and upon filtering the PMU telemetry, software may detect an abnormal number of unexpected events (e.g., orders of magnitude increases in machine check errors, floating point underflow events, etc.). In other cases sensors may detect thermal trips, voltage droops, excessive memory errors, excessive disk errors, network data integrity exceeding accepted threshold limits, heartbeat timer expirations (e.g., no heartbeat signal received before a timer expiration), etc. Such events, may arise at any system component in a composite node, and may arise without being caused by a specific microservice but may affect others microservices that may be running on various composite nodes that share such a component. However, it is also possible that a particular XPU, such as an FPGA, may report abnormal signals while that FPGA is executing a function in the context of a microservice, and the error or abnormality may only cause that microservice to stop, crash, or otherwise malfunction. However, due to a chain reaction, other microservices with which the affected microservice interacts may begin to experience loss of performance, incorrect responses from the affected microservice, etc.

At 2352, the IPU can determine whether to issue a system-wide barrier command based on a configuration to perform in response to errors or abnormalities of a particular type. For example, a configuration and the actions to perform may be determined by the execution of a control program at an IPU. The control program may be uploaded into the IPU at system start time, and revised or updated thereafter, in concert with a cloud based IPU reliability manager service or by a console utility in a special mode. The control program that the IPU executes may be constructed to decide to issue a system-wide barrier under one or more conditions such as the detection of corruption in a critical region of supervisor owned memory or other performance extrema events. The control program may determine not to issue a system-wide barrier for one or more conditions that are not considered to be serious, such as a malformed network packet being discovered (and dropped), a retry-signal from a storage device, less than a threshold number of errors or performance extrema events detected, etc. If the IPU determines to issue a system-wide barrier, the process can proceed to 2360. If the IPU does not determine to issue a system-wide barrier, the process can proceed to 2370.

At 2360, the IPU can execute a barrier protocol on XPUs or IPUs that provide resources as a composite node. A composite node can include at least one resource from at least one XPU that is affected by a detected abnormality. For example if a memory corruption is detected at some physical address P in memory, and if that range of memory is currently placed in a composite node C, and the composite node C has various slices (e.g., some number of CPU or GPU cores, some partitions in an FPGA, etc.) of various XPUs X1, X2, and X3, then all such XPUs may proceed into a barrier. For each such XPU, the IPU can issue a barrier notification.

A XPU can observe and respond to the barrier notification by entering suspend mode but stay active, in a mode called an standby mode, to enter to lower power mode and suspend operations for the composite node. The XPU can issue an acknowledgement to the IPU that the standby mode has been entered. The barrier can be implemented when all XPUs have responded to the IPU with an acknowledgement of entering active standby mode.

When this condition is reached (e.g., all XPUs of a composite node are in barrier and waiting in active-standby), the IPU control program enters a mode called directed mode at 2362. At 2362, the IPU control program works under direction of a console utility or cloud manager service. In the directed mode, the IPU and all the XPUs which the IPU has placed in active-standby mode, work under the direction of a console utility or a cloud management platform (CMP) service. At a later time, the console utility or the CMP service can issue a release, and that release can permit the IPU and the XPUs to exit active-standby mode and execute any non-migrated microservice not completed but received prior to the barrier entry.

In some circumstances where the CMP service or a console utility are non-responsive (or communication with them is found to be non-responsive), the control program of the IPU may time-out, and issue a system restart and retest so that the IPU and the XPUs can perform any repair actions they are capable of performing under the control of their supervisory software (such as an operating system stored in a recovery partition). In more some circumstances, the IPU establishes communication with a console utility or a CMP service, and then performs various operations as directed by the console utility or the CMP service. The XPUs of the composite node that have been placed in the active-standby mode at the start of the directed mode execution of the IPU can receive commands from the IPU, such as in the form of various hardware signals, network packets, or memory based communication. When XPUs receive the commands, the XPUs can perform those commands and then re-enter the active-standby mode. Accordingly, the IPU and the XPUs with which it is communicatively coupled, execute in lockstep progression to perform actions directed to be performed by the console utility and/or the CMP service.

If the IPU determines not to issue a system-wide barrier, the process proceeds to 2370. At 2370, the IPU captures event data, time stamps the event data and forwards event data to a designated cloud manager service. In some examples, the IPU logs the information to a designated log device/service. At 2372, the CMP service can process the event data and determine whether to request the IPU to execute a barrier protocol. The CMP service can determine to execute a barrier protocol if it determines, from the analysis of the event data from 2370, that the composite node indicated in the events has encountered a high severity condition. In such a case, the CMP service may be programmed to bring the IPU under directed execution so that the CMP service can repair the composite node, halt the execution of the composite node, or initiate controlled evacuation (migration) of various microservices and data from the affected composite node to another adequately operating node or composite node.

In other cases, the CMP service may determine from an examination of the event data from 2370 that the data indicates an occurrence that is not severe, but is very rare and valuable to study in detail. In that case, the CMP service may cause the IPU to cause a barrier so that additional data of forensic interest can be gathered from the composite node before such data is obscured by continued execution of the composite node.

Alternatively, the CMP service may decide not to execute a barrier protocol if the event data from 2370 upon analysis does not warrant the delay and the loss of performance from imposing a barrier on devices in the composite node. For example, analysis of the logs from 2370 may indicate a non-malicious attempt to perform a prohibited operation, such as a security canary program that attempts to probe for security vulnerabilities. When the CMP service determines not to execute a barrier protocol, normal execution continues whereby the IPU does not force a barrier, nor does the CMP service, so the collected events in 2370 can be stored or discarded according to their statistical significance as determined by the CMP service.

Connection Between IPU-IPU or IPU-Network Interface

Various embodiments provide for an agent on a CPU, XPU, or SmartNIC in one node capability, using an IPU, to call or message to, any agent on a CPU, XPU, or SmartNIC in another node, peer to peer. Various embodiments of IPUs provide consistent access across local CPU, XPU, storage, memory and remote CPU, XPU, storage, memory. Acceleration of remote connectivity can minimize latency or jitter and improve reliability to provide near-local experience. Secure queues and secure tunnels can be used to provide communication connected to an IPU.

Various embodiments provide an asynchronous messaging architecture between devices that creates an end-to-end control plane. An IPU can coordinate messaging to allow for end-to-end services to negotiate quality of service (QoS), deliver resource utilization information etcetera. An IPU can provide QoS and security for support of multiple tenants using shared resources. An IPU can allow other elements (e.g., load balancer) to better optimize the distribution of work.

For example, in a service chain involving video capture by a video camera, video compression, and video storage. An IPU can allow direct access to compute, memory, storage, XPUs by another device via another IPU. The IPU can include a hardware queue manager (HQM) and special instructions (e.g., instructions that target the queues) can provide for such flows end to end.

IPUs can implement a smart layer above legacy NICs as well, such as vSwitch offload and packet processing. Data path bridging and device virtualization can provided between XPUs (e.g., XPUs can include CPUs) that use an IPU to communicate with SmartNICs or legacy NICs. Data path bridging can be provided between memory/storage that use an IPU to communicate with another NIC. XPUs can access data via memory domain and IPU bridges memory domain in remote memory domain. When XPU accesses a memory domain, XPU can access memory remote also as though it were local memory.

Figure 24:
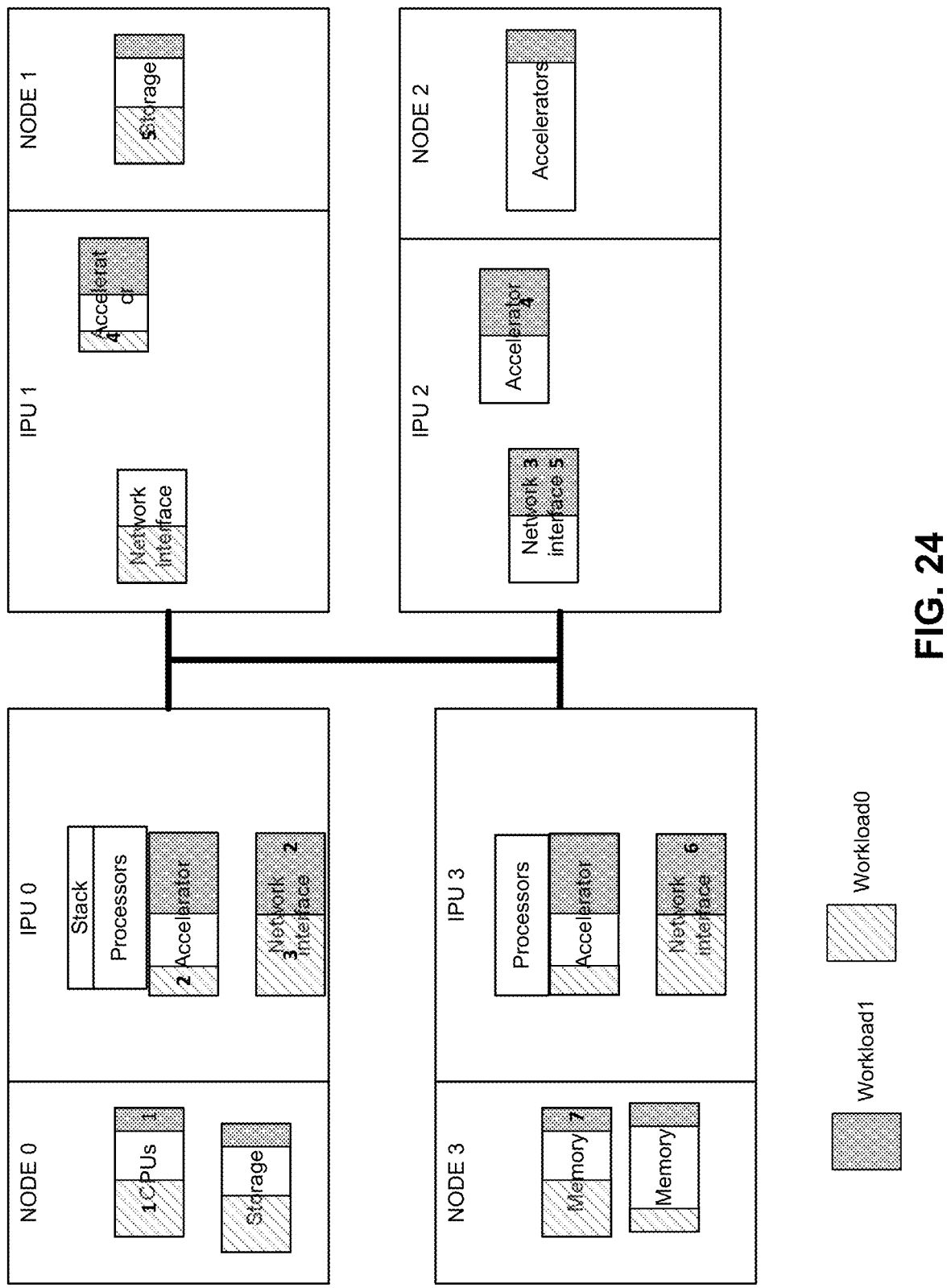
FIG. 24 depicts an example of resource allocation by an IPU using resources at an IPU and resources in other IPUs and nodes.

FIG. 24 depicts an example of resource allocation by an IPU using resources at an IPU and resources in other IPUs and nodes. In this example, workload0 is allocated resources in IPU 0, NODE 0, IPU 1, NODE 1, IPU 3, and NODE 3 but not in IPU 2 or NODE 2. In this example, workload1 is allocated resources in IPU 0, NODE 0, IPU 1, NODE 1, IPU 2, NODE 2, IPU 3, and NODE 3. In this example, resources allocated for use by workload0 are partitioned to not share memory or cache space with any other workload. Resources allocated for use can be attested for example by IPU 0 so that in a service chain operation, after a device completes processing a data, the device can provide the data for transfer via an IPU to a next device that is to process the data.

In the example of FIG. 24, at (1) a workload0 executing on a CPU of NODE 0 issues an API call to a resource manager (accelerator) of the IPU 0 to call operation of a service function chain of microservices. At (2), an accelerator of IPU 0 can perform a microservice of attestation of resources and other IPUs as described herein for microservice0. At (3), network interface of IPU 0 can issue a request to IPU 1 to perform a microservice of accessing an accelerator accessible in IPU 1. At (4), the accelerator can perform a micro service of processing the data (e.g., crypto or packet processing) and at (5) perform a micro service of storing the data into a storage device of NODE 1. Microservices can access data without requesting an intermediary to provide permission or attestation of the CPU.

At (1) a workload1 executing on a CPU of NODE 0 issues an API call to a resource manager (accelerator) of the IPU 0 to call operation of a service function chain of microservices. At (2), a network interface of IPU 0 can issue a request to IPU 2 to perform a microservice of accessing an accelerator accessible in IPU 2. At (3), the network interface of IPU 2 receives the microservice request and at (4), the IPU issues a request to the accelerator to perform the processing associated to the microservice (e.g., compression or video processing). At (5) and (6) network interface of IPU 2 can send the data to network interface of IPU 3. At (7), the IPU 3 can perform a microservice of storing the data (e.g., result logging or source video for compliance) into a memory device of NODE 3. Secure microservices can access data without requesting an intermediary to provide permission.

Referring again to FIG. 19, accelerators 1916 can perform one or more of range, RegEX and HALO (see, e.g., Y. Yuan, Y. Wang, R. Wang, and J. Huang, "HALO: Accelerating flow classification for scalable packet processing in NFV," in Proceedings of the 46th IEEE/ACM International Symposium on Computer Architecture (ISCA '19), Phoenix, AZ, June 2019) at IPU, to provide for flexible substitution within RegEx—substitution of variables, pointers, etc., so that IPUs can be general purpose stateful and dynamic routing/switching and traffic filtering elements. The regex capability can be used for Deep Packet Inspection (DPI), Metadata Object Search, HTTP policy and can be combined with HALO, general purpose condition evaluation through the indirection mechanism of HALO. HALO can be used at least for key-value look-up (e.g., range, m-trie) and chained search/lookup. While all this could be performed in processor-executed software at an IPU, using hardware acceleration within an IPU can perform complex condition evaluation at high throughput in the data flow between XPUs, and between XPUs and legacy/smart-NICs. Accelerators can parse, search and transform structured data such as storage objects, meta data, RPC/API parameter values, key-value stores.

Time Stamp Manager

Referring to FIG. 19, time stamp manager 1910 can perform various features described herein. Microservices can interact with one another through RPC, API, or Google remote procedure call (gRPC) calls/messages, so if the messages are handled by each callee in virtual time order, the updates get logged in a distributed fashion in a logically time-ordered, serializable manner. Monitoring, Tracing, Debugging can provide Integrated Time-Sensitive Networking (TSN)/Time Coordinated Computing (TCC) with high resolution coordinated timestamps for messages between microservices, whether those microservices are executed in the same XPU, in different XPUs in a same node, or between nodes. The timestamps can be automatically hashed against gRPC message IDs into a timestamp stash and signed by IPU signatures to permit secure and fine-granular ordering among gRPC based invocations and data transfers. Thus lockless distributed transaction atomicity can be achieved by timestamp serialized, coordinated updating of state at transactional boundaries. Accurate event logging can enable correlation of distributed events that can be used for intrusion detection, failures in application behavior, system load, etc.

Time stamp manager 1910 can obtain and maintain time and event correlated statistics on hard and soft faults and errors, and enable fielding processing for distributed statistical models to predicting faults, failures, and high severity performance events such as increasing numbers of retries. Various embodiments provide for continuous integration and continuous delivery (CI/CD) at scale, covering both hardware and software. Policies embedded at IPUs can enable predictive repairs or proactive graceful shutdowns and restarts, and also enable anticipatory throttling of speed to prolong mean time between failures (MTBF); also enable proactive migration of essential services to peer units.

Memory and Storage

Referring to FIG. 19, IPU can provide memory and storage controller 1912. Memory and storage controller 1912 can emulate a hybrid storage device such as generating communications consistent with NVMe-oF and non-volatile memory over fabrics (NVM-oF) caching. Further, memory and storage controller 1912 can support emulation of a logical high capacity NVM-oF tier, and support that on top of limited amount of local NVM (or a small amount of local commodity NVDIMM) for buffering data in transit to storage or remote memory). Local volatile DDR memory may be used to emulate high capacity NVM by performing local read-only caching with write-through to remote memory through RDMA or virtual RDMA. This hybrid emulation with local caching can also apply for remote DDR/memory emulation.

Memory and storage controller 1912 can provide multi-version concurrency control from databases to manage requests of a versioned copy of data not just a latest version. Memory and storage controller 1912 can act as the storage control and supports multi-version concurrency control or relaxed consistency. Memory and storage controller 1912 can support RDMA or virtual RDMA, where an IPU can appear as a local memory or storage device or generates remote transaction to remote memory or storage device. For example, IPU can appear as 2 PBytes of memory and create a composite node and accesses using RDMA.

Memory and storage controller 1912 can perform background sending of write-ahead logs (WAL), and background WAL-rendering at remote peers through IPU based state engine allowing inexpensive active-active hot standbys and autonomic restart and recovery through transparent replay of the tail of WAL log. The WAL can be collected at an IPU with very little change to software. Software could write using a wrapper library for load and stores, which are intercepted by a library that software does not care about and this library could construct the WAL and ship it to an active-active peer node through an IPU. The IPU can pack and ship log segments between nodes, ideally through a high priority reserved virtual channel. On a failure or restart, latest WAL update is obtained from an active-standby peer and applied transparently to achieve fast recovery and restart. Application software may provide end of transaction markers, or end of a multi-transaction marker, so that the IPU can effectively render atomically up to the last marker.

Memory and storage controller 1912 can provide PMoF (Persistent Memory over Fabric)/NVMe-oF with transactional closure by write-through to system NVM partitions, with or without Intel® Data Direct I/O (DDIO) that provides copying from a NIC to a cache without copying data first to memory and then to a cache. Memory and storage controller 1912 can manage attached devices such as by performing partitioning, virtualization, encryption, compression, and services such as access authentication, key management, and computational processing (software or hardware).

Figure 25:
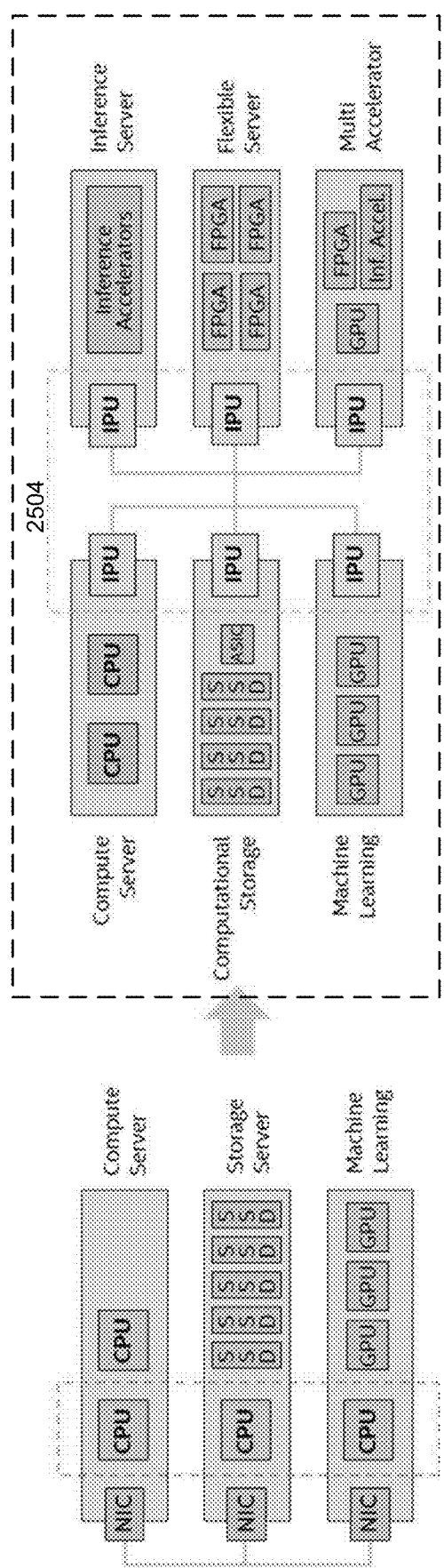
FIG. 25 shows various embodiments of a system.

FIG. 25 shows various embodiments of a system. For example, a compute server with CPUs and a NIC can be communicatively coupled to (A) a storage server with a CPU and one or more solid state drives (SSDs) via a NIC and (B) a machine learning node with a CPU and one or more GPUs via a NIC. In the embodiment 2504, infrastructure processing units (IPUs) can provide interconnectivity between a compute server, computational storage, machine learning node, inference server, flexible processor server or multi-accelerator node.

Figure 26:
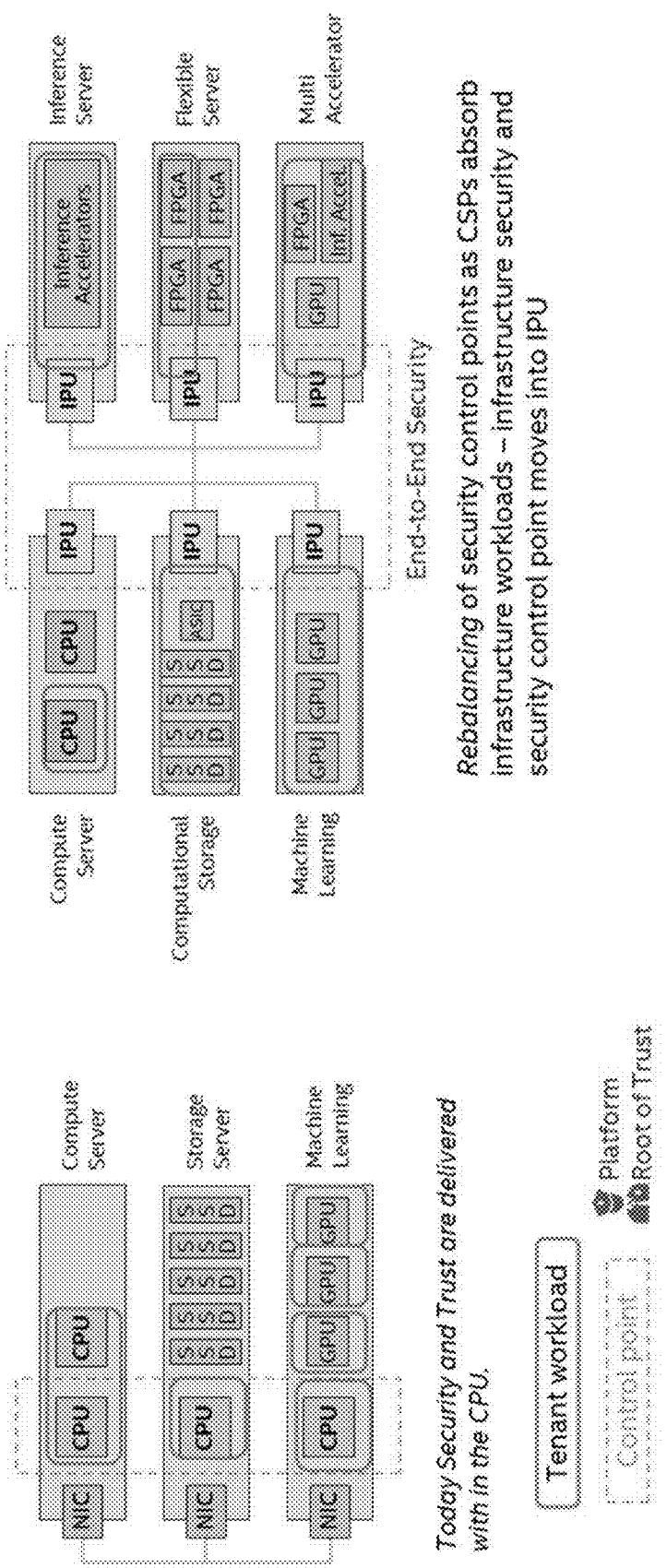
FIG. 26 depicts an example system that depicts rebalancing of security control points to IPUs from CPUs.

FIG. 26 depicts an example system that depicts rebalancing of security control points to IPUs from CPUs to handle workload execution by cloud service providers (CSPs). Various elements of IPU shown in FIG. 19 can be used to provide security control points such as secure resource manager and security root of trust.

Figure 27:
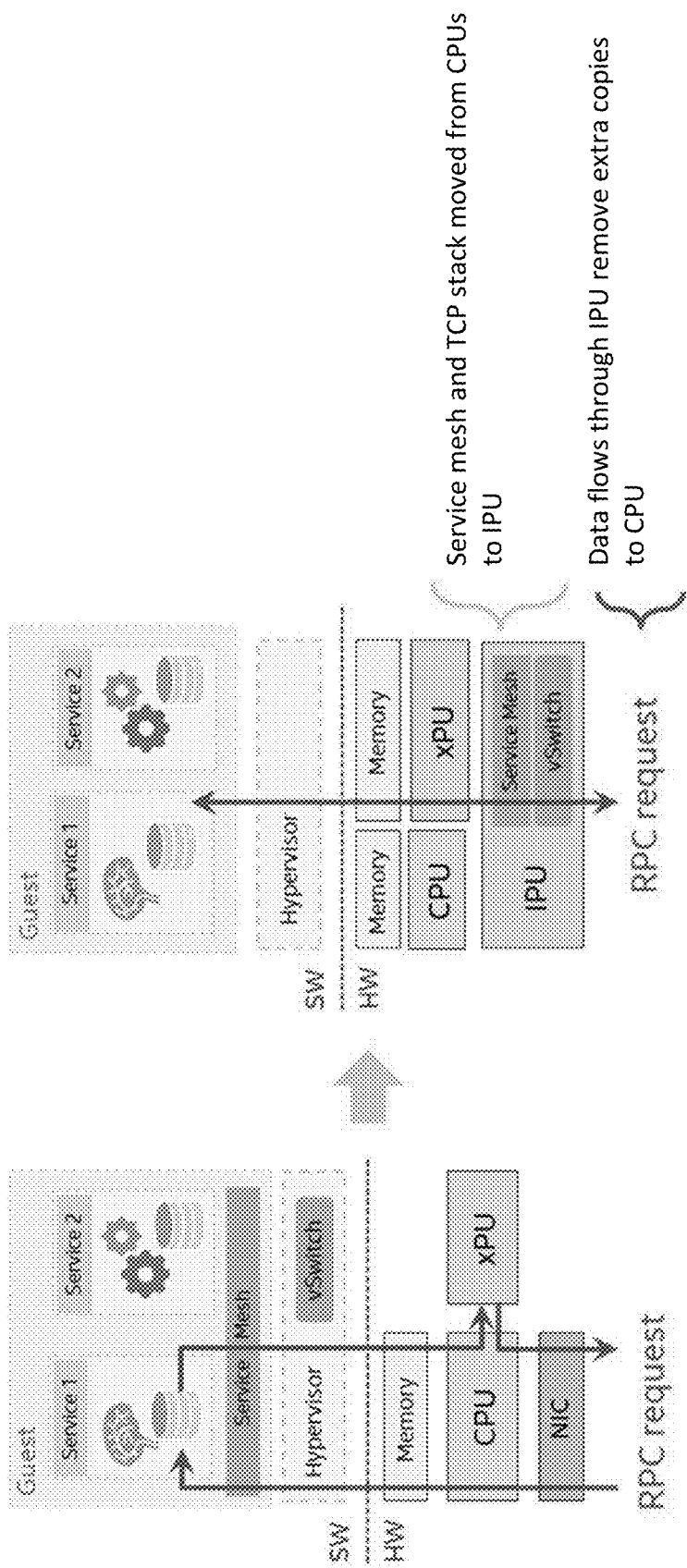
FIG. 27 depicts an example system.

FIG. 27 depicts an example system. Various embodiments of an IPU can perform service mesh, TCP, QUIC, reliable transport stack and a virtual switch (e.g., Open vSwitch) instead of a CPU of a host system. The IPU can manage data flows to reduce data copy operations.

Figure 28A:
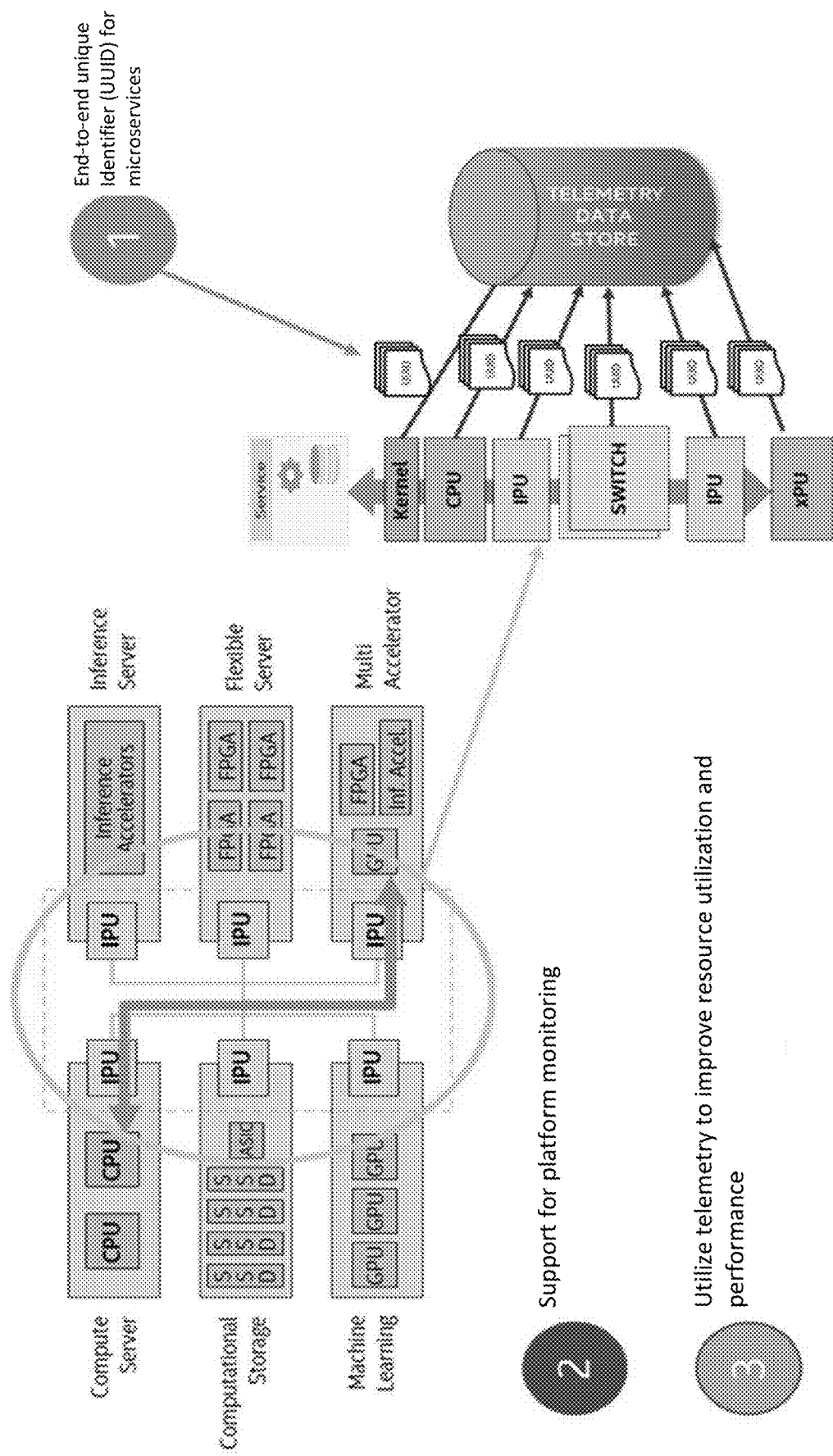
FIG. 28A depicts an example system with end to end telemetry.

FIG. 28A depicts an example system with end to end telemetry. A unique identifier can be provided for a microservice. Use of the identifier (e.g., UUID) by IPUs can allow for tracking timing of execution and completion across different components, platforms, microservices, etc. to provide for performance monitoring and attestation in some examples. Performance tracking can be used to modify resource allocation for a service such as by providing additional or different resources for execution of a service if the service runs too slowly at any juncture.

Figure 28B:
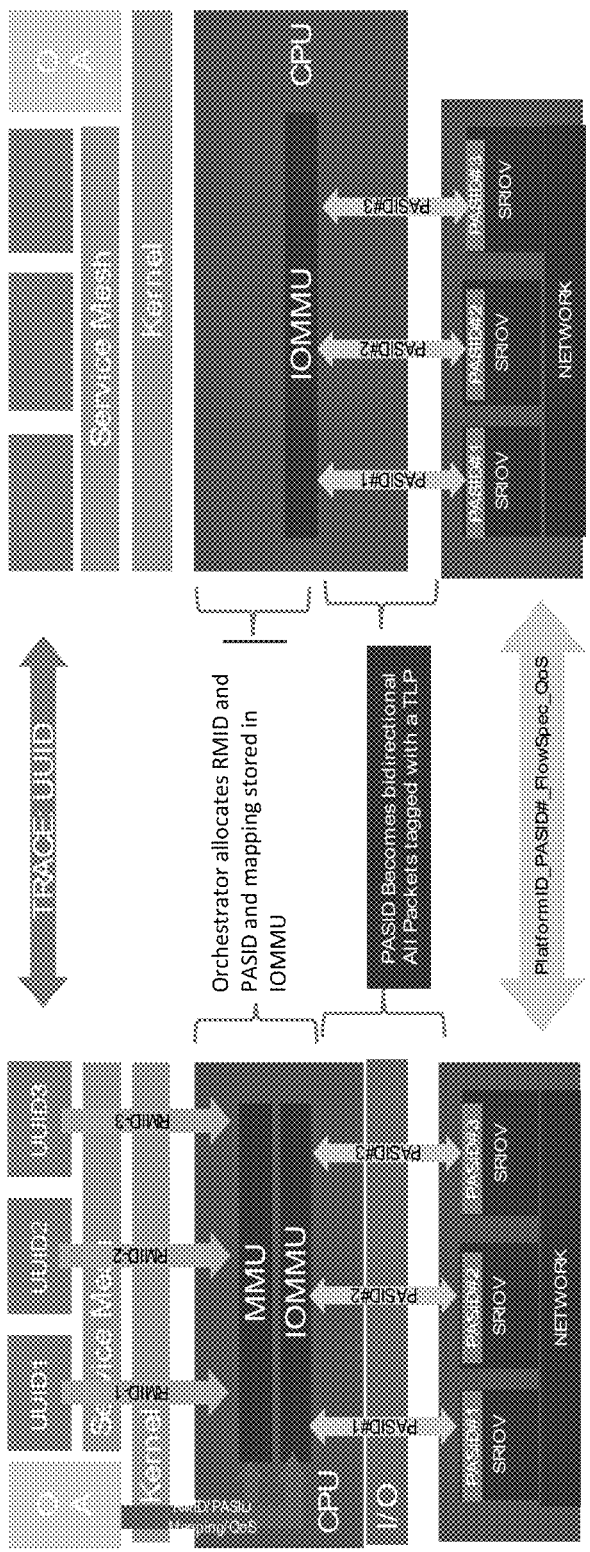
FIG. 28B depicts an example system use of workload execution on multiple systems. UUID can be used to identify microservices.

FIG. 28B depicts an example system use of workload execution on multiple systems. UUID can be used to identify microservices.

Figure 28C:
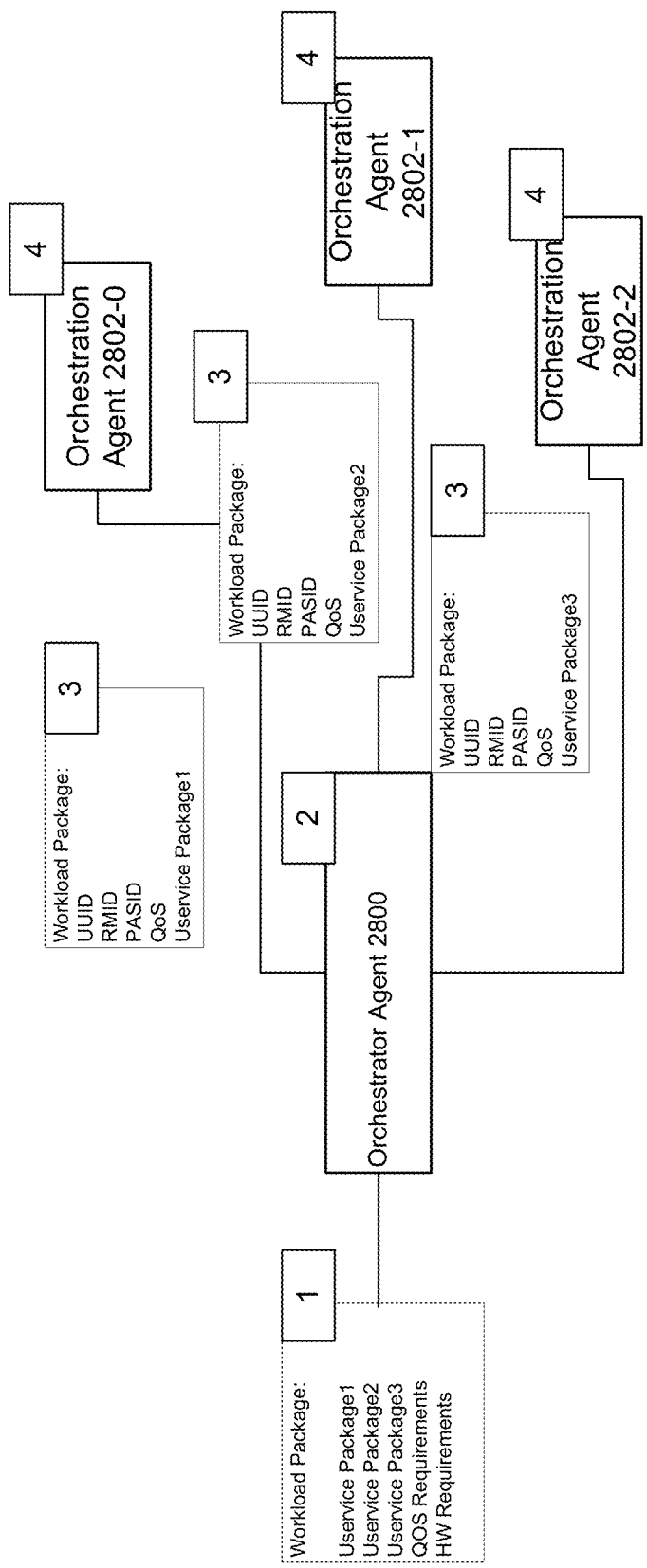
FIG. 28C depicts an example of use of telemetry to manage workload execution.

FIG. 28C depicts an example of use of telemetry to manage workload execution. At (1) orchestration agent 2800 executing on an IPU can receive a workload package that identifies one or more microservices (uServices) with a set of QoS requirements and hardware requirements. At (2), orchestrator agent 2800 can analyze the request and determine what resources are required to run the services and its associated uServices. Orchestrator agent 2800 can assign a universally unique identifier (UUID), Resource Manager Identifier (RMID), quality of service identifier (QoSID) and Process Address Space ID (PASID) for tracing each microservice.

At (3), the workload is partitioned and sent, at (4), to Orchestration Agents 2802-0 to 2802-2 receive the uService and the associated identifiers. At (4), the Orchestration Agents 2802-0 to 2802-2 provide the identifiers to the entities that are participating in performing the service before or as the uService is executed. For example, a PASID can be configured in a memory management unit (MMU) and input-output memory management unit (IOMMU) and accelerator, RMID configured in an attached CPU and the UUID configured in a service mesh as an example. UUID can also be locally assigned and based on a common protocol or schema understood by entities in the data flow.

Within a given system there may be one or more agents that interact to ensure that service can be executed. The IPU may have the primary Orchestration Agent talk to satellite local Agents and provide the workload to execute and the appropriate identifiers.

Figure 28D:
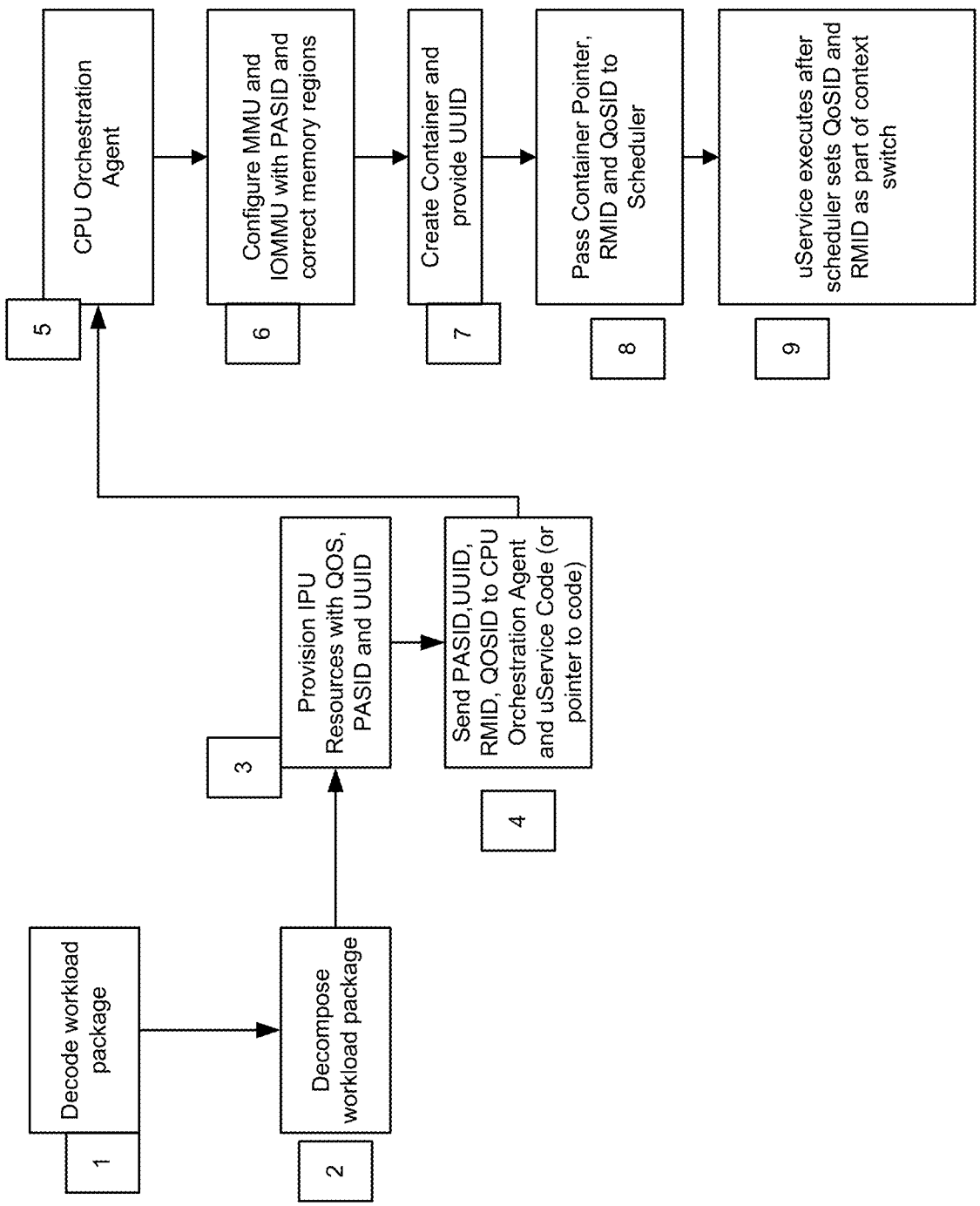
FIGS. 28D and 28E depict an example of use of an IPU requesting workload execution by a CPU.

FIG. 28D depicts an example of use of an IPU requesting workload execution by a CPU. At (1), an Orchestration Agent executing on an on IPU can decode a workload package. At (2), the Orchestration Agent can decompose the request and at (3) configure local resources with identifiers (e.g. Virtual Network). In addition, Orchestration Agent can send, at (4), UUID, PASID, QoSID and RMID as well as the microservice (uService) code (or pointer to the code) for processing to the CPU Orchestration Agent at (5). At (6), the CPU Orchestration Agent can configure the MMU and IOMMU with PASID and, at (7), set up the container assigning UUID. At (8), the CPU Orchestration Agent can pass the handle to the scheduler with ContainerID, RMID and QoSID. At (9), a uService can be executed by the CPU with scheduler settings RMID and QoSID as part of context switch to execute code.

Figure 28E:
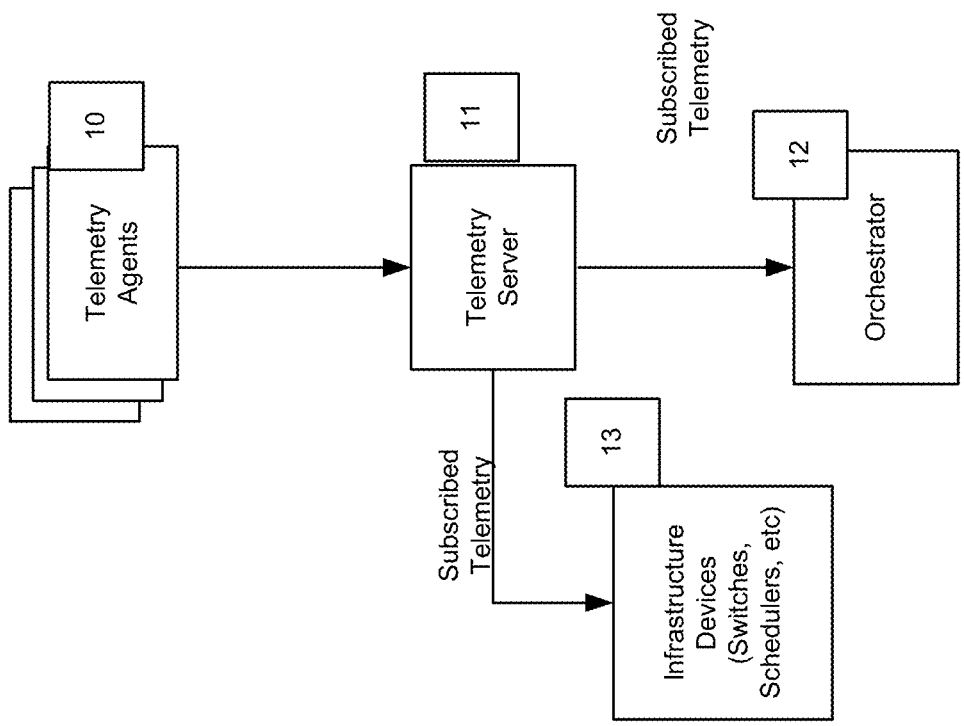

Referring to FIG. 28E, at (10) Telemetry Agents (in every execution unit) can collect performance data as the code executes and flows through CPU and any attached devices (e.g., IPU). At (11), telemetry can be reported to the central telemetry server. At (12), the orchestrator and at (13) other devices can leverage telemetry to ensure SLA is being met and reports any excursions. Orchestrator Agent of the IPU can use data to ensure services are correctly load balanced in the system and make adjustments to the resources being used to execute services if SLAs are not being met.

Figure 29:
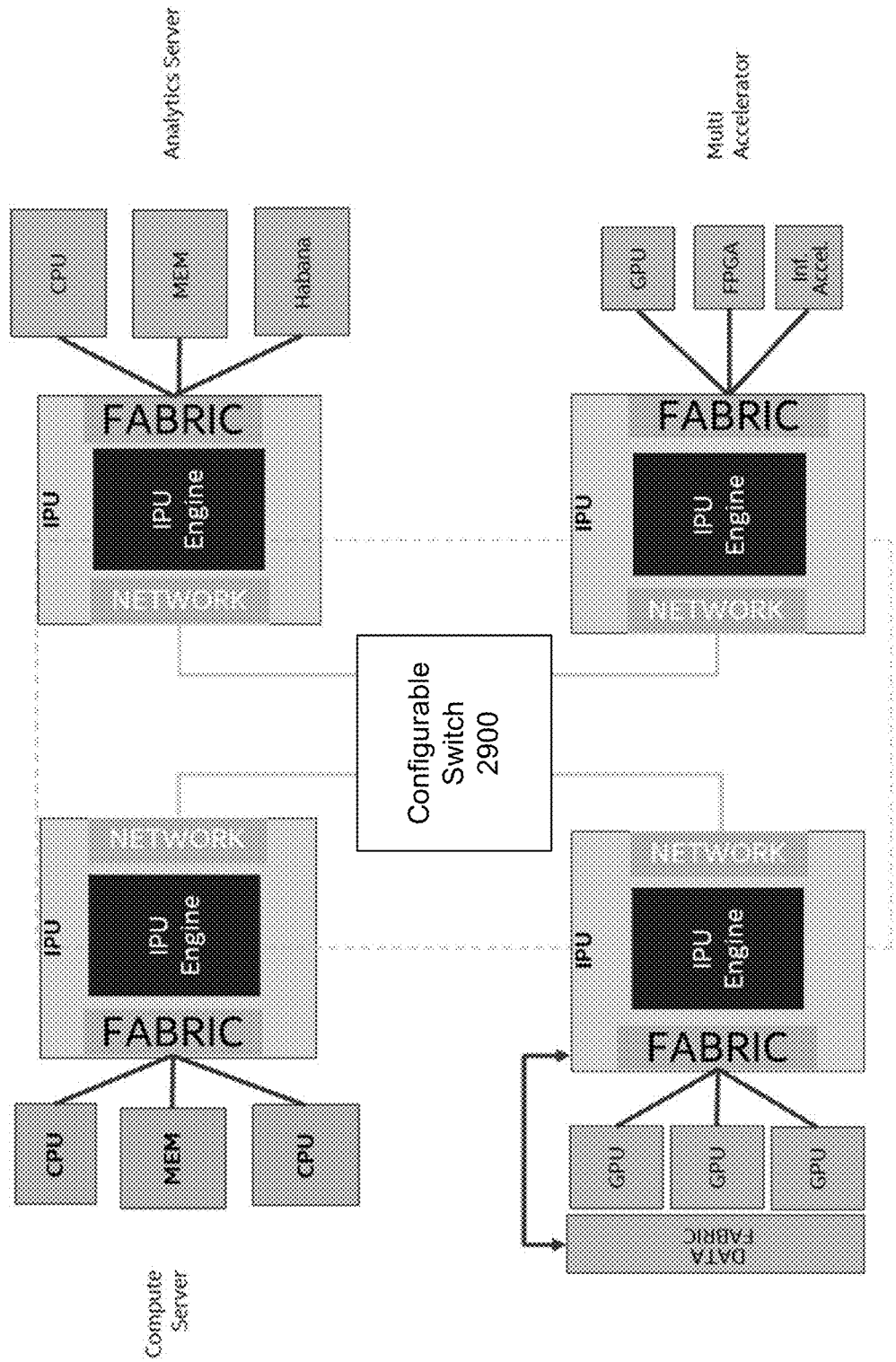
FIG. 29 depicts an example system connected using a configurable switch.

FIG. 29 depicts an example system connected using a configurable switch 2900. For example, IPUs can be communicatively coupled using a Barefoot Networks Tofino programmable switch. The Tofino switch can provide additional telemetry information back to the IPU. This can include information on network/media usage, congestion, packet drops, and latency. This information can be used by the IPU to adjust load balancing, service attachment, and requests for additional resources. This ability can also enable the network operator to have detailed information on what services and applications are impacted during service failures, such as a link failure.

Configuration of operation of any IPU or switch 2900, including its data plane, can be programmed using P4, C, Python, Broadcom Network Programming Language (NPL), or x86 compatible executable binaries or other executable binaries. Programming of hash-lookup can occur to program packet forwarding by a data plane of switch 2900. For example, match-action tables or circuitry can be used whereby a hash of a portion of a packet is used as an index to find an entry. In addition, switch 2900 or an IPU can perform packet replication for forwarding of a packet or frame to multiple ports and queuing of packets or frames prior to transfer to an output port. Configuration of operation of switch 2900 or an IPU, including its data plane, can be programmed using P4, C, Python, Broadcom Network Programming Language (NPL), or x86 compatible executable binaries or other executable binaries. Programming of hash-lookup can occur to program packet forwarding by a data plane.

Figure 30:
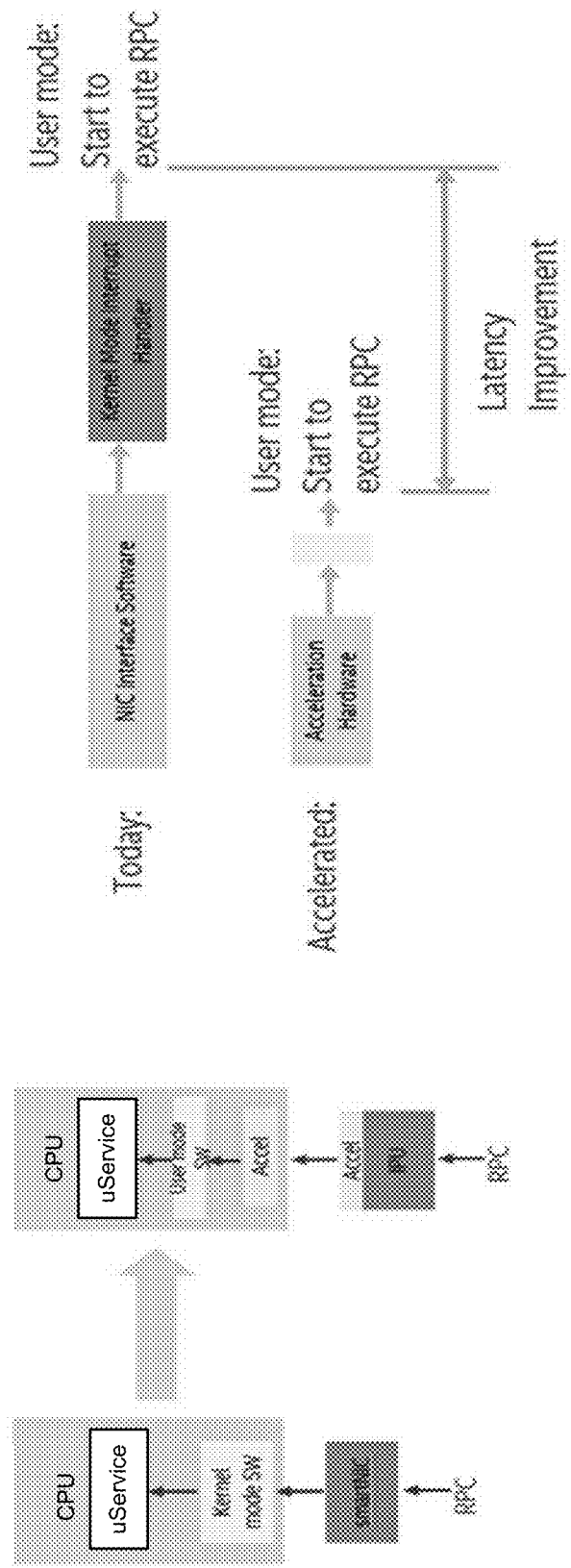
FIG. 30 depicts an example of microservice communication acceleration.

FIG. 30 depicts an example of microservice communication acceleration. In some embodiments, a resource composition or other element of IPU can dispatch execution of a microservice to an accelerator in the IPU or accelerator in another node. The IPU offloads (e.g., reliable transport, TCP, QUIC, encryption, service mesh) enable lower latency and tail latency. The offloads also enable bypassing the kernel for these functions, allowing the IPU to send directly to the user space application.

Figure 31A:
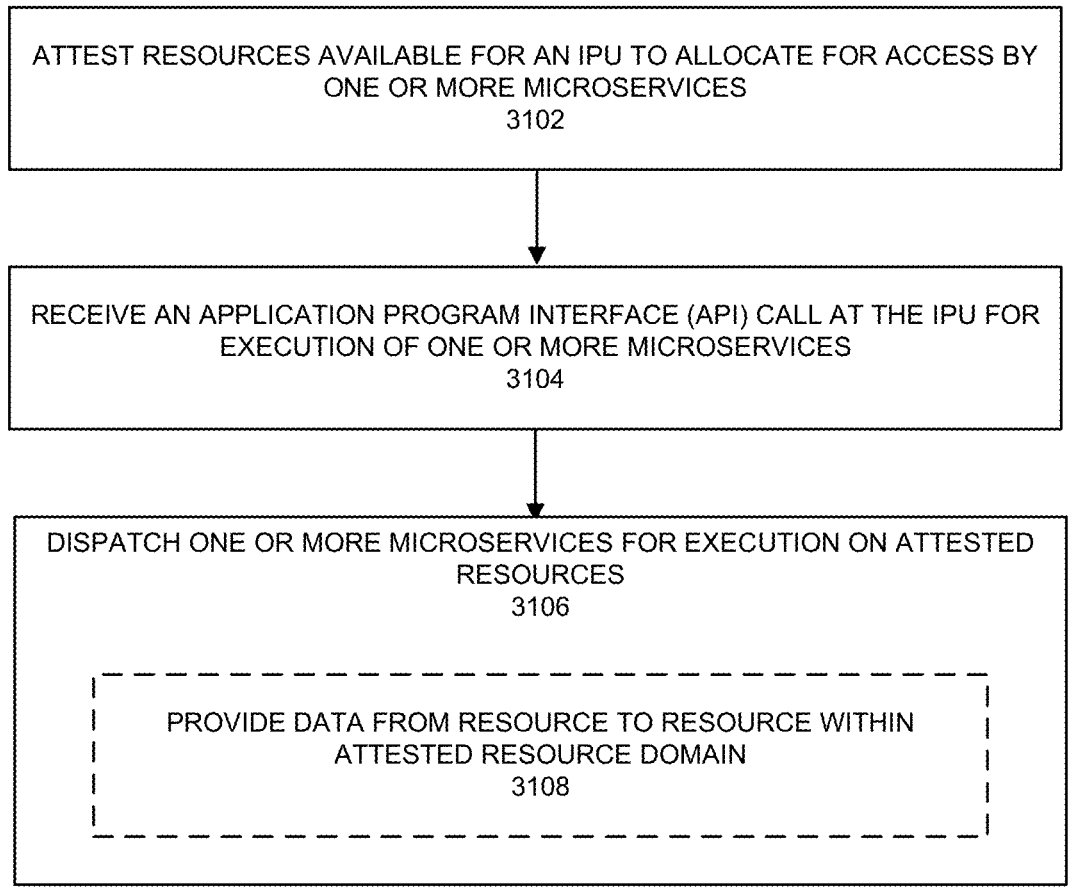
FIG. 31A depicts an example process for attestation of resources.

FIG. 31A depicts an example process for attestation of resources. At 3102, an IPU can attest one or more resources for execution of microservices. Attestation can involve verification of certificates of the devices or device configurations. A trusted resource domain can be formed by the IPU for execution of one or more microservices. At 3104, the IPU can receive an API call to perform one or more microservices for a workload. The use of an API call to request workload performance can reduce an attack surface to reduce potential to maliciously attack the IPU.

At 3106, for a valid workload permitted to utilize compute resources managed by the IPU, the IPU can dispatch one or more microservices for execution. At 3108, during the execution of the one or more microservices, the resulting data from performance of each microservice can be provided for access by another microservice.

Figure 31B:
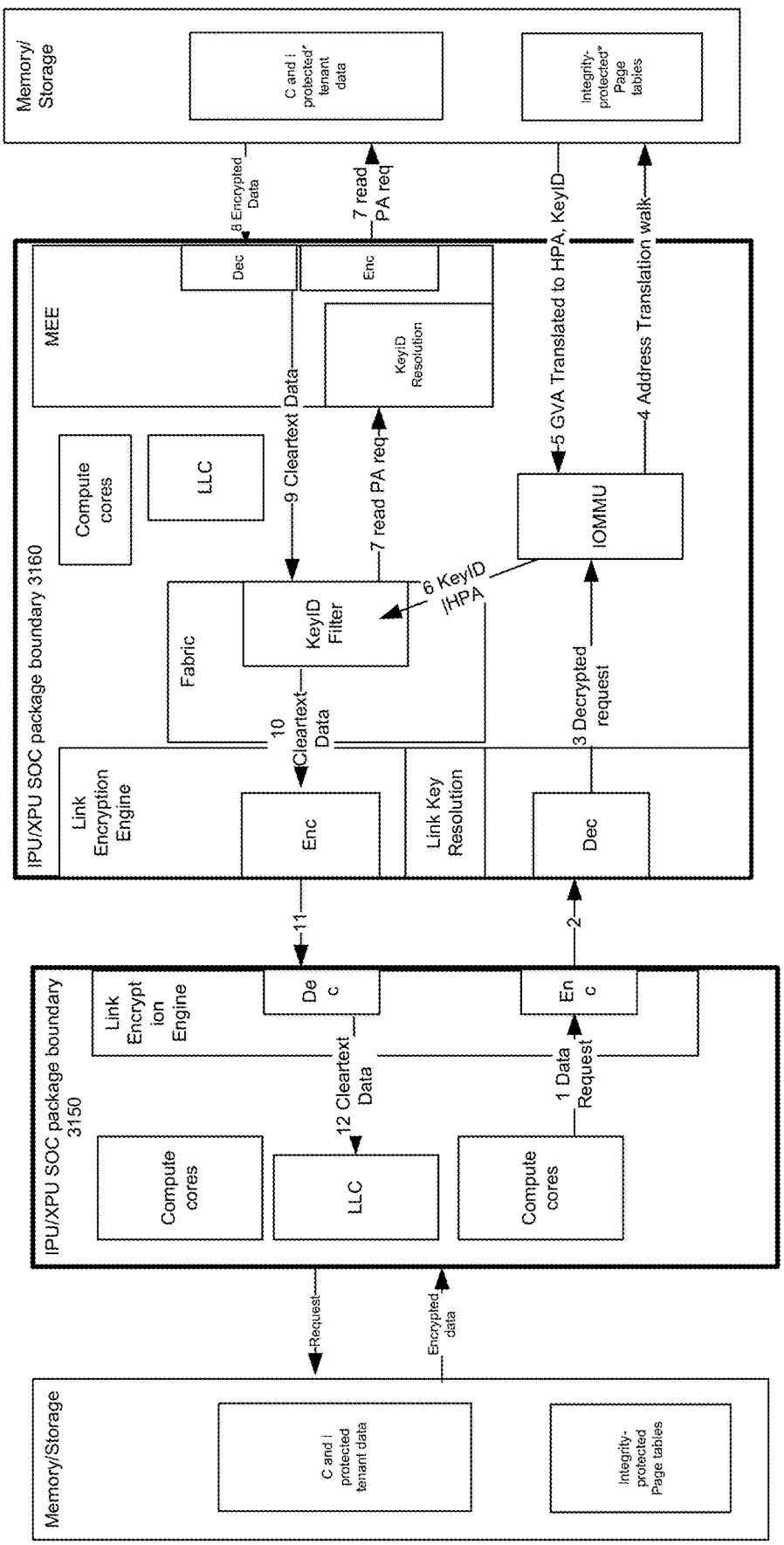
FIG. 31B depicts an example of use of a secure data path through attested resources.

FIG. 31B depicts an example of use of a secure data path through attested resources. At (1), a data request is issued by an XPU (e.g., compute cores) of an IPU. At (2), a protected memory transaction (e.g., an encrypted memory transaction (using Guest Virtual Address)) can be sent from IPU 3150 to an encoder (Enc) via Link Encryption Engine (LEE) to be decrypted (Dec) by the second device 3160. The receiver may be a XPU or another IPU. At (3), the LEE can provide a decrypted request to an IOMMU to translate the guest virtual address to a host physical address. At (4), the IOMMU can provide an address translation walk to integrity protected page tables (associated with the TEE on the XPU). At (5), the guest virtual address (GVA) can be translated to host physical address (HPA) and associated keyID using the page tables. At (6), the IOMMU can provide a keyID and HPA to the keyID filter. The keyID filter can check that the keyid used are permitted (e.g., belonging to a Trust Domain/TEE) and if permitted, can issue at (7), a read physical address (PA) request to Confidential (C), Integrity (I), replay-protected tenant data in memory or storage. Tenant data stored in memory or storage can be encrypted, integrity and replay protected (e.g., Replay Protected Memory Block (RPMB)).

At (8), encrypted data can be provided from memory or storage to a Memory Encryption Engine (MEE) of device 3160. At (9), the MEE can decrypt the data and provide decrypted clear text data to the IPU/XPU fabric for transfer to the LEE encryption unit of device 3160. The LEE of device 3160 can encrypt the data and provide the data at (11) to a decoder (dec) of the requester IPU device 3150. At (12), the IPU device 3150 can decrypt the data and provide clear text data to a cache (e.g., LLC) for access by an XPU. In some examples, data outside the IPU/XPU package is encrypted, and only inside the package, data can be in decrypted format.

Figure 32A:
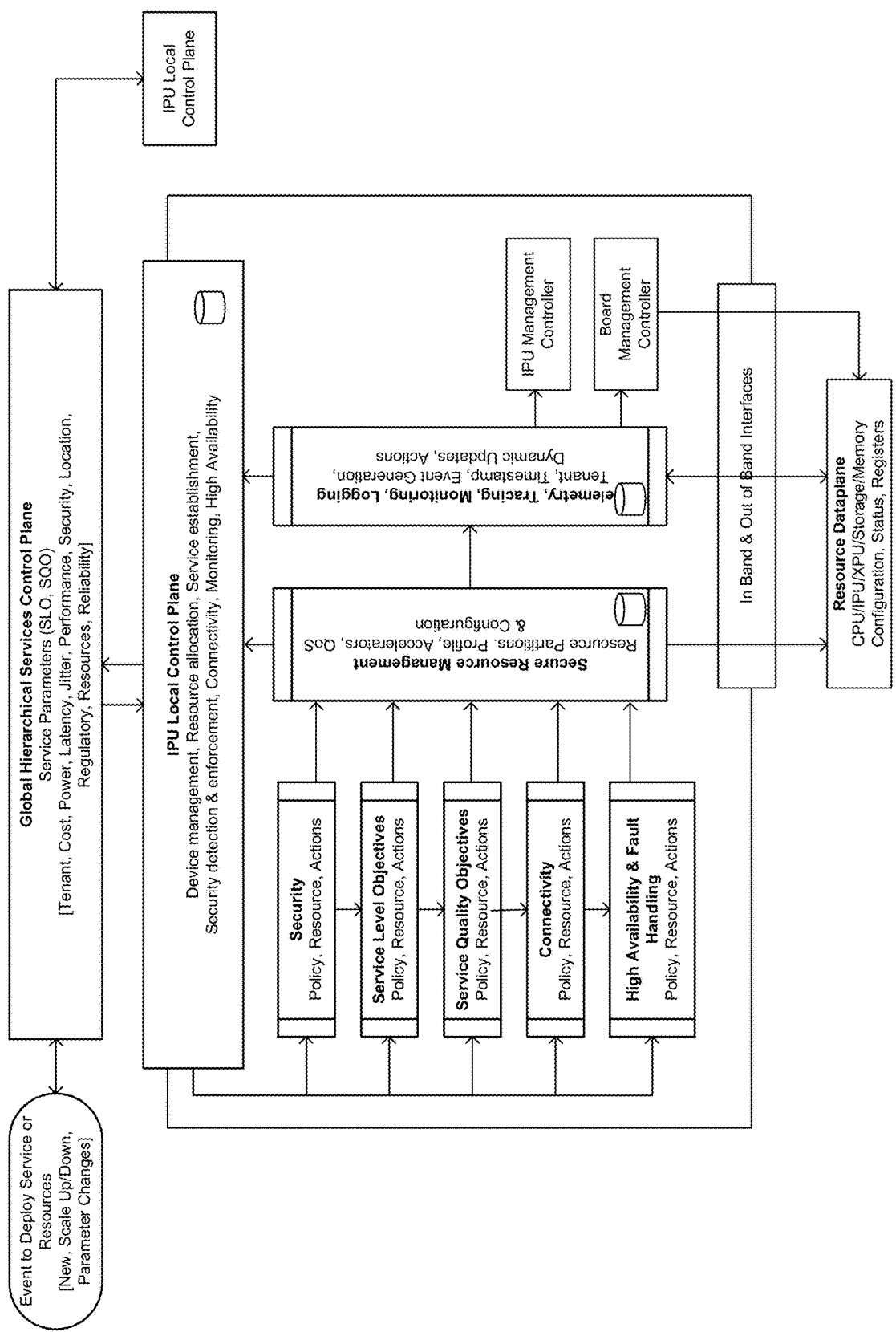
FIG. 32A depicts an example system resource composition for an IPU bringing reserved computation from a remote partition on-line according to some embodiments.

FIG. 32A depicts an example system resource composition for an IPU bringing reserved computation from a remote partition on-line according to some embodiments.

Figure 32B:
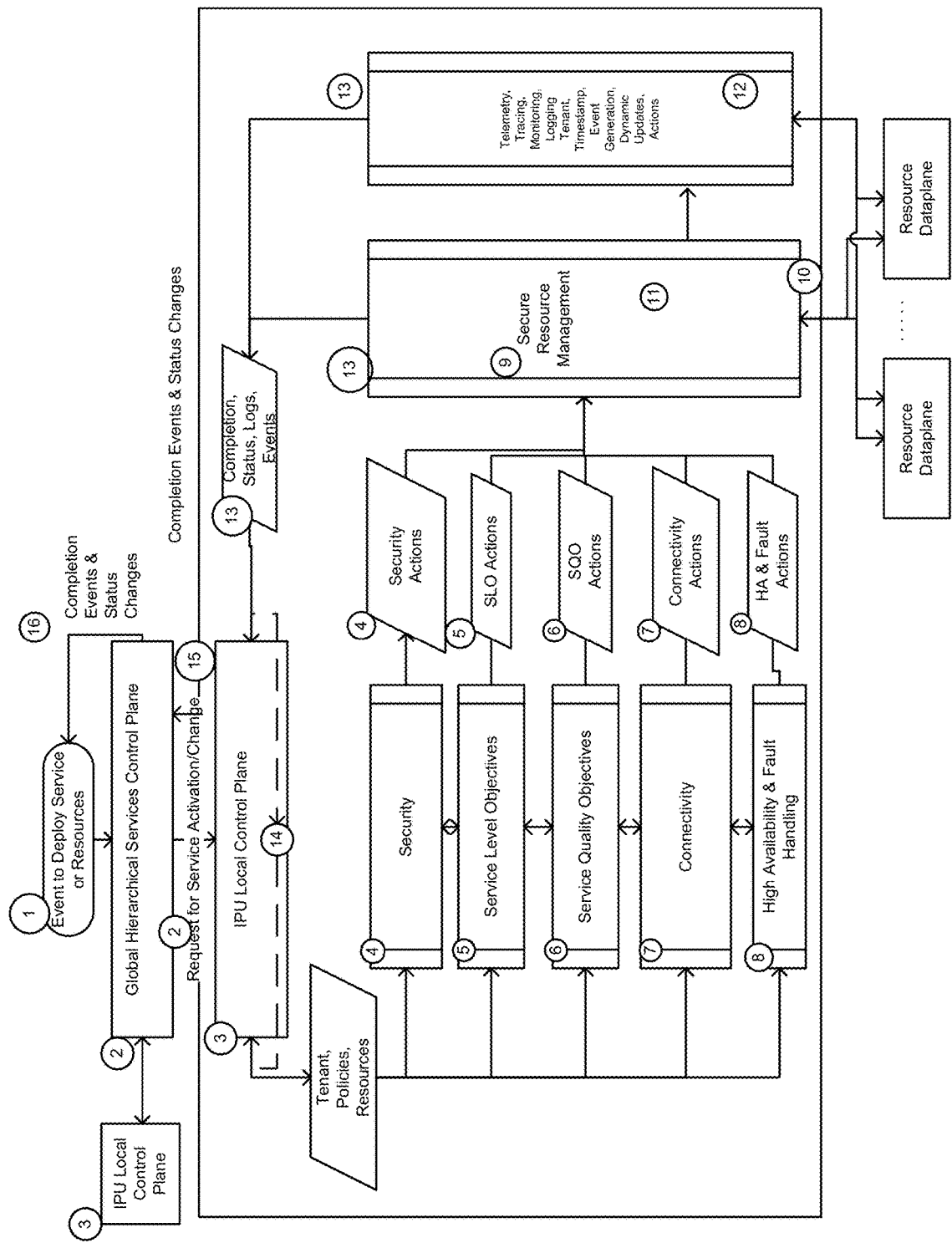
FIG. 32B depicts an example of IPU Control Plane configuration operations that can be performed.

FIG. 32B depicts an example of IPU Control Plane configuration operations that can be performed in accordance with some embodiments. At (1), an event to deploy a service or resources occurs such as a new workload, resource scale up or scale down (or scale in or out), or workload or resource parameter changes. For example, a user request for a new service or change in service can be issued using a command line interface (CLI) or graphical user interface (GUI) or other API. Additionally this can be dynamically triggered by events from telemetry and IPU local control plane such as monitoring events indicating that a SLO, software quality requirements (SQR), etc. is not being achieved.

At (2), a Global Hierarchical Services Control Plane can specify Service Parameters for one or more IPU local control planes. Parameters can include SLO or SQO and be based on one or more of the following parameter: a tenant identifier, cost limit, power limit (upper or lower), latency limit (upper or lower), jitter limit (upper or lower), performance requirements (upper or lower), security, location, regulatory requirements, resources, or reliability. Global Control Plane can segment the configuration across multiple nodes or resource pools. This can also be used when connecting changes/updates to existing services, such as connecting a new service to existing storage. This coordination can be used for managing distributed trust and cross resource SLA, SQRs.

At (3), one or more IPU Local Control Planes can be configured to perform device management, resource allocation, service establishment, security detection and enforcement, connectivity, monitoring, high availability level. Tenant, Policies, Resources requirements can be applied to Policy Engines to determine Service Decomposition across local and remote resources. Some of the information used to make decisions can be based on the per tenant policies and available resources. IPU Control Planes can use different decision processes to generate the final recipe for deployment.

At (4), the IPU Local Control Plane can set Security parameters (e.g., Policy, Resource, Actions) for one or more resources controlled by the IPU. Security parameters can include one or more of data encryption policy at rest, inflight, in-use attestation requirements for services and platforms, key management and user identity, access policies, isolation, regulatory restrictions. Security actions can include one or more of: data encryption and keys, certificate negotiation, virtual device requirements, or service requirements. A security policy can specify what is necessary to handle the security requirements and can include tenant isolation, attestation of platform or services, key negotiation and management, memory encryption policies, lawful intercept, etc. IPU Local Control Plane can pass requirements to other policy modules such as network encryption (IPsec, Transport Layer Security (TLS), mutual TLS (mTLS), datagram TLS (dTLS)) and firewall (ACL, connection tracking) to the Connectivity module.

At (5), the IPU Local Control Plane can set Service Level Objectives parameters (e.g., Policy, Resource, Actions) for one or more resources controlled by the IPU. Service Level Objectives parameters can include one or more of Cost, Reliability, Performance, Transactions per Second, Compute cores, Memory Size, Storage Size, Network Bandwidth. SLO Actions can include one or more of resource allocations or capacity. Service Level Objective (SLO) policies can include requirements for cost, reliability, performance, transactions per second, number of compute cores, memory/cache/storage size, etc. This can establish static or dynamic configurations for resources.

At (6), the IPU Local Control Plane can set Service Quality Objectives parameters (e.g., Policy, Resource, Actions) for one or more resources controlled by the IPU. Service Quality Objectives parameters can include one or more of Telemetry, Latency, Jitter, Logging, Monitoring, Priority. SQO Actions can include one or more of: Resource allocations, Bandwidth, QoS, Scheduling, Monitor and Logging actions. Service Quality Objectives (SQO) can include items such as telemetry, logging, monitoring, responses and end-to-end latency/jitter, etc. This can configure static attributes such as weights, rates, accelerators, etc. as well as establish telemetry events and filters for continuous runtime monitoring.

At (7), the IPU Local Control Plane can set Connectivity parameters (e.g., Policy, Resource, Actions) for one or more resources controlled by the IPU. Connectivity parameters can include one or more of: Routing, Firewall, NAT, Load Balancing, Policy, QoS, Compression, Encryption, Services Proxy Applets, and Storage, Memory Address Mapping: Local-Local and Local-Remote, Tiering hierarchy. can include one or more of: resource allocations, Routing tables, Address Mapping, NVMe over Fabric, Memory Pool allocation. Connectivity Policy can cover both network policies such as routing, firewall, network address translation (NAT), connection tracking, access control lists, port ranges, mirroring, sampling, etc. These functions can be applied to overlay networking, underlay networking, and tenant offloads such as Service Mesh, API gateways, and message busses. Additional functions include handling of memory interface mapping such as address mapping to local or remote attached memory and storage offloads. Similar to other policy engines these can be static configurations or dynamically updated use of resources, accelerators, or services/microservices.

At (8), the IPU Local Control Plane can set High Availability and Fault Handling parameters (e.g., Policy, Resource, Actions) for one or more resources controlled by the IPU. High Availability (HA) and Fault Handling parameters can include one or more of: Availability zone, Regions, Errors, Service Migration. HA and Fault Actions can include one or more of: monitoring events, Data migration, Fast Failover, Active Monitoring. High availability, Fault Handling and Reliability policies can include active management such as migration, restart, configuration/update rollback, fast failover, service monitoring, etc. It can also establish telemetry events for triggering actions.

At (9), the IPU Local Control Plane can set Secure Resource Management parameters (e.g., Resource Partitions, Profile, Accelerators, QoS and Configuration) for one or more resources controlled by the IPU. Secure Resource Management can process action requirements from each of the policy domains and map them to managed resources (local or remote) based on available resources for the service request type. Secure Resource Management can include functions such as BMCs, IPU management, resources (tables, accelerators, memory, keys, logging, etc.) and attempt to provide resources per Tenant and that policies and configurations do not have side-effects or expose data.

At (10), the Secure Resource Management parameters can be used to set parameters in one or more Resource Dataplanes for different IPUs and different nodes (e.g., a CPU, IPU, XPU, storage/memory using, e.g., Configuration, Status, Registers). Configuration of individual resources and processing flow can be applied for service composition, acceleration offload, telemetry. Secure Resource Management can provide configuration and management updates to the attached resources such as XPUs, storage, memory, CPUs, etc. as well as the IPU.

At (11), the Secure Resource Management parameters can be used to configure Telemetry, Tracing, Monitoring, Logging parameters (e.g., Tenant, Timestamp, Event Generation, Dynamic Updates, Actions) for the IPU. Secure Resource Management can provide configuration for telemetry such as logging policies, sampling times, event filtering and generation.

At (12), the data planes can provide runtime dynamic Telemetry Monitoring and Logging. Telemetry provides management and retention for telemetry such as logging policies, sampling times, event filtering and generation. This can be an active process managing resource events or periodically checking and gathering status and events. Triggers can be sent back to the IPU main control plane process to take further actions.

At (13), telemetry, tracing, monitoring and logging and secure resource management can provide completion, status, logs, and events to its IPU local control plane. At (14), local events, Logs, Status Changes can cause a feedback loop for dynamic adjustments to maintain Policies. These can also be returned to the Global Hierarchical Service Control Plane for broader actions. IPU local control plane takes requests from the external Global Hierarchical Control Plane, local node level telemetry events, or periodically execute to create fast local decisions and actions. This can provide a scalable architecture with faster feedback.

At (15), the IPU local control plane can provide Completion Events and Status Changes to the global hierarchical services control plane to provide reporting of request completion status, resources utilized, and telemetry events. Request completion status, resources utilized, and telemetry events are provided to the local and Global hierarchical control plane to for logging, and can trigger subsequent actions such as scaling up new resources or migrating services.

At (16), Completion Events and Status Changes can be fed back to an administrator or user. A new event may be issued based on received status.

Figures 1, 32C:
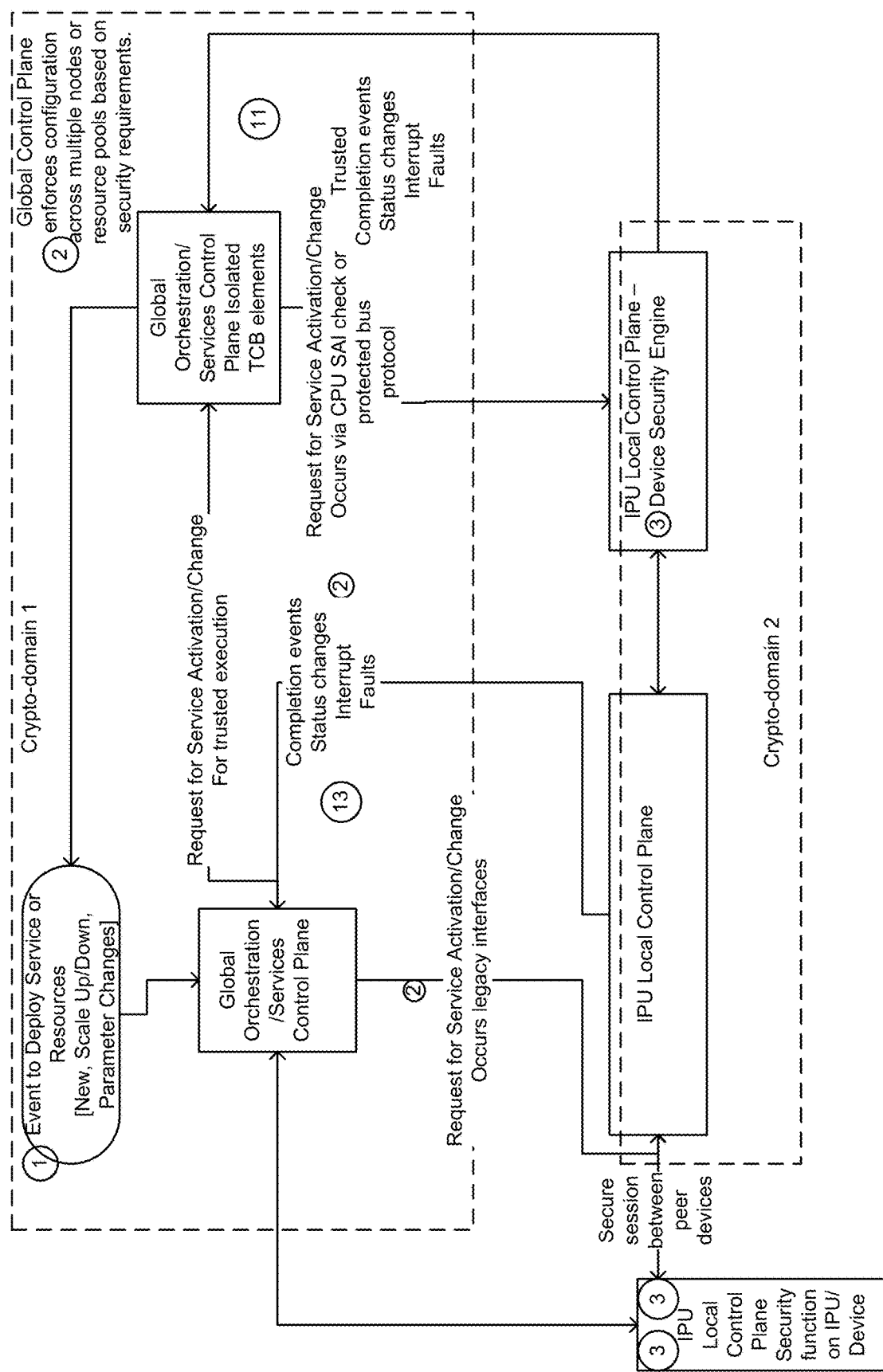
Figures 2, 32C:
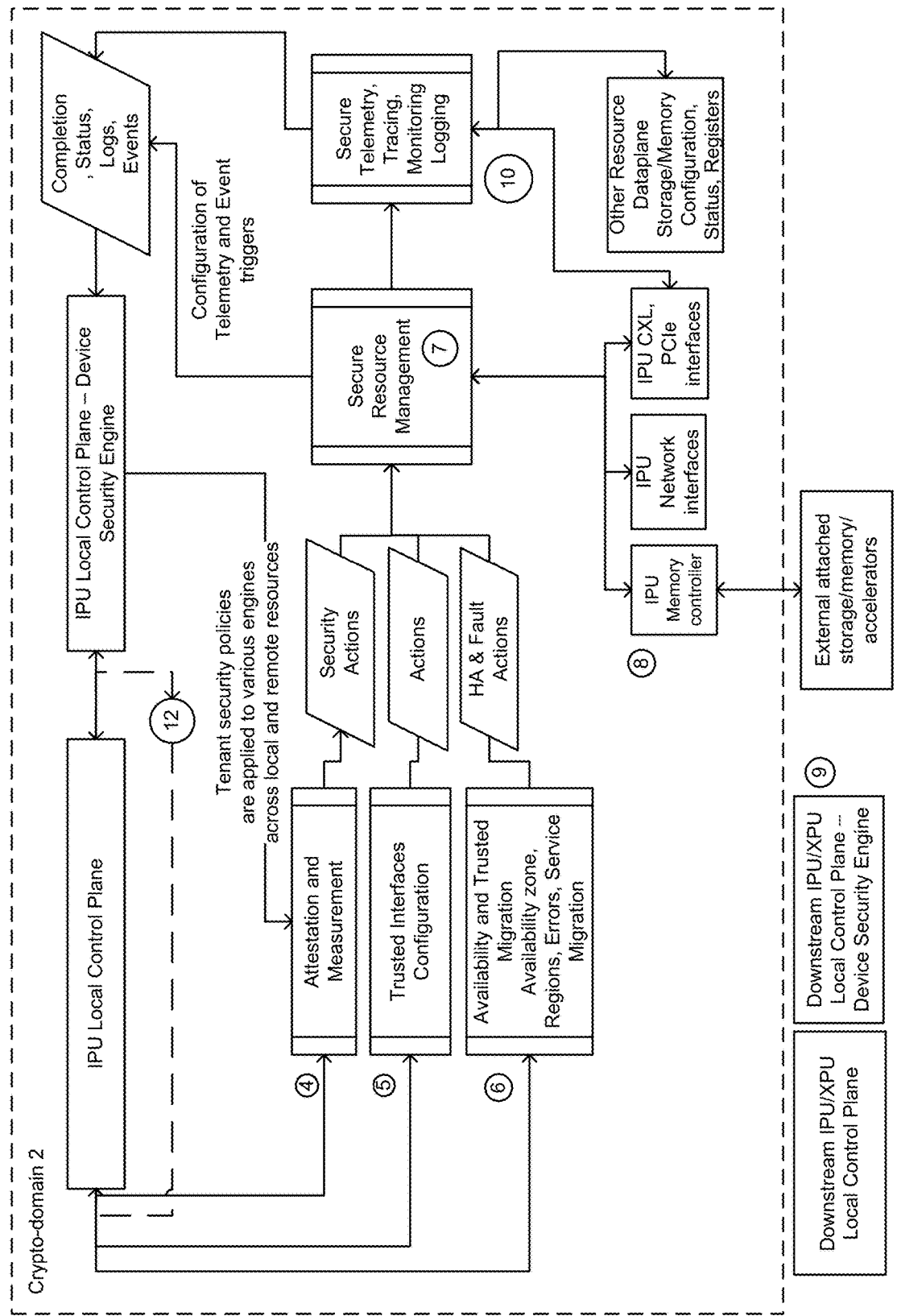

FIGS. 32C-1 and 32C-2 depicts an example of control plane operation with use of various security features. IPU Control-plane security properties can include:

A. IPU provides control plane to negotiate security properties confidentiality, integrity, replay-protection and availability (C,I,R,A) for disaggregated compute, mem/NVM/storage, network (e.g., items 1 and 2).

B. Measurement, Reporting, Attestation/Quote-verification building blocks on IPU with flexible re-configurability (hierarchical attestation of cloud platforms) (e.g., item 4).

C. Mapping workload "Security SLA" via orchestration (across distributed system) to a set of IPUs, balancing performance requirements vis-à-vis fine-grain multi-tenant programming models—e.g. virtual function, VMs, containers, compartments (e.g., items 5 and 10).

D. Split role of hypervisor management and security roles across XPU and IPU (CSP manages the whole distributed platform) (e.g., items 3 and 11).

E. Managing Security services in IPU and data access control mapping (e.g., items 5 and 6).

F. With distributed systems, separate crypto domains where platform capabilities bind different crypto domains across CPU/IPU/XPU (e.g., items 8 and 9).

G. Local feedback from secure control plane to enforce that an interface bound to a trusted execution context is not re-configured maliciously, and can raise an event that can reconfigure the interface or clear secrets and can be enforced via a device interface security state machine at an interface level. Example actions due to security violations include logging, removal of services, revocation of keys or certification, redirection and isolation of services, or containment of services for active debugging of vulnerability and depth of intrusion.

An example sequence for control plane operation with use of various security features can be as follows. Referring to FIG. 32C-1, at (1), an event to deploy a service or resources occurs such as a new workload, resource scale up or scale down, or workload or resource parameter changes. At (2), the Global Control Plane can enforce configuration across multiple nodes or resource pools based on security requirements. For example, for Trusted Data Exchange (TDX), memory can be encrypted, integrity and replay protected and external device links are to be similarly protected and certificate-backed device measurements should be available for evaluation.

Global Orchestration/Services Control Plane can perform High level partitioning of Services across single or multiple platforms. Global Orchestration/Services Control Plane can include VMM, Service OS, and/or management control plane functions on an IPU. Global Orchestration/Services Control Plane can request a Service Activation/Change for trusted execution. Global Orchestration/Services Control Plane Isolated TCB elements can enforce security parameters and state machines. At (2), Global Orchestration/Services Control Plane can request Service Activation/Change to an IPU local control plane using legacy interfaces. At (2), Global Orchestration/Services Control Plane Isolated TCB elements can communicate with a local IPU control plane via CPU Switch Abstraction Interface (SAI) check or over protected bus protocol.

Note that at (1) and (2), the IPU control plane can provide security properties whereby IPU provides control plane to negotiate security properties (C,I,R,A) for disaggregated compute, mem/NVM/storage, network.

At (3), IPU Local Control Plane can perform a management function on IPU/Device to provide management APIs to enumerate device measurements and capabilities, to pass messages to the IPU Local Control Plane-Device Security Engine, initialize local memory as assigned to legacy software, or initial virtual function security associations for downstream devices. At (3), IPU Local Control Plane-Device Security Engine can provide security function on IPU to provide control APIs, to enumerate device measurements and capabilities, to configure keys for link protocols, initialize local memory as assigned to trust domains, or verify virtual function security associations for downstream devices assigned to trusted execution environments (trusted domains or enclaves).

At (3), another IPU Local Control Plane can provide security function on IPU/Device (called Device Security Engine/DSE) provides control APIs to enumerate device measurements and capabilities, to configure keys for link protocols, initialize local memory as assigned to trust domains, or verify virtual function security associations for downstream devices assigned to trusted execution environments (e.g., trusted domains or enclaves). A secure session can be established between IPU local control planes.

Referring to FIG. 32C-2, at (4), Attestation and Measurement configuration can include data encryption policy at rest, inflight, in-use provide attestation requirements for services and platforms, configure key management and User Identity, configure Access Policies, Isolation, Regulatory Restrictions. Security actions can include: storage and access to data encryption and keys, certificate negotiation, Virtual Device Requirements application, and 'vice Requirements application.

At (5), Trusted Interfaces Configuration can map local security policies for trust domain to maintain security associations per TEE context which can apply to MMU, interfaces and other link interfaces (e.g., network, PCIe, and so forth). Actions can include programming of ephemeral/persistent keys, or protocol security associations for link layer.

At (6), Availability and Trusted Migration configuration can provide Policy, Resource, Actions and Availability zone, Regions, Errors, Service Migration. High availability (HA) and Fault Actions can include Monitoring events, Data migration, Fast Failover, an Active Monitoring.

At (7), Secure Resource Management can process action requirements from each of the policy domains and map them to configuration of individual security controls based on (C,I,R,A) requirements. At (8), IPU memory controller, network interfaces, devices interfaces (e.g., CXL or PCIe or N to M devices interfaces (where N and M are more than 1)), other resource dataplane, or attached storage, memory or accelerators can be configured by secure resource management. At (9), downstream IPUs, XPUs, or local control planes and device security engines can be configured by secure resource manager. At (10), Secure Telemetry, Tracing, Monitoring, Logging can receive telemetry information protected with integrity (and confidentiality) to be provided to workload tenant. Referring to FIG. 32C-1, at (11), Trusted Completion events, status changes, interrupt faults can be provided to Global Orchestration/Services Control Plane Isolated TCB (Trusted Computing Base) elements to enforces security parameters and state machines.

Referring to FIG. 32C-2, at (12), for security isolation, the Security Control Plane can be a separate processes. Updates and actions from the Security Control Plane can provide updates to the IPU Control Plane to summarize events to the Global Hierarchical Control Plane. IPU control plane can be put in an error state for potential reconfiguration or remain in error state and removed as a candidate to perform a service.

Referring to FIG. 32C-1, at (13), Completion events, status changes, and Interrupt Faults can be provided by IPU local control plane to Global Orchestration/Services Control Plane. Example actions due to security violations are logging, removal of services, revocation of keys or certification, redirection and isolation of services, or containment of services for active debugging of vulnerability and depth of intrusion. Note that global orchestration and each IPU can be in different cryptographic domains.

Figure 33A:
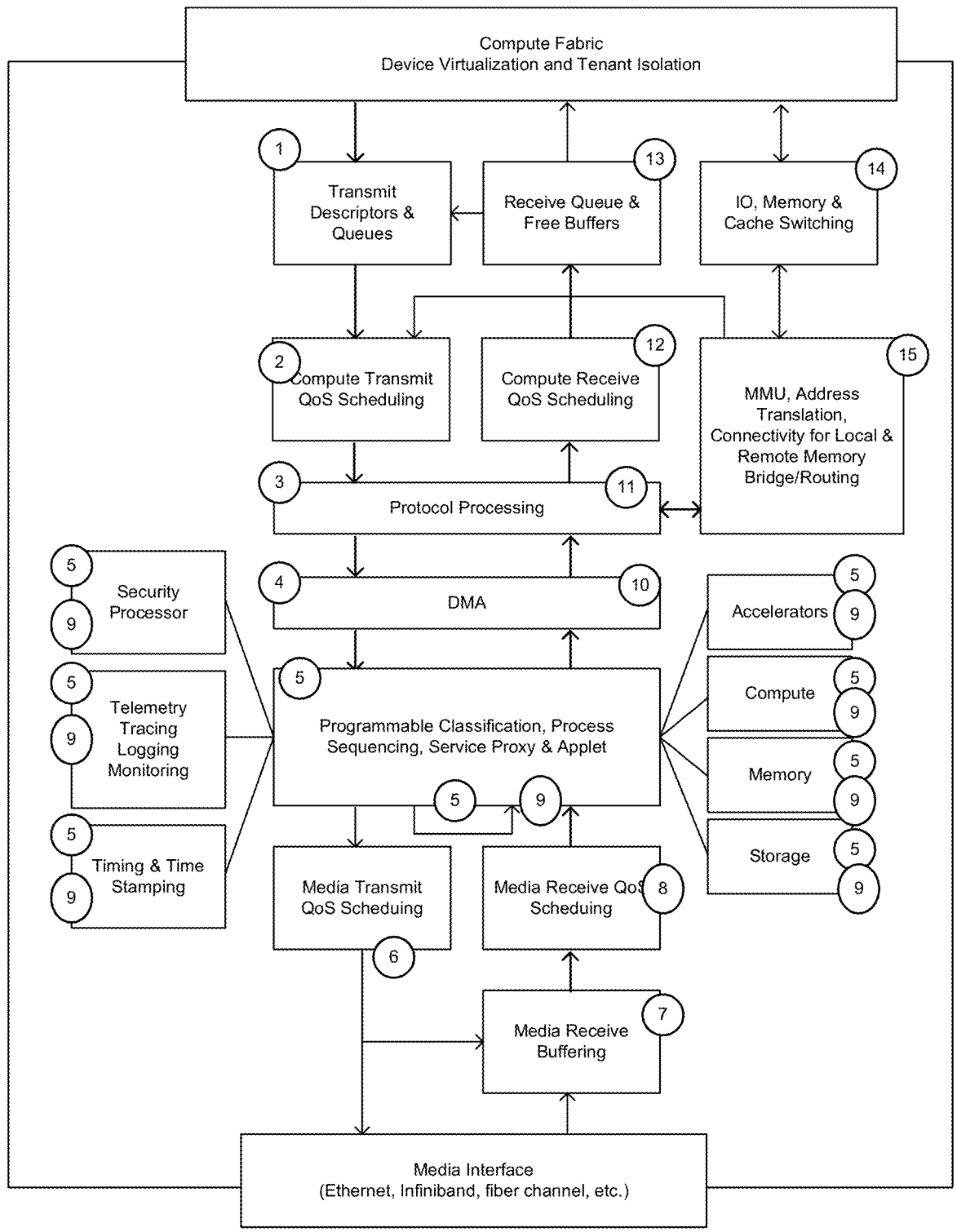
FIG. 33A depicts an example of an IPU data plane and operation.

FIG. 33A depicts an example of an IPU data plane and operation. At (1), processing requests are enqueued, such as LAN, RDMA, NVMe or service requires for RPC or Message processing. For telemetry, these requests can be timestamped. An example is for RPC offload, the IPU can timestamp each individual RPC session for latency/jitter and associate errors and associated events. These can feedback into the IPU control plane for dynamic adjustments.

At (2), requests are scheduled based on variety of parameters such as tenant QoS, min/max/weight SLAs, priority, earliest/latest processing time requirements. At (3), protocol processing can generate the necessary sub-command processing required to complete the request.

At (4), a DMA (direct memory access) gathers the necessary data for processing. At (5), classification and data processing can occur based on the control plane composition of disaggregated functions. Based on the configuration this can use any set or sequence of accelerators, compute, storage, memory, security, telemetry, and timing processing. Some use cases may require multiple recirculated passes through to handle different layers of the protocol stack. The IPU can also insert telemetry information such as UUIDs to enable tracing of RPCs between services.

At (6), completed processing can be scheduled for transmission over the Media Fabric. For services that are locally hosted, then the packet can be locally looped back into the Receive processing. At (7), receive buffering can occur based on traffic priority, tenant, type. Timestamping for telemetry can occur.

At (8), receive traffic scheduling can occur based on varying parameters. At (9), classification and data processing can occur based on the control plane composition of disaggregated functions. Based on the configuration this can use any set or sequence of accelerators, compute, storage, memory, security, telemetry, and timing processing. Some use cases may require multiple recirculated passes through to handle different layers of the protocol stack. Classification can also determine placement of workloads, such as memory/cache location and hierarchy, core affinity, NUMA awareness, less utilize XPUs, etc.

At (10), direct memory access (DMA) copies of data to target memory in Compute, XPU, Storage, Memory can occur. At (11), protocol processing can generate the necessary sub-command processing required to complete the request.

At (12), requests can be scheduled based on variety of parameters such as tenant QoS, min/max/weight SLAs, priority, jitter, latency, earliest/latest processing time requirements. At (13), completed requests can be enqueued, such as traditional LAN, RDMA, NVMe or service requires for RPC or Message processing. For telemetry, these requests can be timestamped. Requests can also be redirected to the Transmit path. This may be required if the IPU can complete the processing request independently or if the resource has moved to a remote device.

At (14), the IPU can manage TO, Memory and Caching commands over the compute fabric for switching to local resource pools or bridging/routing the request to a remote resource pool. At (15), MMU and Address translation can be used for cache tracking and classification of memory addresses to determine the required processing and policies to apply. A memory access to a remote memory pool may require encapsulating the access into a message request to be processed in the Transmit path.

Figure 33B:
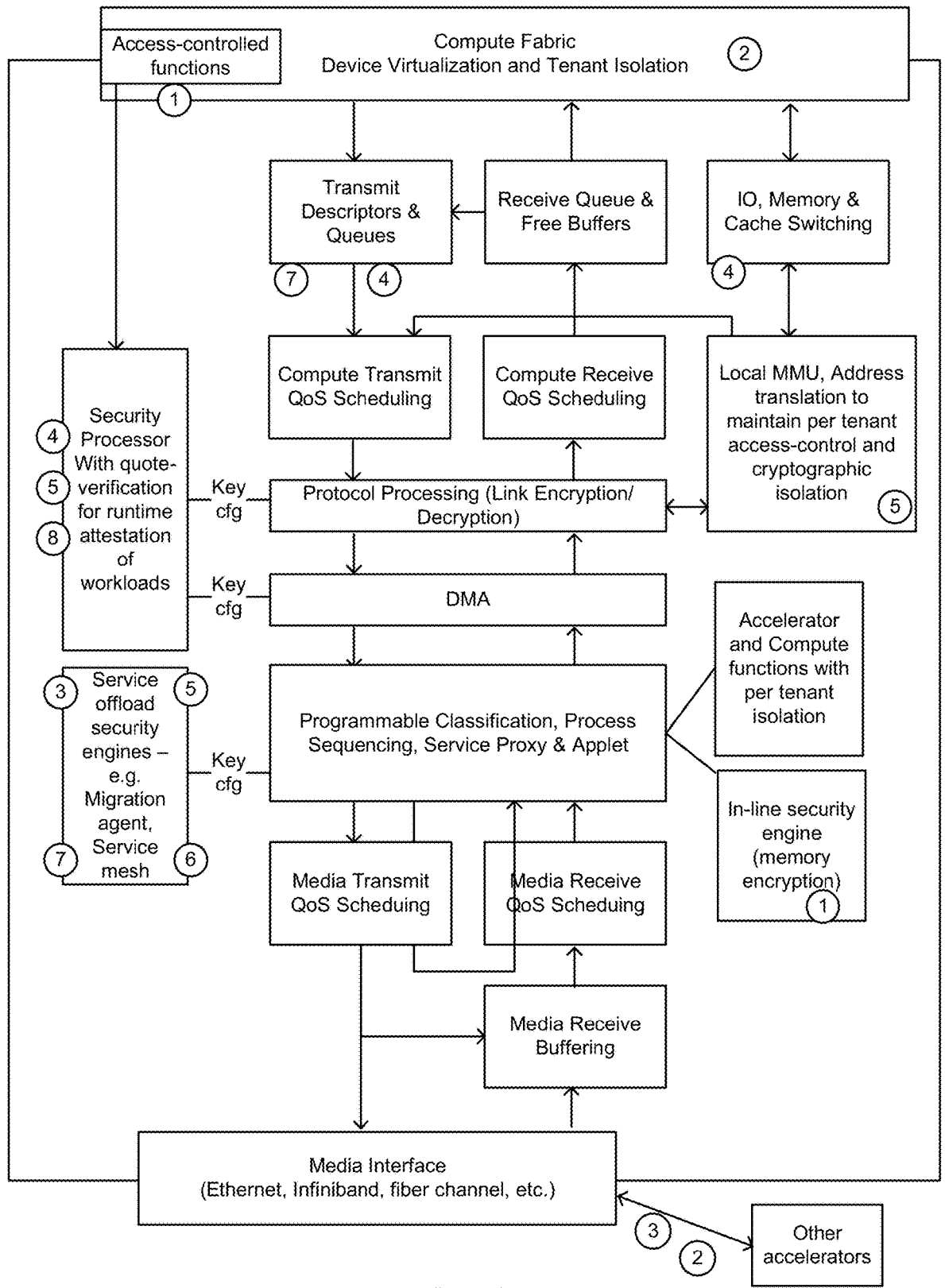
FIG. 33B depicts an example of an IPU data plane and operation with security features.

FIG. 33B depicts an example of an IPU data plane and operation with security features. IPU can provide data plane for data in use protection for improved isolation as well as confidential-computing for distributed tenant uServices. A Compute Fabric can provide Device Virtualization and Tenant Isolation for data plane message transfer. Security processor can provide quote-verification for runtime attestation of workloads for protocol processing, DMA and key configuration. Service offload security engines can provide, e.g., Migration agent, Service mesh. Service offload security engines can configure keys for programmable classification, process sequencing, service proxy and applet. Accelerator and Compute functions with per tenant isolation can be applied by programmable classification, process sequencing, service proxy and applet.

Inline security engine (e.g., memory encryption) can be applied by programmable classification, process sequencing, service proxy and applet. Local MMU, Address translation can be used to maintain per tenant access-control and cryptographic isolation.

The following security features identified using circled numbers can be used for data plane operations.

Security feature (1): TEE properties can be configured via control plane across non-uniform, heterogeneous devices (e.g., CPU, FPGA, GPU, XPU, accelerators, memory pool, storage devices) can be enforced in the data path such that any tenant data exposed outside the SOC is C, I, R protected.

Security feature (2): the IPU can provide virtual device interface for accelerators on the SOC (not on the IPU).

Security feature (3): Seamless migration of workloads (e.g., VMs, containers, uServices, functions) across disaggregated platforms can occur via the IPU. For example, the IPU can assist in VM live migration.

Security feature (4): in the context of distributed TEE, the confidential IO device/fabric security associations for the whole cloud platform, e.g., IPSEC, TLS (logical), CXL, PCIe (link), RDMA over Ethernet etc. can be used.

Security feature (5): Split role of hypervisor management and security roles across XPU and IPU and a CSP can manage the whole distributed platform.

Security feature (6): communication/RPC/sidecar security can be used for cloud native workloads like WASM/micro-services/FaaS—sub-process and secure/shared memory.

Security feature (7): Efficient (ISA/hardware based) secure inter-uService communication via accelerator to accelerator messages.

Security feature (8): on-the fly attestation of micro-services (uSvc) via IPU.

Figures 1, 33C:
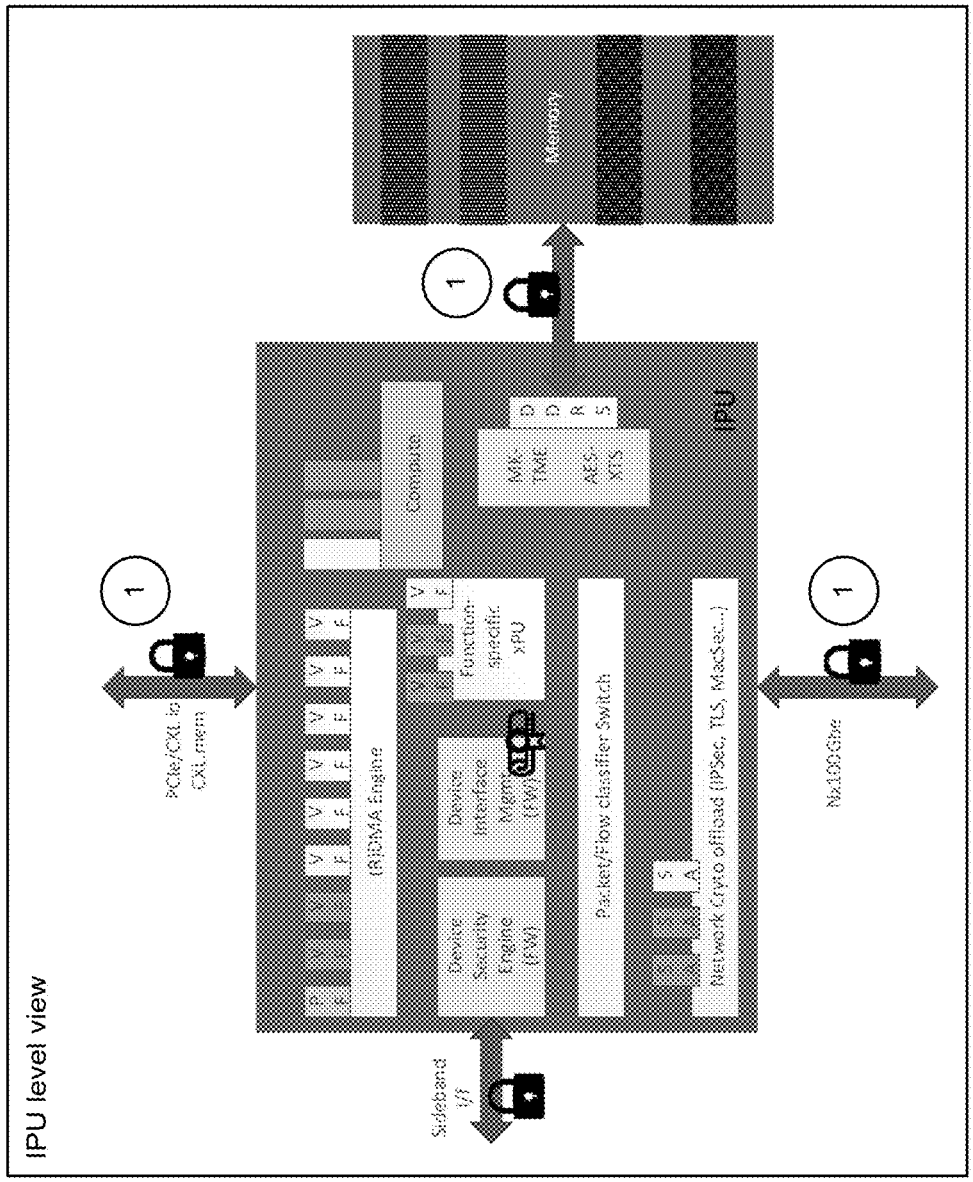
Figures 2, 33C:
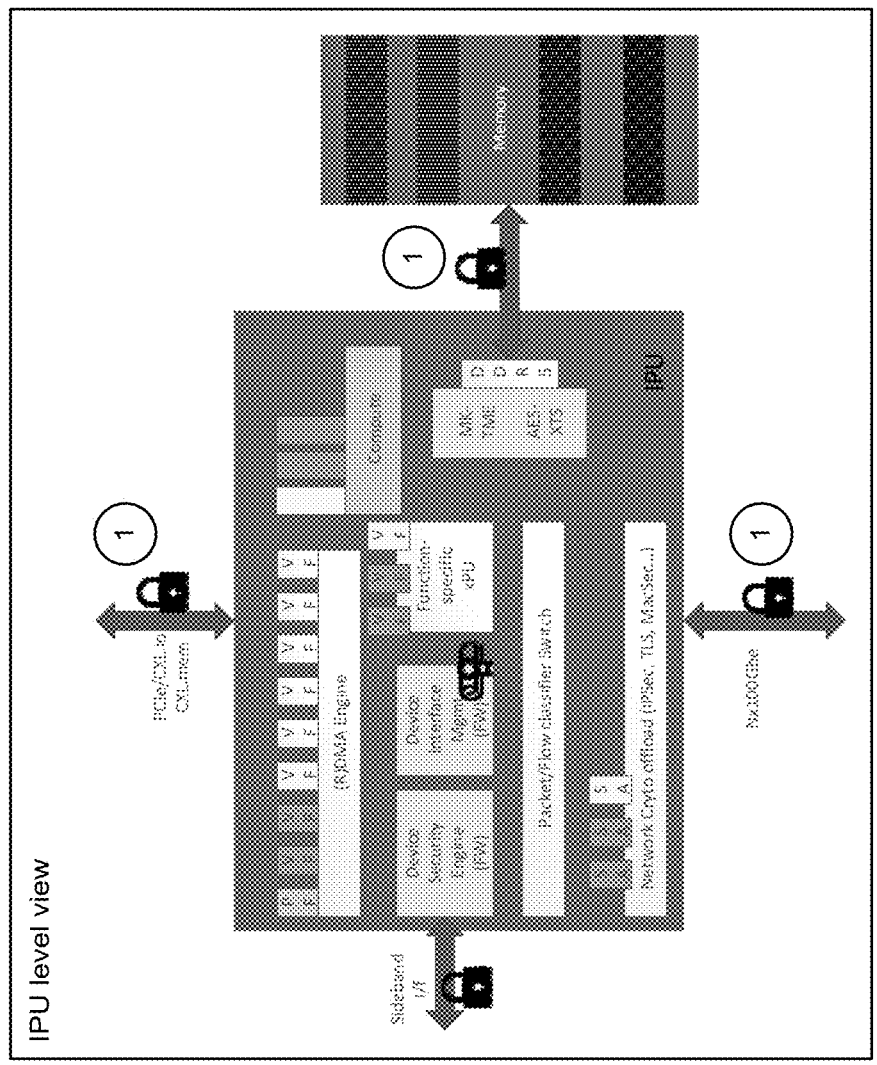
Figures 3, 33C:
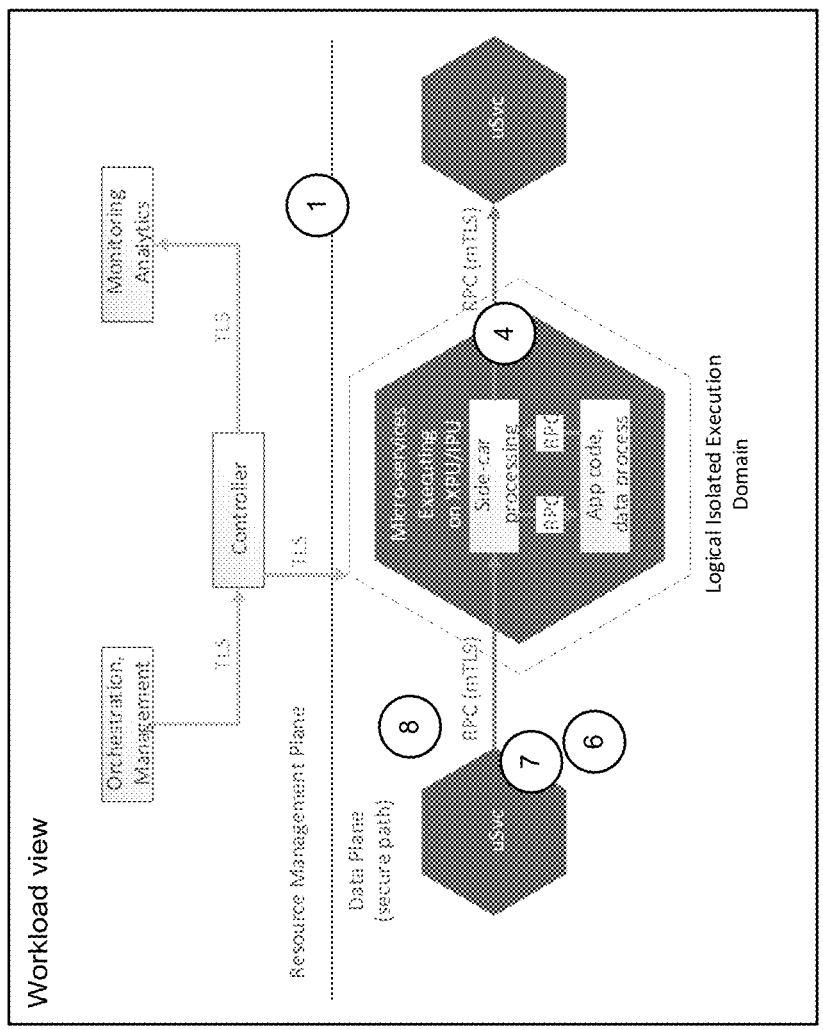

FIGS. 33C-1 to 33C-3 illustrate system views of security features of FIG. 33B. FIG. 33C-1 depicts an example where an IPU configures TEE properties via control plane over different interfaces corresponding to (1) of FIG. 33B.

FIG. 33C-2 depicts an example where an IPU configures virtual device interface and workload migration. For example, security features (2) and (3) of FIG. 33B are illustrated.

FIG. 33C-3 depicts an example where an IPU provides workload isolation. For example, security features (1), (4), (6), (7), and (8) of FIG. 33B are illustrated.

Figure 34A:
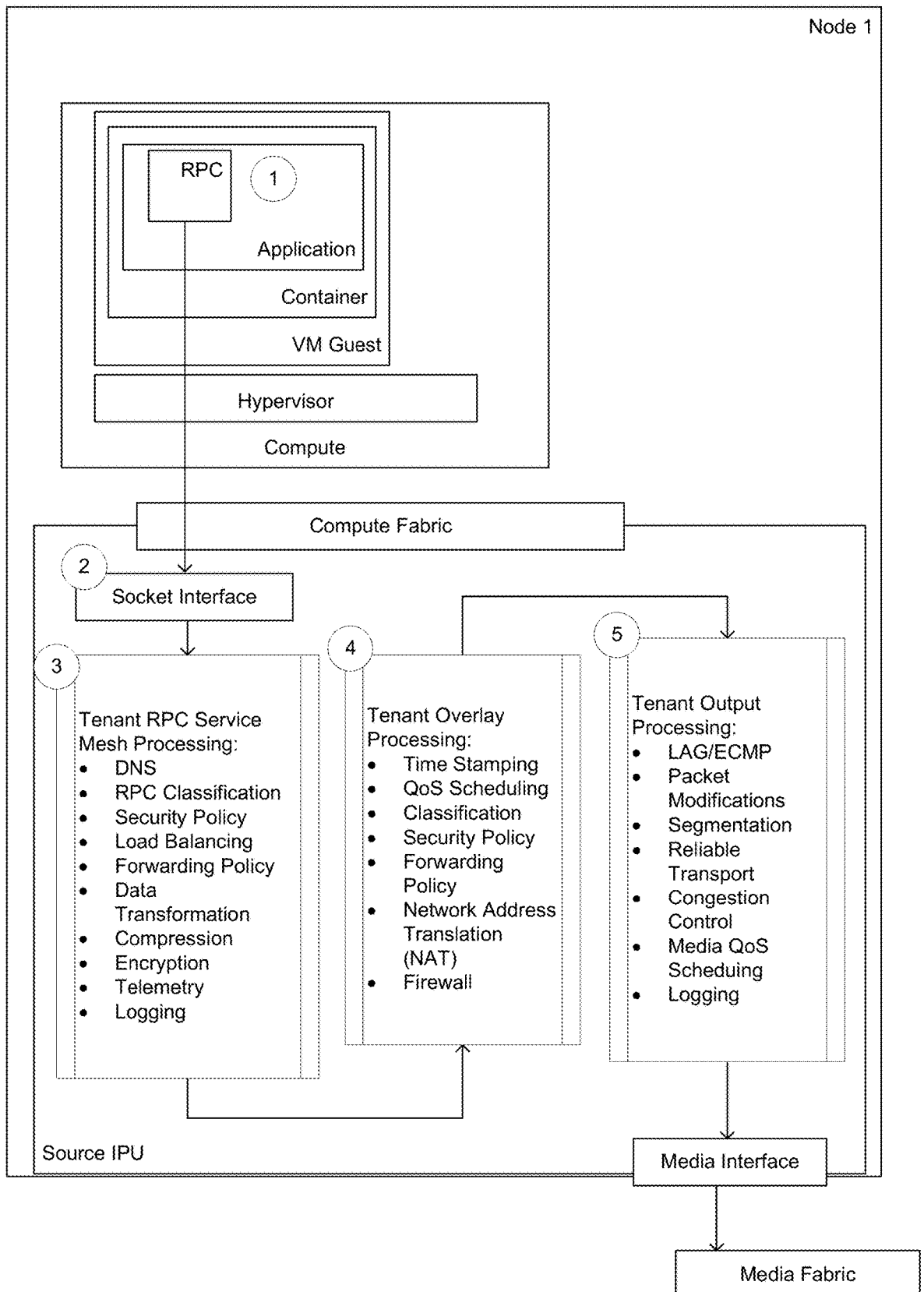
FIGS. 34A and 34B depict an example of use of an IPU data plane RPC with Service Mesh.
Figure 34B:
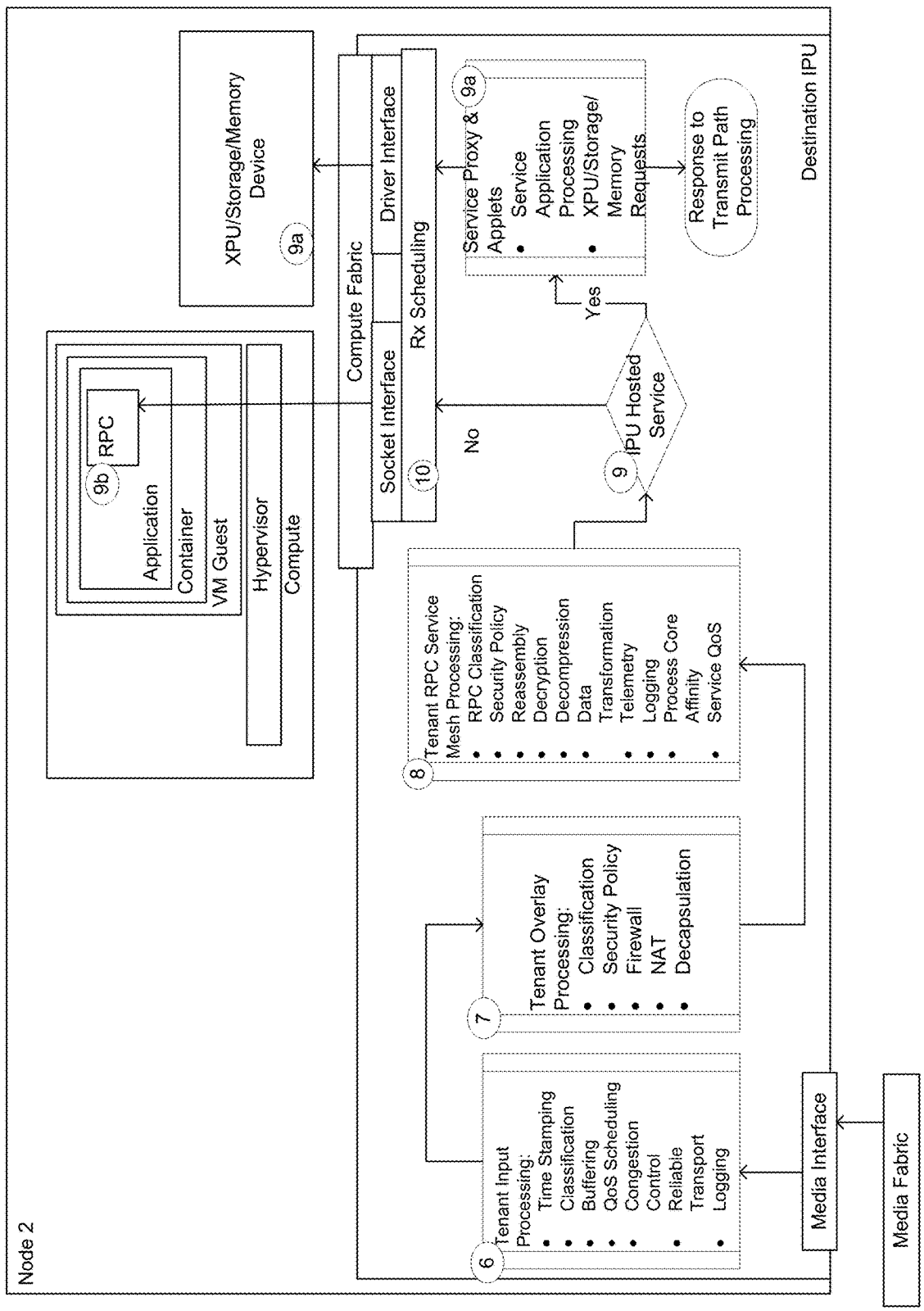

FIGS. 34A and 34B depict an example of use of an IPU Data plane RPC with Service Mesh. There can be variations on the deployment where service components may reside on the compute or XPU. The exact sequence of service execution can also vary based on the deployment. In some examples, a source IPU can perform (2)-(5) whereas a destination IPU can perform (6)-(10).

Referring to FIG. 34A, at (1), an RPC request for a microservice/service. The Application can be hosted in a variety of environments such as serverless, containers, VMs, container-in-VM, bare metal, etc. An RPC is an example of a type of Service or function call, and can include other methods such as SOAP (Simple Object Access Protocol), REST (representational state transfer), gRPC, GraphQL, Thrift, JSON-RPC, HTTP, OpenAPI, etc.

At (2), requests sent over a socket like memory interface can take advantage of memory and cache coherent compute fabrics.

At (3), Tenant RPC Service Mesh Processing can be performed such as DNS, RPC Classification, Security Policy, Load Balancing, Forwarding Policy, Data Transformation, Compression, Encryption, Telemetry, and Logging.

At (3), IPU offload of RPC and Service Mesh processing can occur. This can be a mix of fixed/stateful/programmable accelerators or compute. This frees up host Compute and reduces power, latency, etc.

At (4), IPU offload of Tenant Overlay Processing can occur such as Time Stamping, QoS Scheduling, Classification, Security Policy, Forwarding Policy, Network Address Translation (NAT), Firewall, or vSwitch processing.

At (5), IPU offload of Tenant Output Processing can occur such as LAG/ECMP, Packet Modifications, Segmentation, Reliable Transport, Congestion Control, Media QoS Scheduling, or Logging. IPU offload of TCP/reliable transport and dynamic congestion control removes host copies between user space and kernel and reduces latencies, jitter and tail latencies. This can enable access to remote shared resources to behave similar to local dedicated resources.

Referring to FIG. 34B, at (6), a destination IPU (node 2) can perform offload of Tenant Output Processing can occur such as Time Stamping, Classification, Buffering, QoS Scheduling, Congestion Control, Reliable Transport, or Logging. IPU offload of TCP/reliable transport and dynamic congestion control removes host copies between user space and kernel and reduces latencies, jitter and tail latencies. This can enable access to remote shared resources to behave similar to local dedicated resources.

In (5) and (6), IPU offload of TCP/reliable transport and dynamic congestion control removes host copies between user space and kernel. It reduces latencies, jitter and tail latencies. This enables access to remote shared resources to behave similar to local dedicated resources.

At (7), a destination IPU can perform offload of Tenant Overlay Processing such as Classification, Security Policy, Firewall, NAT, Decapsulation, or vSwitch processing.

At (8), a destination IPU can perform offload of Tenant RPC Service Mesh Processing such as RPC Classification, Security Policy, Reassembly, Decryption, Decompression, Data Transformation, Telemetry, Logging, Process Core Affinity, and Service QoS. IPU offload of Service Mesh and API Gateway functions. This can include security functions such as user authentication for access control, field validation, rate limiting, prioritization and input service scheduling during congestion.

At (9), (9a), and (9b), a destination IPU can determine whether the service is locally hosted in the IPU or not. The destination IPU can host Services/Microservices/Applets which can be executed on cores or accelerators with the service the function completely locally on the IPU or split across the IPU and attached XPUs/Storage/Memory to complete the service function. The IPU can also return the request to Compute for tenant applications or if larger scale compute is required. It is also possible for the Service to be hosted on the requesting node with the IPU. The IPU provides an abstraction to the requestor and routes (e.g. using a Service Mesh) to the correct Service endpoint. RPCs between hosts can be used to build microservices and can provide better scalability, fault isolation, and faster independent development.

At (10), a destination IPU can schedule the execution or sending of request for processing internal to the IPU resources or to attached resources. Based on classification and telemetry, the IPU scheduling can take into account SLO, SQR requirements as well as congestion and resource utilization. Receive prioritization and scheduling can minimize latency and manage tenant SLAs.

Figure 35A:
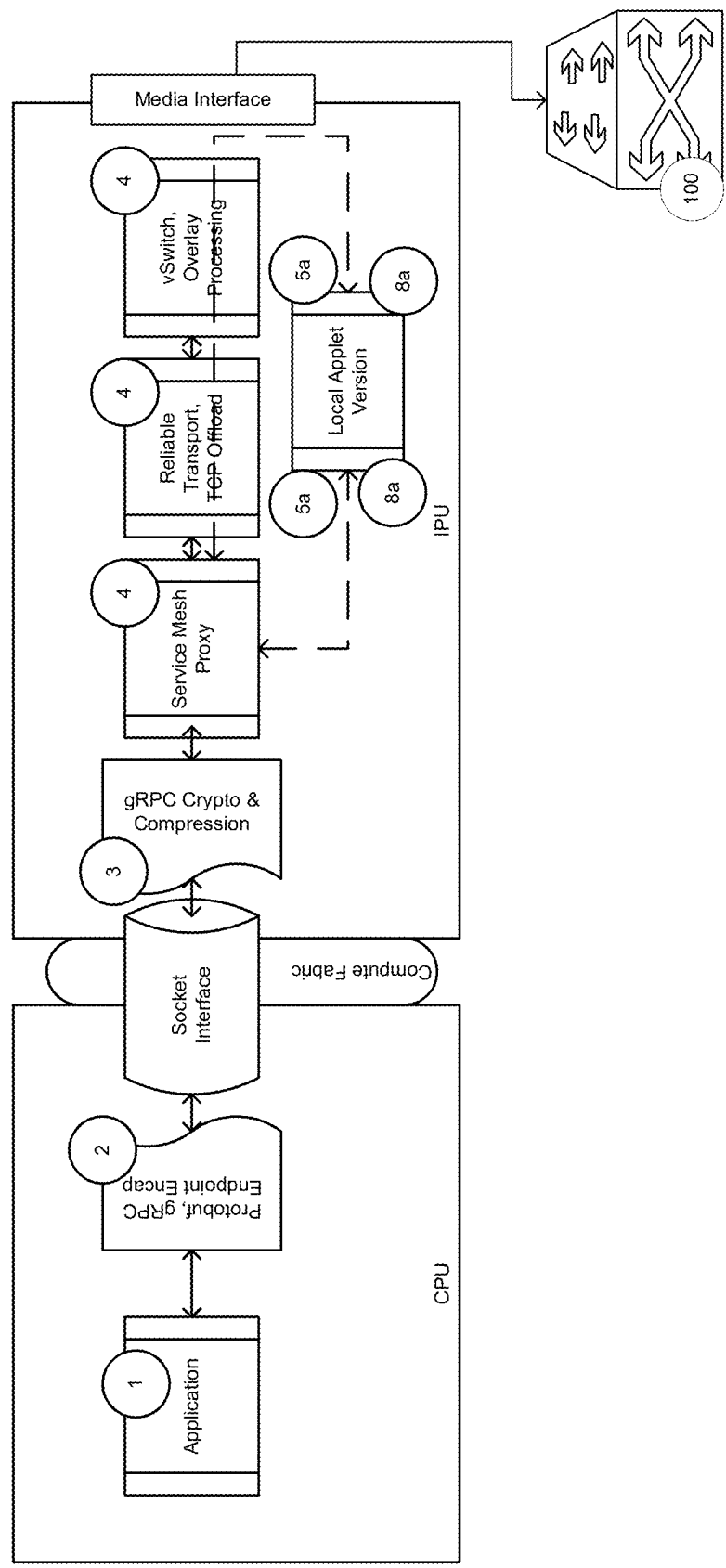
FIGS. 35A and 35B depict an example of service decomposition across local and remote resources.
Figure 35B:
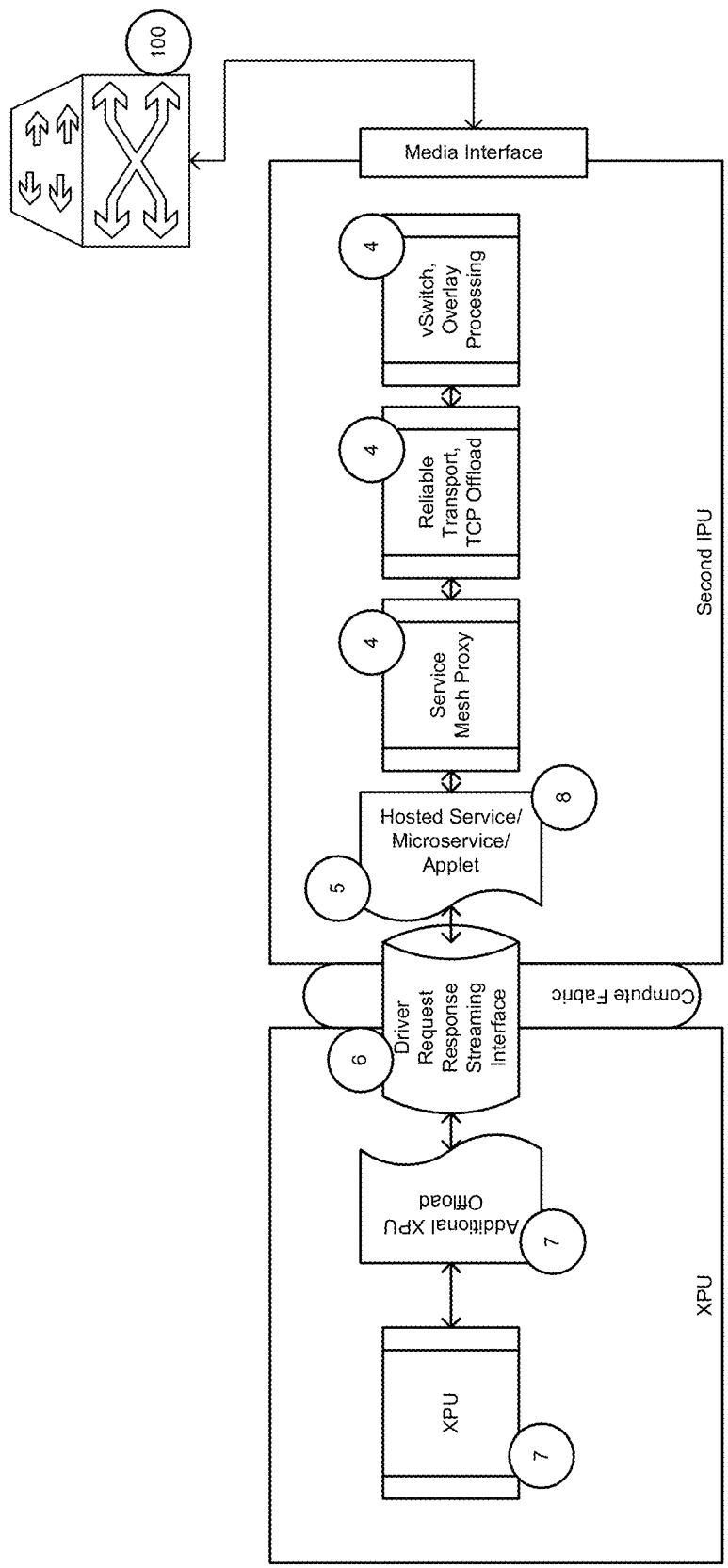

FIGS. 35A and 35B depict an example of service decomposition across local and remote resources. Referring to FIG. 35A, at (1), an application can request for service/microservice via gRPC. At (2), Protobuf portion of gRPC remains on CPU and creates serialized message. At (3), IPU can schedules and streams message and performs gRPC acceleration such as compression and encryption that would normally run on the CPU. At (4), the IPU can perform offload functions of Service Mesh, Reliable Transport, vSwitch. These provide higher performance and lower latency and can make disaggregated remote services and XPU access behave more like a locally attached request.

Control Plane can configure Service Mesh to send request to a remote service for remote execution (5) through a media interface and switch through another IPU or to local Applet (5a). Remote execution can refer to performance of a service at a device accessible through a network or fabric interface. In some examples, a service can include one or more of: software executed by a processor, a function, fixed or programmable hardware, software executed by a CPU, a process performed by a GPU or GPGPU, use of an accelerator, or an RPC.

At (5a), control plane can optionally deploy an local IPU hosted applet for XPU Service API. Locally serviced can provide lower latency than an use of another IPU with possible tradeoffs such as performance.

Intelligent switches 100 such as Barefoot Networks Tofino can export packet and message/RPC telemetry information based on UUID. This can determine impacts of failures, sources of error and latency, and types of traffic being carried.

FIG. 35B depicts activities of a second IPU. For a received message, the second IPU can perform (4)-(7). At (5), IPU Hosts Service API to expose XPU capabilities and handles any necessary pre-processing of request. Rx prioritization and scheduling to minimize latency and manage tenant SLAs. At (6), IPU sends requests to XPU for necessary processing. At (7), XPU processing can occur. At (8), IPU can use XPU completion to generate a return RPC response to Application. This bridges the behavior of XPUs and microservice RPC.

Figure 36A:
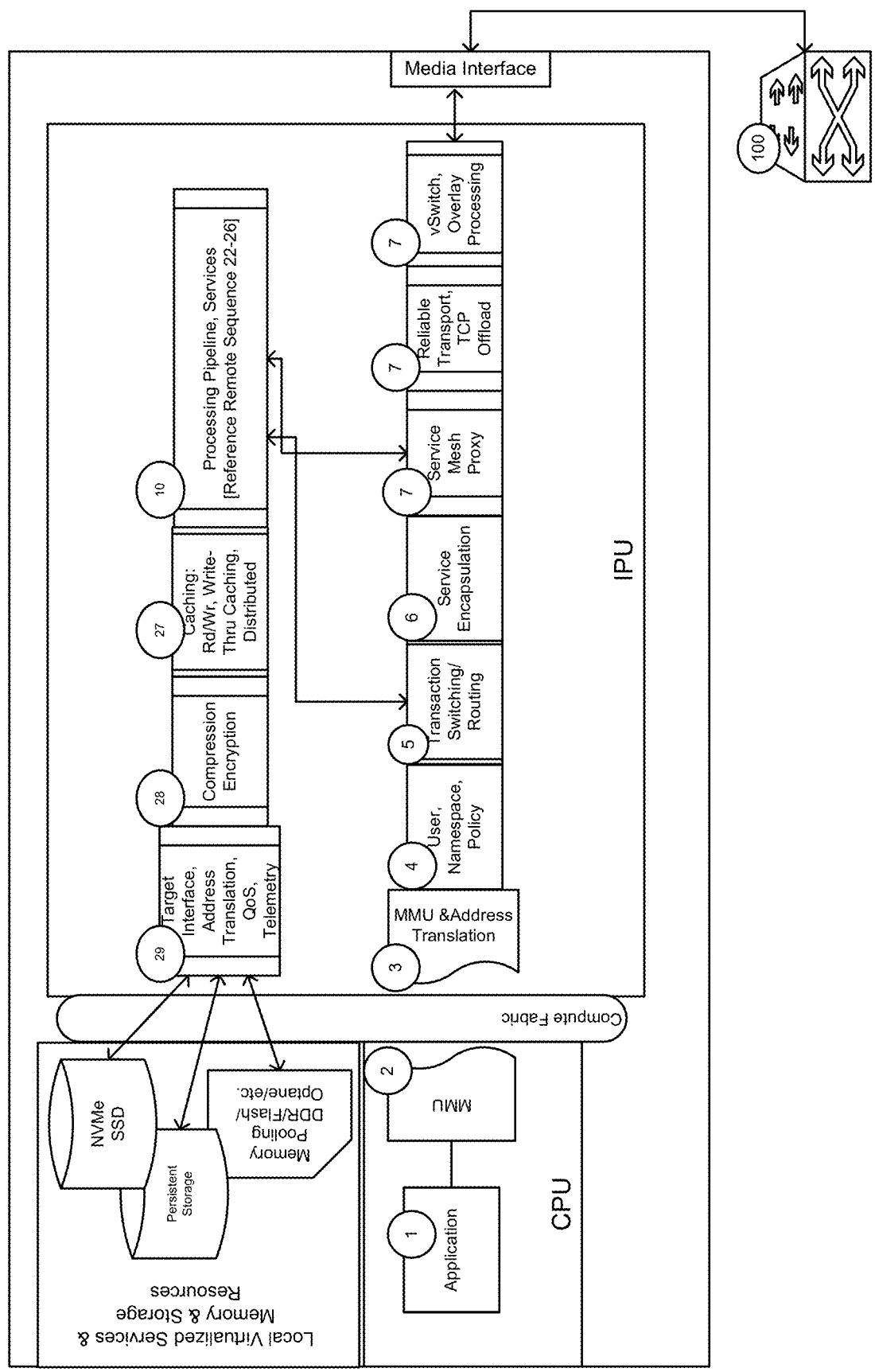
FIGS. 36A and 36B depicts an example system and operation of IPU service decomposition for memory and storage scenarios.
Figure 36B:
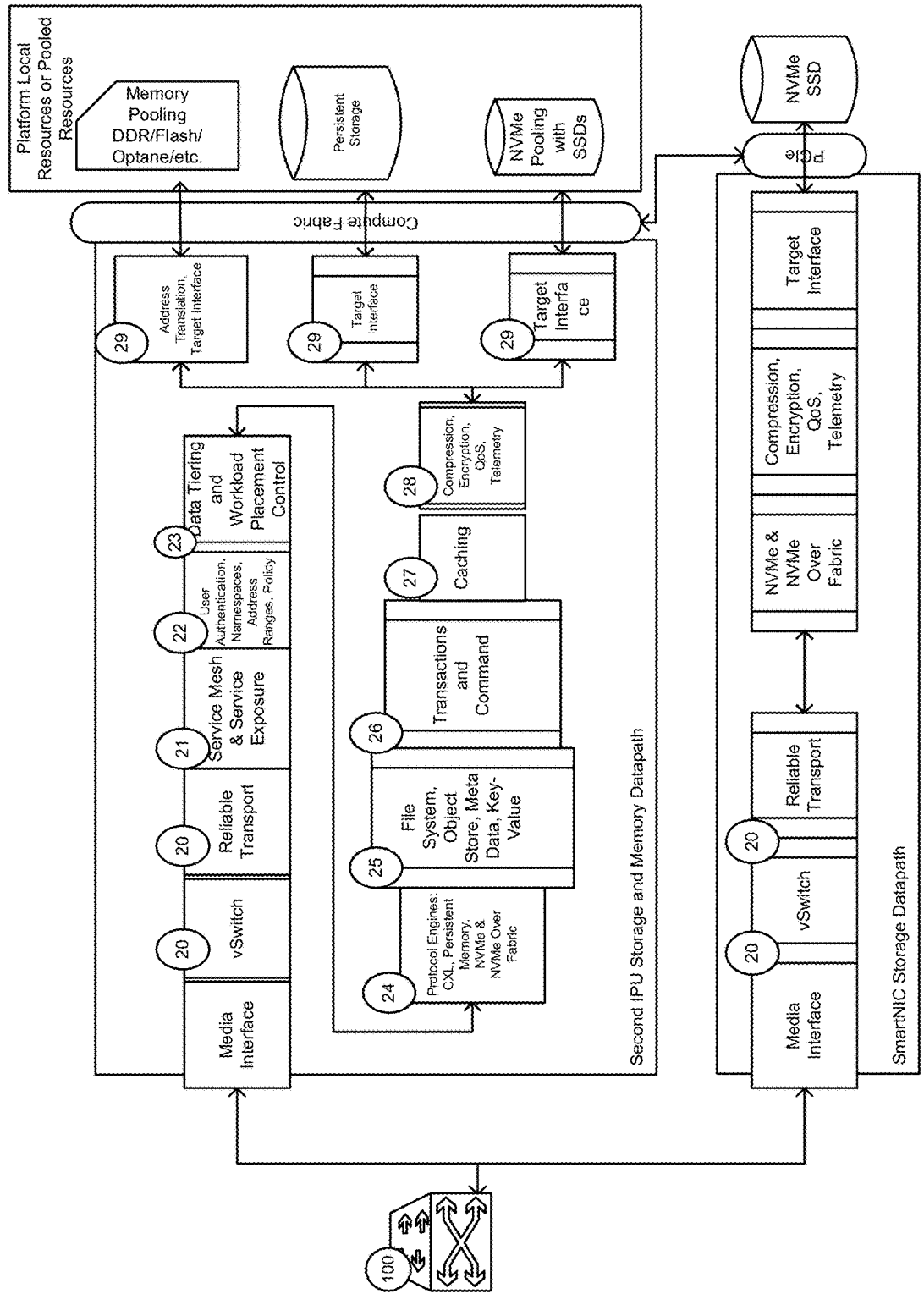

FIGS. 36A and 36B depict an example system and operation of IPU service decomposition for memory and storage scenarios. Referring to FIG. 36A, at (1), an Application can issue a request of a storage request with a service request for Database access and Memory Load/Store/Cache Invalidate, etc. At (2), for memory transactions, CPU MMU can send the request over the Compute Fabric to the IPU. Other types can be exposed as Services or NVMe requests. At (3), MMU and address translation can be used for cache tracking and classification of memory addresses to determine the required processing and policies to apply. A memory access to a remote memory pool may require encapsulating the access into a message request to be processed in the transmit path.

At (4), user authentication and identity can define namespaces and policies such as access, QoS, connectivity, etc. At (5), IO, Memory and Caching commands over the compute fabric can be managed by the IPU for switching to local resource pools or bridging/routing the request to a local or remote resource pool. At (6), protocol encapsulation and conversion can occur. At (7), an IPU can perform offload of functions of Service Mesh, Reliable Transport, vSwitch. This processing can also determine the local or remote location of the service.

In this example, the service is to be performed next on a second IPU. A media interface is used to transmit a message or RPC to a second IPU. As shown in FIG. 36B, the IPU can communicate with a second IPU using switch 100. Switch 100 can include a switch that can export packet and message or RPC telemetry information based on UUID. This can determine impacts of failures, sources of error and latency, and types of traffic being carried.

Referring to FIG. 36B, a second IPU can be accessed. The second IPU can include a SmartNIC with storage acceleration for local and remote NVMe or NVMe Over Fabric transactions. At (20), the second IPU can perform IPU Offload functions of Service Mesh, Reliable Transport, vSwitch. Offload CPU cores and lower latency. Memory and storage requests are identified as proxied by the IPU services.

At (21), the second IPU can perform IPU Offload functions of Service Mesh, and Service exposure of memory and storage requests. These are identified as proxied by the IPU services.

At (22), the second IPU can perform user authentication and identity define namespaces and policies such as access control, valid address ranges, QoS, security policy, etc. User based access ensures encryption keys are never exposed. Policy and decisions on data placement such as memory or cache hierarchy, and invalidation.

At (23), the second IPU can perform Workload placement can place data closest to where subsequent processing will occur. At (24), the second IPU can perform Protocol Engines for memory and storage interface. At (25), the second IPU can perform processing for file systems, object store, associated Metadata, Key-Value. This includes parsing structures, search and filter (REGEX/HALO) and policy enforcement. Policy actions can include data replication, multicast for logging, etc. Ex: access control based on user authentication for field access control.

At (26), the second IPU can perform Transaction and Command processing such as programmable and atomic commands reduce latency by locally executing and removing latency for subsequent actions such as Trie walks and database search without having to return data to the requestor. Command ordering minimizes blocking between unassociated commands, ensure atomic ordering, and command completion for persistent storage. Data transformation and streaming processing enables format type conversions, blending, splitting, erasure encoding, etc.

At (27), the second IPU can perform caching reduces latency and optimizes the usage of Compute fabric and resources. Caching can include read/write caching, write-through caching, distributed caching.

At (28), the second IPU can perform Compression and encryption for data inflight, in-use, at rest. QoS scheduling to reduce latency for high priority requests and enforcing SLAs. Telemetry for transaction logging, monitoring, latency measurements, etc.

At (29), the second IPU can perform Support for multitude of memory types including DDDR, Optane, Persistent, NVMe. Address translation services to enable remote load/store.

Various embodiments can include execution of a service in a distributed computing environment. One or more servers and/or one or more client systems can execute instructions. Various tasks may be performed on a remote system, local system, and/or other system. Instructions may be stored and executed across different systems for execution across multiple systems.

Note that a destination can be accessible using a SmartNIC. The SmartNIC can perform (20), instead of the second IPU.

A result can be provided from the second IPU or SmartNIC to the IPU. At (10), services that are locally hosted are looped back by the IPU for Pipeline Processing, Service policy, Command acceleration, Transactions, etc. This is the same processing options as provided on the remote side.

Figure 37:
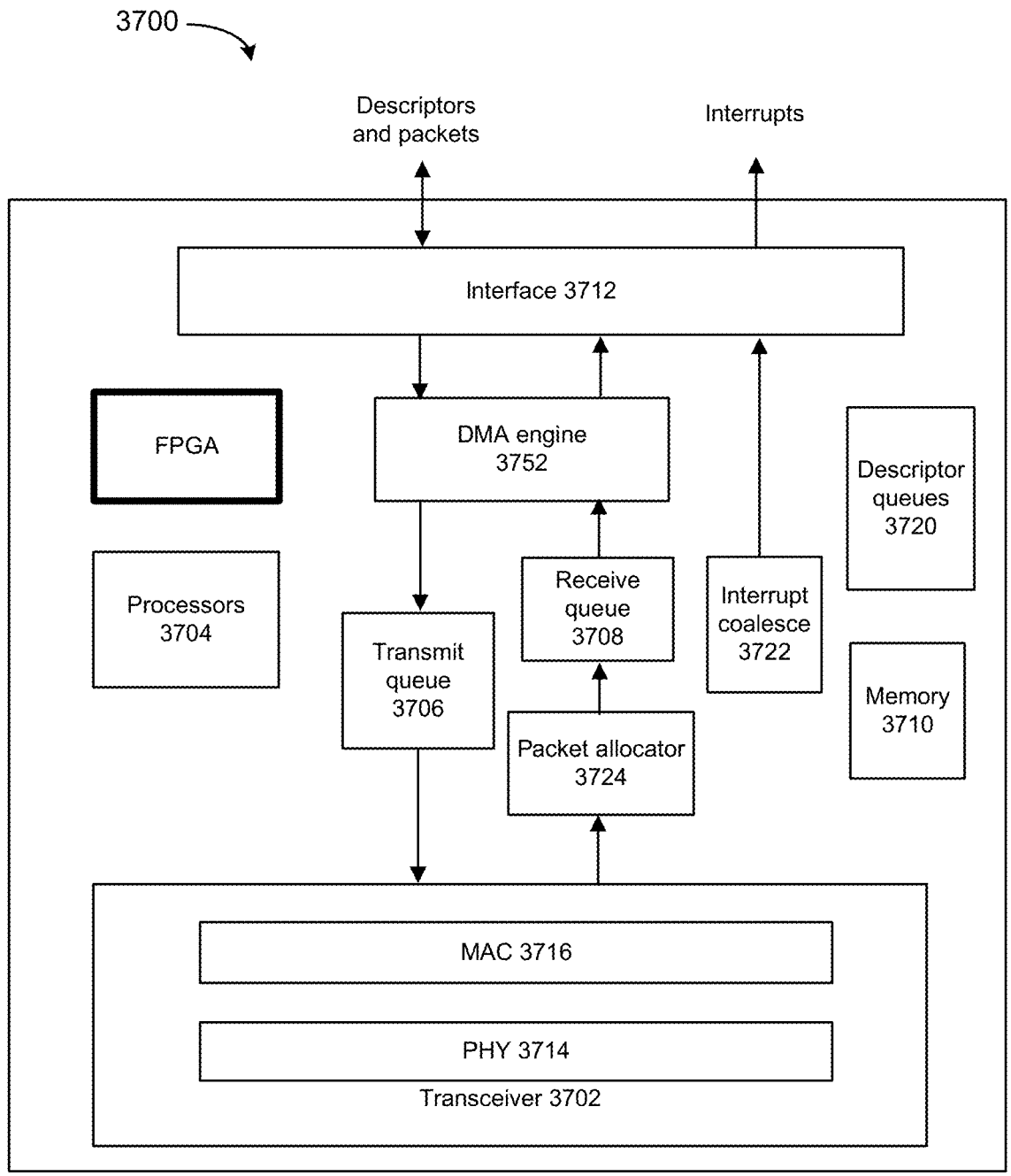
FIG. 37 depicts an example network interface.

FIG. 37 depicts an example network interface that can use embodiments or be used by embodiments. In some embodiments, network interface be used in an IPU, a DPU, or as part of a SmartNIC. In some examples, network interface 3700 can be implemented as a network interface controller, network interface card, a host fabric interface (HFI), or host bus adapter (HBA), and such examples can be interchangeable. Network interface 3700 can be coupled to one or more servers using a bus, PCIe, CXL, or DDR. Network interface 3700 may be embodied as part of a system-on-a-chip (SoC) that includes one or more processors, or included on a multichip package that also contains one or more processors.

Network interface 3700 can include transceiver 3702, processors 3704, transmit queue 3706, receive queue 3708, memory 3710, and bus interface 3712, and DMA engine 3752. Transceiver 3702 can be capable of receiving and transmitting packets in conformance with the applicable protocols such as Ethernet as described in IEEE 802.3, although other protocols may be used. Transceiver 3702 can receive and transmit packets from and to a network via a network medium (not depicted). Transceiver 3702 can include PHY circuitry 3714 and media access control (MAC) circuitry 3716. PHY circuitry 3714 can include encoding and decoding circuitry (not shown) to encode and decode data packets according to applicable physical layer specifications or standards. MAC circuitry 3716 can be configured to perform MAC address filtering on received packets, process MAC headers of received packets by verifying data integrity, remove preambles and padding, and provide packet content for processing by higher layers. MAC circuitry 3716 can be configured to assemble data to be transmitted into packets, that include destination and source addresses along with network control information and error detection hash values.

Processors 3704 can be any a combination of a: processor, core, graphics processing unit (GPU), field programmable gate array (FPGA), application specific integrated circuit (ASIC), or other programmable hardware device that allow programming of network interface 3700. For example, a "smart network interface" or SmartNIC can provide packet processing capabilities in the network interface using processors 3704. In some examples, processors 3704 can be implemented as a processor component for a SmartNIC.

Packet allocator 3724 can provide distribution of received packets for processing by multiple CPUs or cores using timeslot allocation described herein or RSS. When packet allocator 3724 uses RSS, packet allocator 3724 can calculate a hash or make another determination based on contents of a received packet to determine which CPU or core is to process a packet.

Interrupt coalesce 3722 can perform interrupt moderation whereby network interface interrupt coalesce 3722 waits for multiple packets to arrive, or for a time-out to expire, before generating an interrupt to host system to process received packet(s). Receive Segment Coalescing (RSC) can be performed by network interface 3700 whereby portions of incoming packets are combined into segments of a packet. Network interface 3700 provides this coalesced packet to an application.

Direct memory access (DMA) engine 3752 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Memory 3710 can be any type of volatile or non-volatile memory device and can store any queue or instructions used to program network interface 3700. Transmit queue 3706 can include data or references to data for transmission by network interface. Receive queue 3708 can include data or references to data that was received by network interface from a network. Descriptor queues 3720 can include descriptors that reference data or packets in transmit queue 3706 or receive queue 3708 and corresponding destination memory regions. Bus interface 3712 can provide an interface with host device (not depicted). For example, bus interface 3712 can be compatible with PCI, PCI Express, PCI-x, Serial ATA, and/or USB compatible interface (although other interconnection standards may be used).

In some examples, network interface 3700 can include a field programmable gate array (FPGA) configured to receive commands from a CPU or XPU and perform commands.

Figure 38:
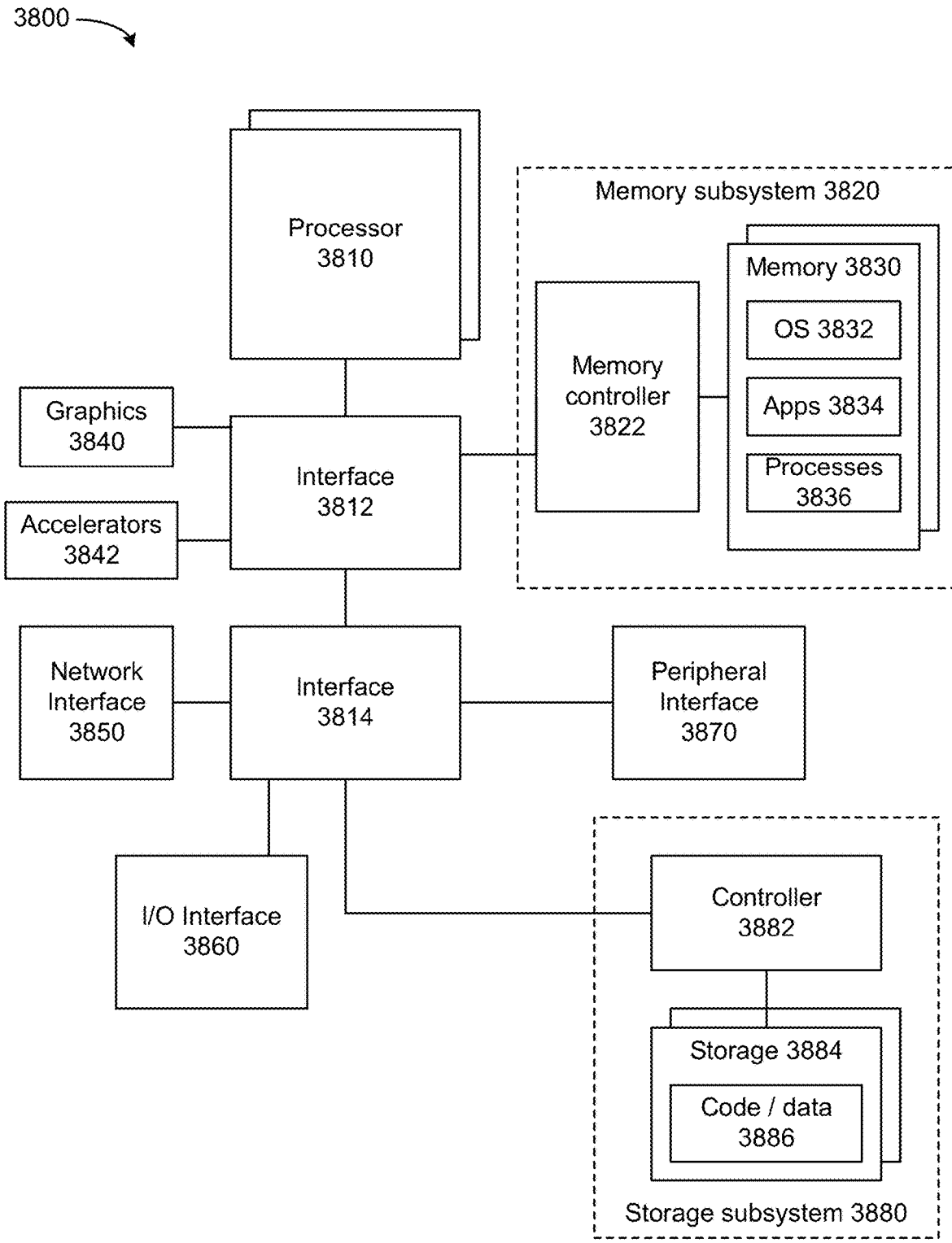
FIG. 38 depicts an example system.

FIG. 38 depicts an example system. The system can use embodiments described herein for dispatching microservices to perform an application at a NIC, IPU, DPU, or SmartNIC. System 3800 includes processor 3810, which provides processing, operation management, and execution of instructions for system 3800. Processor 3810 can include any type of microprocessor, central processing unit (CPU), graphics processing unit (GPU), processing core, or other processing hardware to provide processing for system 3800, or a combination of processors. Processor 3810 controls the overall operation of system 3800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

CPU 3802 or any of its cores can execute a virtualized execution environment. A virtualized execution environment (VEE) can include at least a virtual machine or a container. VEEs can execute in bare metal (e.g., single tenant) or hosted (e.g., multiple tenants) environments. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux®, FreeBSD, VMWare, or Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include permitted access of a region of addressable memory or storage by a particular container but not another container. The isolated nature of containers provides several benefits. First, the software in a container will run the same in different environments. For example, a container that includes PHP and MySQL can run identically on both a Linux computer and a Windows® machine. Second, containers provide added security since the software will not affect the host operating system. While an installed application may alter system settings and modify resources, such as the Windows® registry, a container can only modify settings within the container.

Some examples of a VEE can include CRI-O and Kata Containers.

For example, applications can include a service, microservice, cloud native microservice, workload, or software. Any of applications can perform packet processing based on one or more of Data Plane Development Kit (DPDK), Storage Performance Development Kit (SPDK), OpenDataPlane, Network Function Virtualization (NFV), software-defined networking (SDN), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. A virtual network function (VNF) can include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure. Some applications can perform video processing or media transcoding (e.g., changing the encoding of audio, image or video files).

In one example, system 3800 includes interface 3812 coupled to processor 3810, which can represent a higher speed interface or a high throughput interface for system components that needs higher bandwidth connections, such as memory subsystem 3820, graphics interface components 3840, or accelerators 3842. Interface 3812 represents an interface circuit, which can be a standalone component or integrated onto a processor die. Where present, graphics interface 3840 interfaces to graphics components for providing a visual display to a user of system 3800. In one example, graphics interface 3840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 3840 generates a display based on data stored in memory 3830 or based on operations executed by processor 3810 or both. In one example, graphics interface 3840 generates a display based on data stored in memory 3830 or based on operations executed by processor 3810 or both.

Accelerators 3842 can be a programmable or fixed function offload engine that can be accessed or used by a processor 3810. For example, an accelerator among accelerators 3842 can provide compression (DC) capability, cryptography services such as public key encryption (PKE), cipher, hash/authentication capabilities, decryption, or other capabilities or services. In some embodiments, in addition or alternatively, an accelerator among accelerators 3842 provides field select controller capabilities as described herein. In some cases, accelerators 3842 can be integrated into a CPU socket (e.g., a connector to a motherboard or circuit board that includes a CPU and provides an electrical interface with the CPU). For example, accelerators 3842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 3842 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 3820 represents the main memory of system 3800 and provides storage for code to be executed by processor 3810, or data values to be used in executing a routine. Memory subsystem 3820 can include one or more memory devices 3830 such as read-only memory (ROM), flash memory, one or more varieties of random access memory (RAM) such as DRAM, or other memory devices, or a combination of such devices. Memory 3830 stores and hosts, among other things, operating system (OS) 3832 to provide a software platform for execution of instructions in system 3800. Additionally, applications 3834 can execute on the software platform of OS 3832 from memory 3830. Applications 3834 represent programs that have their own operational logic to perform execution of one or more functions. Processes 3836 represent agents or routines that provide auxiliary functions to OS 3832 or one or more applications 3834 or a combination. OS 3832, applications 3834, and processes 3836 provide software logic to provide functions for system 3800. In one example, memory subsystem 3820 includes memory controller 3822, which is a memory controller to generate and issue commands to memory 3830. It will be understood that memory controller 3822 could be a physical part of processor 3810 or a physical part of interface 3812. For example, memory controller 3822 can be an integrated memory controller, integrated onto a circuit with processor 3810.

In some examples, OS 3832 can determine a capability of a device associated with a device driver. For example, OS 3832 can receive an indication of a capability of a device (e.g., IPU) to perform any embodiment described herein. OS 3832 can request a driver to enable or disable NIC 3850 or an IPU to perform any of the capabilities described herein. In some examples, OS 3832, itself, can enable or disable NIC 3850 or an IPU to perform any of the capabilities described herein. OS 3832 can provide requests (e.g., from an application or VM) to NIC 3850 or an IPU to utilize one or more capabilities of NIC 3850 or an IPU. For example, any application can request use or non-use of any of capabilities described herein by NIC 3850.

While not specifically illustrated, it will be understood that system 3800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus.

In one example, system 3800 includes interface 3814, which can be coupled to interface 3812. In one example, interface 3814 represents an interface circuit, which can include standalone components and integrated circuitry. In one example, multiple user interface components or peripheral components, or both, couple to interface 3814. Network interface 3850 provides system 3800 the ability to communicate with remote devices (e.g., servers or other computing devices) over one or more networks. Network interface 3850 can include an Ethernet adapter, wireless interconnection components, cellular network interconnection components, USB (universal serial bus), or other wired or wireless standards-based or proprietary interfaces. Network interface 3850 can transmit data to a remote device, which can include sending data stored in memory. Network interface 3850 can receive data from a remote device, which can include storing received data into memory. Various embodiments can be used in connection with network interface 3850, processor 3810, and memory subsystem 3820.

In one example, system 3800 includes one or more input/output (I/O) interface(s) 3860. I/O interface 3860 can include one or more interface components through which a user interacts with system 3800 (e.g., audio, alphanumeric, tactile/touch, or other interfacing). Peripheral interface 3870 can include any hardware interface not specifically mentioned above. Peripherals refer generally to devices that connect dependently to system 3800. A dependent connection is one where system 3800 provides the software platform or hardware platform or both on which operation executes, and with which a user interacts.

In one example, system 3800 includes storage subsystem 3880 to store data in a nonvolatile manner. In one example, in certain system implementations, at least certain components of storage 3880 can overlap with components of memory subsystem 3820. Storage subsystem 3880 includes storage device(s) 3884, which can be or include any conventional medium for storing large amounts of data in a nonvolatile manner, such as one or more magnetic, solid state, or optical based disks, or a combination. Storage 3884 holds code or instructions and data 3886 in a persistent state (e.g., the value is retained despite interruption of power to system 3800). Storage 3884 can be generically considered to be a "memory," although memory 3830 is typically the executing or operating memory to provide instructions to processor 3810. Whereas storage 3884 is nonvolatile, memory 3830 can include volatile memory (e.g., the value or state of the data is indeterminate if power is interrupted to system 3800). In one example, storage subsystem 3880 includes controller 3882 to interface with storage 3884. In one example controller 3882 is a physical part of interface 3814 or processor 3810 or can include circuits or logic in both processor 3810 and interface 3814.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 2000. More specifically, power source typically interfaces to one or multiple power supplies in system 2000 to provide power to the components of system 2000. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 3800 can be implemented using interconnected compute sleds of processors, memories, storages, network interfaces, and other components. High speed connections can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, Infinity Fabric (IF), NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, DisplayPort, embedded DisplayPort, MIPI, HDMI, Infinity Fabric (IF), and successors or variations thereof.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a system comprising: an Infrastructure Processing Unit (IPU) that comprises: interface circuitry to provide a communicative coupling with a platform; network interface circuitry to provide a communicative coupling with a network medium; and circuitry to expose infrastructure services to be accessed by microservices for function composition and to selectively provide a barrier to halt operation of at least one microservice based on event data from a composite node that performs the at least one microservice.

Example 2 includes any example, wherein the circuitry is to selectively provide a barrier to halt operation of at least one microservice based on event data from a composite node that performs the at least one microservice to determine a malfunction that could negatively impact performance of one or more currently executed microservices or one or more microservices to be executed.

Example 3 includes any example, wherein the event data comprises one or more physical events at a device in the composite node.

Example 4 includes any example, wherein the event data comprises one or more of: voltage droop at a device in the composite node, too high a memory error correction rate at a device in the composite node, excess temperature of a device in the composite node, or intrusion detection at a device in the composite node.

Example 5 includes any example, wherein the event data comprises one or more performance extrema of an operation of the composite node.

Example 6 includes any example, wherein the event data comprises one or more of: heartbeat signal timeout from an XPU of the composite node, timeouts reported from hardware that is part of the composite node, or excess memory errors from the composite node.

Example 7 includes any example, wherein the barrier to halt operation of at least one microservice comprises an acknowledgement that all devices in the composite node have entered active standby mode.

Example 8 includes any example, wherein during application of the barrier, the circuitry is to place devices of the composite node into active-standby mode to execute commands from the IPU.

Example 9 includes any example, wherein the circuitry is to release the barrier and permit devices of the composite node to execute awaiting microservices.

Example 10 includes any example, wherein in response to the barrier, the circuitry is to cause migration of microservices and data from the composite node to another composite node.

Example 11 includes any example, and includes a managed node comprising one or more composite nodes, wherein the composite node comprises computing resources that are logically coupled, wherein the computing resources include memory devices, data storage devices, accelerator devices, or general purpose processors, wherein resources from the one or more composite nodes are collectively utilized in execution of a workload and wherein the workload execution is implemented by a group of microservices.

Example 12 includes any example, and includes a method comprising: at an Infrastructure Processing Unit (IPU): exposing infrastructure services to be accessed by microservices for function composition and selectively providing a barrier to halt operation of at least one microservice based on event data from a composite node that performs the at least one microservice.

Example 13 includes any example, wherein the selectively providing a barrier to halt operation of at least one microservice based on event data from a composite node that performs the at least one microservice to determine a malfunction that could negatively impact performance of one or more currently executed microservices or one or more microservices to be executed.

Example 14 includes any example, wherein the event data comprises one or more physical events at a device in the composite node.

Example 15 includes any example, wherein the event data comprises one or more of: voltage droop at a device in the composite node, too high a memory error correction rate at a device in the composite node, excess temperature of a device in the composite node, or intrusion detection at a device in the composite node.

Example 16 includes any example, wherein the event data comprises one or more performance extrema of an operation of the composite node.

Example 17 includes any example, wherein the event data comprises one or more of: heartbeat signal timeout from an XPU of the composite node, timeouts reported from hardware that is part of the composite node, or excess memory errors from the composite node.

Example 18 includes any example, wherein during application of the barrier, the IPU placing devices of the composite node into active-standby mode to execute commands from the IPU.

Example 19 includes any example, wherein the IPU releasing the barrier and permitting devices of the composite node to execute awaiting microservices.

Example 20 includes any example, wherein in response to the barrier, the IPU causing migration of microservices and data from the composite node to another composite node.

What is claimed is:

1. A system comprising:
 a network interface device that comprises:
  a direct memory access (DMA) circuitry;
  interface circuitry to provide a communicative coupling with a first host platform;
  network interface circuitry to provide a communicative coupling with a network medium to transmit and receive Ethernet packets;
  circuitry to:
   provide access to distributed nodes to microservices executed by the first host platform, wherein the distributed nodes comprises circuitry of a second host platform and a second network interface device and wherein the second host platform and the second network interface devices are communicatively coupled to the network interface device via the interface circuitry or the network interface circuitry; and
   selectively provide, from the network interface device, a barrier to halt operation of at least one microservice of the microservices based on event data from the distributed nodes and based on the event data from the distributed nodes, release the barrier to permit operation of the at least one microservice of the microservices, wherein the release the barrier comprises permit devices of the distributed nodes to execute awaiting microservices.

2. The system of claim 1, wherein the circuitry is to selectively provide a barrier to halt operation of at least one microservice based on the event data from the distributed nodes to determine a malfunction that could negatively impact performance of one or more currently executed microservices or one or more microservices to be executed.

3. The system of claim 1, wherein the event data comprises one or more physical events at a device in the distributed nodes.

4. The system of claim 1, wherein the event data comprises one or more of: voltage droop at a device in the distributed nodes, too high a memory error correction rate at a device in the distributed nodes, excess temperature of a device in the distributed nodes, or intrusion detection at a device in the distributed nodes.

5. The system of claim 1, wherein the event data comprises one or more performance extrema of an operation of the distributed nodes.

6. The system of claim 1, wherein the event data comprises one or more of: heartbeat signal timeout from an XPU of the distributed nodes, timeouts reported from hardware that is part of the distributed nodes, or excess memory errors from the distributed nodes.

7. The system of claim 1, wherein the barrier to halt operation of at least one microservice comprises an acknowledgement that devices in the distributed nodes have entered active standby mode.

8. The system of claim 1, wherein during application of the barrier, the circuitry is to place devices of the distributed nodes into active-standby mode to execute commands from the network interface device.

9. The system of claim 1, wherein in response to the barrier, the circuitry is to cause migration of microservices and data from the distributed nodes to another distributed nodes.

10. The system of claim 9, comprising:
 a managed node comprising one or more distributed nodes, wherein the distributed nodes comprises computing resources that are logically coupled, wherein the computing resources include memory devices, data storage devices, accelerator devices, or general purpose processors, wherein resources from the one or more distributed nodes are collectively utilized in execution of a workload and wherein the workload execution is implemented by a group of microservices.

11. A method comprising:
 at a network interface device comprising a direct memory access (DMA) circuitry, an interface to a first platform, and a network interface to transmit and receive Ethernet packets:
  providing access to distributed nodes to microservices executed by the first platform, wherein the distributed nodes comprises circuitry of a second host platform and a second network interface device and wherein the second host platform and the second network interface device are communicatively coupled to the network interface device via the interface or the network interface;
  selectively providing, by the network interface device, a barrier to halt operation of at least one microservice of the microservices based on event data from the distributed nodes; and
  based on the event data from the distributed nodes, releasing the barrier and permitting devices of the distributed nodes to execute operation of the at least one microservice of the microservices.

12. The method of claim 11, wherein the selectively providing a barrier to halt operation of at least one microservice based on the event data from the distributed nodes to determine a malfunction that could negatively impact performance of one or more currently executed microservices or one or more microservices to be executed.

13. The method of claim 11, wherein the event data comprises one or more physical events at a device in the distributed nodes.

14. The method of claim 11, wherein the event data comprises one or more of: voltage droop at a device in the distributed nodes, too high a memory error correction rate at a device in the distributed nodes, excess temperature of a device in the distributed nodes, or intrusion detection at a device in the distributed nodes.

15. The method of claim 11, wherein the event data comprises one or more performance extrema of an operation of the distributed nodes.

16. The method of claim 11, wherein the event data comprises one or more of: heartbeat signal timeout from an XPU of the distributed nodes, timeouts reported from hardware that is part of the distributed nodes, or excess memory errors from the distributed nodes.

17. The method of claim 11, wherein during application of the barrier, the network interface device placing devices of the distributed nodes into active-standby mode to execute commands from the network interface device.

18. The method of claim 11, comprising: the network interface device releasing the barrier and permitting devices of the distributed nodes to execute awaiting microservices.

19. The method of claim 11, wherein in response to the barrier, the network interface device causing migration of microservices and data from the distributed nodes to another distributed nodes.

20. An apparatus comprising:
a network interface device, comprising a direct memory access (DMA) circuitry, host interface, network interface, and circuitry, wherein the circuitry is to:
manage, at the network interface device, forward progress of microservices executed by distributed nodes by halting forward progress of microservices executed by the distributed nodes and based on event data from the distributed nodes, release a barrier and permit resuming progress of the microservices executed by the distributed nodes based on event data from the distributed nodes.

21. The apparatus of claim 20, wherein to manage forward progress of microservices executed by distributed nodes, the circuitry is to issue a barrier to halt progress of a first process.

22. The apparatus of claim 20, wherein the manage forward progress of microservices executed by distributed nodes is based on telemetry data comprising one or more physical events in the distributed nodes.

* * * * *